United States Patent
Singfield

(10) Patent No.: US 11,200,550 B1
(45) Date of Patent: *Dec. 14, 2021

(54) WIRELESS ELECTRONIC CHECK DEPOSIT SCANNING AND CASHING MACHINE WITH WEB-BASED ONLINE ACCOUNT CASH MANAGEMENT COMPUTER APPLICATION SYSTEM

(71) Applicant: United Services Automobile Association (USAA), San Antonio, TX (US)

(72) Inventor: Joy Shantia Singfield, Uniondale, NY (US)

(73) Assignee: United Services Automobile Association (USAA), San Antonio, TX (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/682,722

(22) Filed: Nov. 13, 2019

Related U.S. Application Data

(63) Continuation of application No. 15/183,461, filed on Jun. 15, 2016, now Pat. No. 10,521,781, which is a
(Continued)

(51) Int. Cl.
*G06Q 20/10* (2012.01)
*G06Q 20/04* (2012.01)
(Continued)

(52) U.S. Cl.
CPC ..... *G06Q 20/1085* (2013.01); *G06K 9/00288* (2013.01); *G06K 9/00335* (2013.01);
(Continued)

(58) Field of Classification Search
USPC ...................................... 705/35, 42
See application file for complete search history.

(56) References Cited

U.S. PATENT DOCUMENTS

| | | | |
|---|---|---|---|
| 1,748,489 | A | 2/1930 | McCarthy et al. |
| 2,292,825 | A | 8/1942 | Dilks et al. |
| | | (Continued) | |

FOREIGN PATENT DOCUMENTS

| | | |
|---|---|---|
| CN | 1897644 A | 1/2007 |
| EP | 0 984 410 A1 | 3/2000 |
| | (Continued) | |

OTHER PUBLICATIONS

Higgins, Ray et al., "Working With Image Cash Letters (ISLs) X9.37, 180 or 187 files", *All My Papers*, 2009, 36 pgs.
(Continued)

*Primary Examiner* — William E Rankins
(74) *Attorney, Agent, or Firm* — Crowell & Moring LLP

(57) ABSTRACT

Wireless Electronic Check Deposit Scanning and Cashing Machine (also known and referred to as WEDS) Web-based Online account cash Management computer application System (also known and referred to as OMS virtual/live teller)—collectively invented integrated as "WEDS.OMS" System. Method and Apparatus for Depositing and Cashing Ordinary paper and/or substitute checks and money orders online Wirelessly from home/office computer, laptop, Internet enabled mobile phone, pda (personal digital assistant) and/or any Internet enabled device. WEDS enables verification and transmittal of image, OMS is the navigation tool used to set commands and process requests, integrated with WEDS, working collectively as WEDS.OMS System.

20 Claims, 16 Drawing Sheets

Related U.S. Application Data continuation of application No. 14/299,456, filed on Jun. 9, 2014, now abandoned, which is a continuation of application No. 13/495,971, filed on Jun. 13, 2012, now abandoned, which is a continuation of application No. 10/918,898, filed on Aug. 16, 2004, now abandoned.

(60) Provisional application No. 60/532,416, filed on Dec. 23, 2003, provisional application No. 60/515,912, filed on Oct. 30, 2003.

(51) Int. Cl.
*G07F 19/00* (2006.01)
*G06K 9/00* (2006.01)
*G06Q 20/40* (2012.01)

(52) U.S. Cl.
CPC ......... *G06Q 20/042* (2013.01); *G06Q 20/108* (2013.01); *G06Q 20/40* (2013.01); *G07F 19/20* (2013.01); *G07F 19/202* (2013.01); *G06K 9/00442* (2013.01)

(56) References Cited

U.S. PATENT DOCUMENTS

| | | |
|---|---|---|
| 3,005,282 A | 10/1961 | Christiansen |
| 3,341,820 A | 9/1967 | Grillmeier, Jr. et al. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,027,142 A | 5/1977 | Paup et al. |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,346,442 A | 8/1982 | Musmanno |
| 4,379,283 A | 4/1983 | Ito et al. |
| 4,417,136 A | 11/1983 | Rushby et al. |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Grosbard |
| 4,636,099 A | 1/1987 | Goldston |
| 4,640,413 A | 2/1987 | Kaplan |
| 4,644,144 A | 2/1987 | Chandek |
| 4,722,444 A | 2/1988 | Murphy et al. |
| 4,722,544 A | 2/1988 | Weber |
| 4,727,435 A | 2/1988 | Otani |
| 4,737,911 A | 4/1988 | Freeman |
| 4,739,411 A | 4/1988 | Bolton |
| 4,774,574 A | 9/1988 | Daly et al. |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,885,704 A | 12/1989 | Takagi et al. |
| 4,890,228 A | 12/1989 | Longfield |
| 4,896,363 A | 1/1990 | Taylor |
| 4,927,071 A | 5/1990 | Wood |
| 4,921,957 A | 6/1990 | Takagi et al. |
| 4,934,587 A | 6/1990 | McNabb |
| 4,960,981 A | 10/1990 | Benton |
| 4,975,735 A | 12/1990 | Bright |
| 5,022,683 A | 6/1991 | Barbour |
| 5,077,805 A | 12/1991 | Tan |
| 5,091,968 A | 2/1992 | Higgins et al. |
| 5,122,950 A | 6/1992 | Benton et al. |
| 5,134,564 A | 7/1992 | Dunn et al. |
| 5,146,606 A | 9/1992 | Grondalski |
| 5,157,620 A | 10/1992 | Shaar |
| 5,159,548 A | 10/1992 | Caslavka |
| 5,164,833 A | 11/1992 | Aoki |
| 5,175,682 A | 12/1992 | Higashiyama et al. |
| 5,187,750 A | 2/1993 | Behera |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,233,547 A | 8/1993 | Kapp et al. |
| 5,237,158 A | 8/1993 | Kern et al. |
| 5,237,159 A | 8/1993 | Stephens |
| 5,237,620 A | 8/1993 | Deaton et al. |
| 5,257,320 A | 10/1993 | Etherington et al. |
| 5,265,008 A | 11/1993 | Benton |
| 5,268,968 A | 12/1993 | Yoshida |
| 5,321,816 A | 6/1994 | Rogan |
| 5,345,090 A | 9/1994 | Hludzinski |
| 5,347,302 A | 9/1994 | Simonoff |
| 5,350,906 A | 9/1994 | Brody |
| 5,373,550 A | 12/1994 | Campbell |
| 5,383,113 A | 1/1995 | Kight et al. |
| 5,419,588 A | 5/1995 | Wood |
| 5,422,467 A | 6/1995 | Graef |
| 5,444,616 A | 8/1995 | Nair et al. |
| 5,444,794 A | 8/1995 | Uhland, Sr. |
| 5,455,875 A | 10/1995 | Chevion et al. |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,530,773 A | 6/1996 | Thompson |
| 5,577,179 A | 11/1996 | Blank |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray et al. |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkier |
| 5,748,780 A | 5/1998 | Stolfo |
| 5,751,842 A | 5/1998 | Riach |
| 5,761,686 A | 6/1998 | Bloomberg |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,848,185 A | 12/1998 | Koga et al. |
| 5,850,075 A | 12/1998 | Brannan et al. |
| 5,859,935 A | 1/1999 | Johnson et al. |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,889,884 A | 3/1999 | Hashimoto et al. |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |

(56) References Cited

U.S. PATENT DOCUMENTS

| | | | |
|---|---|---|---|
| 5,910,988 A | 6/1999 | Ballard | |
| 5,917,931 A | 6/1999 | Kunkier | |
| 5,924,737 A | 7/1999 | Schrupp | |
| 5,926,548 A | 7/1999 | Okamoto | |
| 5,930,501 A * | 7/1999 | Neil | G06F 3/0481 |
| | | | 713/400 |
| 5,930,778 A | 7/1999 | Geer | |
| 5,937,396 A | 8/1999 | Konya | |
| 5,940,844 A | 8/1999 | Cahill | |
| 5,982,918 A | 11/1999 | Mennie | |
| 5,987,439 A | 11/1999 | Gustin et al. | |
| 6,005,623 A | 12/1999 | Takahashi | |
| 6,012,048 A | 1/2000 | Gustin et al. | |
| 6,014,454 A | 1/2000 | Kunkier | |
| 6,021,202 A | 2/2000 | Anderson | |
| 6,021,397 A | 2/2000 | Jones | |
| 6,023,705 A | 2/2000 | Bellinger et al. | |
| 6,029,887 A | 2/2000 | Furuhashi | |
| 6,030,000 A | 2/2000 | Diamond | |
| 6,032,137 A | 2/2000 | Ballard | |
| 6,038,553 A | 3/2000 | Hyde | |
| 6,044,883 A | 4/2000 | Noyes | |
| 6,053,405 A | 4/2000 | Irwin, Jr. et al. | |
| 6,059,185 A | 5/2000 | Funk et al. | |
| 6,064,753 A | 5/2000 | Bolle | |
| 6,064,762 A | 5/2000 | Haenel | |
| 6,072,941 A | 6/2000 | Suzuki et al. | |
| 6,073,119 A | 6/2000 | Bornemisza-wahr | |
| 6,073,121 A | 6/2000 | Ramzy | |
| 6,085,168 A | 7/2000 | Mori | |
| 6,086,708 A | 7/2000 | Colgate | |
| 6,089,450 A | 7/2000 | Koeple | |
| 6,089,610 A | 7/2000 | Greene | |
| 6,092,047 A | 7/2000 | Hyman et al. | |
| 6,097,834 A | 8/2000 | Krouse | |
| 6,097,845 A | 8/2000 | Ng et al. | |
| 6,097,885 A | 8/2000 | Rayner | |
| 6,105,865 A | 8/2000 | Hardesty | |
| 6,128,603 A | 10/2000 | Dent et al. | |
| 6,129,270 A | 10/2000 | Piazza | |
| 6,141,339 A | 10/2000 | Kaplan et al. | |
| 6,145,738 A | 11/2000 | Stinson et al. | |
| 6,148,102 A | 11/2000 | Stolin | |
| 6,149,056 A | 11/2000 | Stinson et al. | |
| 6,151,409 A | 11/2000 | Chen et al. | |
| 6,151,423 A | 11/2000 | Melen | |
| 6,151,426 A | 11/2000 | Lee | |
| 6,159,585 A | 12/2000 | Rittenhouse | |
| 6,170,744 B1 | 1/2001 | Lee | |
| 6,178,270 B1 | 1/2001 | Taylor et al. | |
| 6,178,409 B1 | 1/2001 | Weber et al. | |
| 6,181,837 B1 | 1/2001 | Cahill et al. | |
| 6,188,506 B1 | 2/2001 | Kaiserman | |
| 6,189,785 B1 | 2/2001 | Lowery | |
| 6,192,165 B1 | 2/2001 | Irons | |
| 6,195,452 B1 | 2/2001 | Royer | |
| 6,195,694 B1 | 2/2001 | Chen et al. | |
| 6,199,055 B1 | 3/2001 | Kara | |
| 6,236,009 B1 | 5/2001 | Emigh et al. | |
| 6,243,689 B1 | 6/2001 | Norton | |
| 6,278,983 B1 | 8/2001 | Ball | |
| 6,282,523 B1 | 8/2001 | Tedesco et al. | |
| 6,282,826 B1 | 9/2001 | Richards | |
| 6,293,469 B1 | 9/2001 | Masson et al. | |
| 6,310,647 B1 | 10/2001 | Parulski et al. | |
| 6,314,452 B1 | 11/2001 | Dekel | |
| 6,315,195 B1 | 11/2001 | Ramachandrun | |
| 6,317,727 B1 | 11/2001 | May | |
| 6,328,207 B1 | 12/2001 | Gregoire et al. | |
| 6,330,546 B1 | 12/2001 | Gopinathan et al. | |
| 6,339,658 B1 | 1/2002 | Moccagatta | |
| 6,339,766 B1 | 1/2002 | Gephart | |
| 6,345,118 B1 | 2/2002 | Ideyama | |
| 6,351,553 B1 | 2/2002 | Hayosh | |
| 6,351,735 B1 | 2/2002 | Deaton et al. | |
| 6,354,490 B1 | 3/2002 | Weiss et al. | |
| 6,363,162 B1 | 3/2002 | Moed et al. | |
| 6,363,164 B1 | 3/2002 | Jones et al. | |
| 6,390,362 B1 | 5/2002 | Martin | |
| 6,397,196 B1 | 5/2002 | Kravetz | |
| 6,408,084 B1 | 6/2002 | Foley | |
| 6,411,725 B1 | 6/2002 | Rhoads | |
| 6,411,737 B2 | 6/2002 | Wesolkowski et al. | |
| 6,411,938 B1 | 6/2002 | Gates et al. | |
| 6,413,305 B1 | 7/2002 | Mehta | |
| 6,417,869 B1 | 7/2002 | Do | |
| 6,425,017 B1 | 7/2002 | Dievendorff | |
| 6,429,952 B1 | 8/2002 | Olbricht | |
| 6,439,454 B1 | 8/2002 | Masson et al. | |
| 6,449,397 B1 | 9/2002 | Che-chu | |
| 6,450,403 B1 | 9/2002 | Martens et al. | |
| 6,463,220 B1 | 10/2002 | Dance et al. | |
| 6,464,134 B1 | 10/2002 | Page | |
| 6,469,745 B1 | 10/2002 | Yamada et al. | |
| 6,470,325 B1 | 10/2002 | Leemhuis | |
| 6,473,519 B1 | 10/2002 | Pidhirny et al. | |
| 6,502,747 B1 | 1/2003 | Stoutenburg et al. | |
| 6,505,178 B1 | 1/2003 | Flenley | |
| 6,546,119 B2 | 4/2003 | Ciolli et al. | |
| 6,574,377 B1 | 6/2003 | Cahill et al. | |
| 6,574,609 B1 | 6/2003 | Downs | |
| 6,578,760 B1 | 6/2003 | Otto | |
| 6,587,837 B1 | 7/2003 | Spagna | |
| 6,606,117 B1 | 8/2003 | Windle | |
| 6,609,200 B2 | 8/2003 | Anderson | |
| 6,611,598 B1 | 8/2003 | Hayosh | |
| 6,614,930 B1 | 9/2003 | Agnihotri et al. | |
| 6,643,416 B1 | 11/2003 | Daniels | |
| 6,647,136 B2 | 11/2003 | Jones et al. | |
| 6,654,487 B1 | 11/2003 | Downs, Jr. | |
| 6,661,910 B2 | 12/2003 | Jones et al. | |
| 6,669,086 B2 | 12/2003 | Abdi et al. | |
| 6,672,452 B1 | 1/2004 | Alves | |
| 6,682,452 B2 | 1/2004 | Quintus | |
| 6,695,204 B1 | 2/2004 | Stinson | |
| 6,697,091 B1 | 2/2004 | Rzepkowski et al. | |
| 6,711,474 B1 | 3/2004 | Treyz et al. | |
| 6,726,097 B2 | 4/2004 | Graef | |
| 6,728,397 B2 | 4/2004 | McNeal | |
| 6,738,496 B1 | 5/2004 | Hall | |
| 6,738,519 B1 | 5/2004 | Nishiwaki | |
| 6,742,128 B1 | 5/2004 | Joiner | |
| 6,745,186 B1 | 6/2004 | Testa et al. | |
| 6,754,640 B2 | 6/2004 | Bozeman | |
| 6,755,340 B1 | 6/2004 | Voss et al. | |
| 6,760,414 B1 | 7/2004 | Schurko et al. | |
| 6,760,470 B1 | 7/2004 | Bogosian et al. | |
| 6,763,226 B1 | 7/2004 | McZeal | |
| 6,781,962 B1 | 8/2004 | Williams | |
| 6,786,398 B1 | 9/2004 | Stinson et al. | |
| 6,789,054 B1 | 9/2004 | Makhlouf | |
| 6,796,489 B2 | 9/2004 | Slater et al. | |
| 6,796,491 B2 | 9/2004 | Nakajima | |
| 6,806,903 B1 | 10/2004 | Okisu et al. | |
| 6,807,294 B2 | 10/2004 | Yamazaki | |
| 6,813,733 B1 | 11/2004 | Li | |
| 6,829,704 B2 | 12/2004 | Zhang | |
| 6,844,885 B2 | 1/2005 | Anderson | |
| 6,856,965 B1 | 2/2005 | Stinson | |
| 6,863,214 B2 | 3/2005 | Garner et al. | |
| 6,870,947 B2 | 3/2005 | Kelland | |
| 6,873,728 B2 | 3/2005 | Bernstein et al. | |
| 6,883,140 B1 | 4/2005 | Acker | |
| 6,898,314 B2 | 5/2005 | Kung et al. | |
| 6,902,105 B2 | 6/2005 | Koakutsu | |
| 6,910,023 B1 | 6/2005 | Schibi | |
| 6,913,188 B2 | 7/2005 | Wong | |
| 6,922,487 B2 | 7/2005 | Dance et al. | |
| 6,931,255 B2 | 8/2005 | Mekuria | |
| 6,931,591 B1 | 8/2005 | Brown | |
| 6,934,719 B2 | 8/2005 | Nally | |
| 6,947,610 B2 | 9/2005 | Sun | |
| 6,957,770 B1 | 10/2005 | Robinson | |
| 6,961,689 B1 | 11/2005 | Greenberg | |

(56) References Cited

U.S. PATENT DOCUMENTS

| | | |
|---|---|---|
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,027,171 B1 | 4/2006 | Watanabe |
| 7,028,886 B1 | 4/2006 | Maloney |
| 7,039,048 B1 | 5/2006 | Monta |
| 7,046,991 B2 | 5/2006 | Little |
| 7,051,001 B1 | 5/2006 | Slater |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,116,446 B2 | 10/2006 | Maurer |
| 7,117,171 B1 | 10/2006 | Pollin |
| 7,120,461 B2 | 10/2006 | Cho |
| 7,131,571 B2 | 11/2006 | Swift et al. |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 * | 2/2007 | Buchanan ............ G06Q 20/042 235/379 |
| 7,184,980 B2 | 2/2007 | Allen-Rouman et al. |
| 7,185,805 B1 | 3/2007 | McShirley |
| 7,197,173 B2 | 3/2007 | Jones et al. |
| 7,200,255 B2 | 4/2007 | Jones |
| 7,204,412 B2 | 4/2007 | Foss, Jr. |
| 7,207,478 B1 | 4/2007 | Blackson et al. |
| 7,216,106 B1 | 5/2007 | Buchanan |
| 7,219,082 B2 | 5/2007 | Forte |
| 7,219,831 B2 | 5/2007 | Murata |
| 7,240,336 B1 | 7/2007 | Baker |
| 7,245,765 B2 | 7/2007 | Myers et al. |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,277,191 B2 | 10/2007 | Metcalfe et al. |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,331,523 B2 | 2/2008 | Meier et al. |
| 7,336,813 B2 | 2/2008 | Prakash et al. |
| 7,343,320 B1 | 3/2008 | Treyz |
| 7,349,566 B2 | 3/2008 | Jones et al. |
| 7,349,585 B2 | 3/2008 | Li |
| 7,350,697 B2 | 4/2008 | Swift et al. |
| 7,356,505 B2 | 4/2008 | March |
| 7,369,713 B2 | 5/2008 | Suino |
| 7,377,425 B1 | 5/2008 | Ma |
| 7,379,978 B2 | 5/2008 | Anderson |
| 7,383,227 B2 | 6/2008 | Weinflash et al. |
| 7,385,631 B2 | 6/2008 | Maeno |
| 7,386,511 B2 | 6/2008 | Buchanan |
| 7,388,683 B2 | 6/2008 | Rodriguez et al. |
| 7,389,912 B2 | 6/2008 | Starrs |
| 7,391,897 B2 | 6/2008 | Jones et al. |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,419,093 B1 | 9/2008 | Blackson et al. |
| 7,421,107 B2 | 9/2008 | Lugg |
| 7,421,410 B1 | 9/2008 | Schechtman et al. |
| 7,427,016 B2 | 9/2008 | Chimento |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,460,700 B2 | 12/2008 | Tsunachima et al. |
| 7,461,779 B2 | 12/2008 | Ramachandran |
| 7,461,780 B2 | 12/2008 | Potts |
| 7,464,859 B1 | 12/2008 | Hawkins |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Statou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve et al. |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,577,614 B1 | 8/2009 | Warren et al. |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,609,889 B2 | 10/2009 | Guo et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,668,363 B2 | 2/2010 | Price |
| 7,672,022 B1 | 3/2010 | Fan |
| 7,672,940 B2 | 3/2010 | Viola |
| 7,676,409 B1 | 3/2010 | Ahmad |
| 7,680,732 B1 | 3/2010 | Davies et al. |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,714,778 B2 | 5/2010 | Dupray |
| 7,720,735 B2 | 5/2010 | Anderson et al. |
| 7,734,545 B1 | 6/2010 | Fogliano |

(56) References Cited

U.S. PATENT DOCUMENTS

| | | |
|---|---|---|
| 7,743,979 B2 | 6/2010 | Fredman |
| 7,753,268 B1 | 7/2010 | Robinson et al. |
| 7,761,358 B2 | 7/2010 | Craig et al. |
| 7,766,244 B1 | 8/2010 | Field |
| 7,769,650 B2 | 8/2010 | Bleunven |
| 7,778,457 B2 | 8/2010 | Nepomniachtchi et al. |
| 7,792,752 B1 | 9/2010 | Kay |
| 7,792,753 B1 | 9/2010 | Slater et al. |
| 7,810,714 B2 | 10/2010 | Murata |
| 7,812,986 B2 | 10/2010 | Graham et al. |
| 7,818,245 B2 | 10/2010 | Prakash et al. |
| 7,831,458 B2 | 11/2010 | Neumann |
| 7,856,402 B1 | 12/2010 | Kay |
| 7,865,384 B2 | 1/2011 | Anderson et al. |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,895,054 B2 | 2/2011 | Slen et al. |
| 7,896,232 B1 | 3/2011 | Prasad et al. |
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,935,441 B2 | 5/2011 | Tononishi |
| 7,949,587 B1 | 5/2011 | Morris et al. |
| 7,950,698 B2 | 5/2011 | Popadic et al. |
| 7,953,441 B2 | 5/2011 | Lors |
| 7,958,053 B2 | 6/2011 | Stone |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,979,326 B2 | 7/2011 | Kurushima |
| 7,996,312 B1 | 8/2011 | Beck et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 8,060,442 B1 | 11/2011 | Hecht et al. |
| 8,065,307 B2 | 11/2011 | Haslam et al. |
| 8,091,778 B1 | 1/2012 | Block et al. |
| 8,116,533 B2 | 2/2012 | Kiplinger et al. |
| 8,159,520 B1 | 4/2012 | Dhanoa |
| 8,203,640 B2 | 6/2012 | Kim et al. |
| 8,204,293 B2 | 6/2012 | Csulits et al. |
| 8,235,284 B1 | 8/2012 | Prasad et al. |
| 8,266,076 B2 | 9/2012 | Lopez et al. |
| 8,271,385 B2 | 9/2012 | Emerson et al. |
| 8,290,237 B1 | 10/2012 | Burks et al. |
| 8,313,020 B2 | 11/2012 | Ramachandran |
| 8,320,657 B1 | 11/2012 | Burks et al. |
| 8,332,329 B1 | 12/2012 | Thiele |
| 8,341,077 B1 | 12/2012 | Nichols et al. |
| 8,351,677 B1 | 1/2013 | Oakes, III et al. |
| 8,351,678 B1 | 1/2013 | Medina, III |
| 8,358,826 B1 | 1/2013 | Medina et al. |
| 8,364,563 B2 | 1/2013 | Choiniere, Sr. |
| 8,369,650 B2 | 2/2013 | Zanfir et al. |
| 8,374,963 B1 | 2/2013 | Billman |
| 8,391,599 B1 | 3/2013 | Medina, III |
| 8,392,332 B1 | 3/2013 | Oakes, III et al. |
| 8,401,962 B1 | 3/2013 | Bent et al. |
| 8,422,758 B1 | 4/2013 | Bueche, Jr. |
| 8,433,127 B1 | 4/2013 | Harpel et al. |
| 8,433,647 B1 | 4/2013 | Yarbrough |
| 8,452,689 B1 | 5/2013 | Medina, III |
| 8,464,933 B1 | 6/2013 | Prasad et al. |
| 8,538,124 B1 | 9/2013 | Harpel et al. |
| 8,542,921 B1 | 9/2013 | Medina |
| 8,548,267 B1 | 10/2013 | Yacoub et al. |
| 8,559,766 B2 | 10/2013 | Tilt et al. |
| 8,582,862 B2 | 11/2013 | Nepomniachtchi et al. |
| 8,611,635 B1 | 12/2013 | Medina, III |
| 8,660,952 B1 | 2/2014 | Viera et al. |
| 8,699,779 B1 | 4/2014 | Prasad et al. |
| 8,708,227 B1 | 4/2014 | Oakes, III et al. |
| 8,725,607 B2 | 5/2014 | Dunn et al. |
| 8,731,321 B2 | 5/2014 | Fujiwara et al. |
| 8,732,081 B1 | 5/2014 | Oakes, III et al. |
| 8,751,345 B1 | 6/2014 | Borzyche et al. |
| 8,751,356 B1 | 6/2014 | Garcia |
| 8,751,379 B1 | 6/2014 | Bueche, Jr. |
| 8,768,038 B1 | 7/2014 | Sherman et al. |
| 8,799,147 B1 | 8/2014 | Walls et al. |
| 8,818,033 B1 | 8/2014 | Liu |
| 8,837,806 B1 | 9/2014 | Ethington et al. |
| 8,843,405 B1 | 9/2014 | Hartman et al. |
| 8,959,033 B1 | 2/2015 | Oakes, III et al. |
| 8,977,571 B1 | 3/2015 | Bueche, Jr. et al. |
| 8,990,862 B1 | 3/2015 | Smith |
| 9,009,071 B1 | 4/2015 | Watson et al. |
| 9,036,040 B1 | 5/2015 | Danko |
| 9,058,512 B1 | 6/2015 | Medina, III |
| 9,064,284 B1 | 6/2015 | Janiszeski et al. |
| 9,129,340 B1 | 8/2015 | Medina, III et al. |
| 9,159,101 B1 | 10/2015 | Pollack et al. |
| 9,177,197 B1 | 11/2015 | Prasad et al. |
| 9,177,198 B1 | 11/2015 | Prasad et al. |
| 9,224,136 B1 | 12/2015 | Oakes, III et al. |
| 9,286,514 B1 | 3/2016 | Newman |
| 9,311,634 B1 | 4/2016 | Hildebrand |
| 9,336,517 B1 | 5/2016 | Prasad et al. |
| 9,390,339 B1 | 7/2016 | Danko |
| 9,401,011 B2 | 7/2016 | Medina, III et al. |
| 9,424,569 B1 | 8/2016 | Sherman et al. |
| 9,569,756 B1 | 2/2017 | Bueche, Jr. et al. |
| 9,619,872 B1 | 4/2017 | Medina, III et al. |
| 9,626,183 B1 | 4/2017 | Smith et al. |
| 9,626,662 B1 | 4/2017 | Prasad et al. |
| 9,779,392 B1 | 10/2017 | Prasad et al. |
| 9,779,452 B1 | 10/2017 | Medina et al. |
| 9,785,929 B1 | 10/2017 | Watson et al. |
| 9,792,654 B1 | 10/2017 | Limas et al. |
| 9,818,090 B1 | 11/2017 | Bueche, Jr. et al. |
| 9,886,642 B1 | 2/2018 | Danko |
| 9,892,454 B1 | 2/2018 | Pollack et al. |
| 9,898,778 B1 | 2/2018 | Pollack et al. |
| 9,898,808 B1 | 2/2018 | Medina, III et al. |
| 9,904,848 B1 | 2/2018 | Newman |
| 9,946,923 B1 | 4/2018 | Medina |
| 10,013,605 B1 | 7/2018 | Oakes, III et al. |
| 10,013,681 B1 | 7/2018 | Oakes, III et al. |
| 10,181,087 B1 | 1/2019 | Danko |
| 10,235,660 B1 | 3/2019 | Bueche, Jr. et al. |
| 10,574,879 B1 | 2/2020 | Prasad et al. |
| 10,621,559 B1 | 4/2020 | Oakes, III et al. |
| 10,621,660 B1 | 4/2020 | Medina et al. |
| 10,706,466 B1 | 7/2020 | Ethington et al. |
| 10,713,629 B1 | 7/2020 | Medina, III |
| 10,719,815 B1 | 7/2020 | Oakes, III et al. |
| 10,769,598 B1 | 9/2020 | Oakes, III et al. |
| 10,956,879 B1 | 3/2021 | Eidson |
| 11,030,752 B1 | 6/2021 | Backlund |
| 11,042,940 B1 | 6/2021 | Limas |
| 11,042,941 B1 | 6/2021 | Limas |
| 11,062,130 B1 | 7/2021 | Medina, III |
| 11,062,131 B1 | 7/2021 | Medina, III |
| 11,062,283 B1 | 7/2021 | Prasad |
| 11,064,111 B1 | 7/2021 | Prasad |
| 11,068,976 B1 | 7/2021 | Voutour |
| 11,070,868 B1 | 7/2021 | Mortensen |
| 2001/0004235 A1 | 6/2001 | Maloney |
| 2001/0014881 A1 | 8/2001 | Drummond |
| 2001/0016084 A1 | 8/2001 | Pollard et al. |
| 2001/0018739 A1 | 8/2001 | Anderson |
| 2001/0020949 A1 | 9/2001 | Gong et al. |
| 2001/0027994 A1 | 10/2001 | Hayashida |
| 2001/0030695 A1 | 10/2001 | Prabhu et al. |
| 2001/0037299 A1 | 11/2001 | Nichols et al. |
| 2001/0042171 A1 | 11/2001 | Vermeulen |

(56) References Cited

U.S. PATENT DOCUMENTS

| | | |
|---|---|---|
| 2001/0042785 A1 | 11/2001 | Walker |
| 2001/0043748 A1 | 11/2001 | Wesolkowski et al. |
| 2001/0047330 A1 | 11/2001 | Gephart |
| 2001/0051965 A1 | 12/2001 | Guillevic |
| 2001/0054020 A1 | 12/2001 | Barth et al. |
| 2002/0001393 A1 | 1/2002 | Jones |
| 2002/0013767 A1 | 1/2002 | Katz |
| 2002/0016763 A1 | 2/2002 | March |
| 2002/0016769 A1 | 2/2002 | Barbara et al. |
| 2002/0023055 A1 | 2/2002 | Antognini et al. |
| 2002/0025085 A1 | 2/2002 | Gustafson et al. |
| 2002/0026418 A1 | 2/2002 | Koppel et al. |
| 2002/0032656 A1 | 3/2002 | Chen |
| 2002/0038289 A1 | 3/2002 | Lawlor et al. |
| 2002/0040340 A1 | 4/2002 | Yoshida |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107767 A1 | 8/2002 | McClair et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0120582 A1 | 8/2002 | Elston et al. |
| 2002/0120846 A1 | 8/2002 | Stewart et al. |
| 2002/0129249 A1 | 9/2002 | Maillard et al. |
| 2002/0130868 A1 | 9/2002 | Smith |
| 2002/0133409 A1 | 9/2002 | Sawano et al. |
| 2002/0138445 A1 | 9/2002 | Laage et al. |
| 2002/0138522 A1 | 9/2002 | Muralidhar |
| 2002/0145035 A1 | 10/2002 | Jones |
| 2002/0147798 A1 | 10/2002 | Huang |
| 2002/0150279 A1 | 10/2002 | Scott |
| 2002/0150311 A1 | 10/2002 | Lynn |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta et al. |
| 2002/0152170 A1 | 10/2002 | Dutta |
| 2002/0153414 A1 | 10/2002 | Stoutenburg et al. |
| 2002/0154127 A1 | 10/2002 | Vienneau et al. |
| 2002/0154815 A1 | 10/2002 | Mizutani |
| 2002/0159648 A1 | 10/2002 | Alderson et al. |
| 2002/0169715 A1 | 11/2002 | Ruth et al. |
| 2002/0171820 A1 | 11/2002 | Okamura |
| 2002/0172516 A1 | 11/2002 | Aoyama |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0009420 A1 | 1/2003 | Jones |
| 2003/0015583 A1 | 1/2003 | Abdi et al. |
| 2003/0018897 A1 | 1/2003 | Bellis, Jr. et al. |
| 2003/0023557 A1 | 1/2003 | Moore |
| 2003/0026609 A1 | 2/2003 | Parulski |
| 2003/0038227 A1 | 2/2003 | Sesek |
| 2003/0050889 A1 | 3/2003 | Burke |
| 2003/0053692 A1 | 3/2003 | Hong et al. |
| 2003/0055756 A1 | 3/2003 | Allan |
| 2003/0055776 A1 | 3/2003 | Samuelson |
| 2003/0072568 A1 | 4/2003 | Lin et al. |
| 2003/0074315 A1 | 4/2003 | Lam |
| 2003/0075596 A1 | 4/2003 | Koakutsu |
| 2003/0075916 A1 | 4/2003 | Gorski |
| 2003/0078883 A1 | 4/2003 | Stewart et al. |
| 2003/0081824 A1 | 5/2003 | Mennie |
| 2003/0086615 A1 | 5/2003 | Dance et al. |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown et al. |
| 2003/0105714 A1 | 6/2003 | Alarcon-Luther et al. |
| 2003/0126078 A1 | 7/2003 | Vihinen |
| 2003/0126082 A1 | 7/2003 | Omura et al. |
| 2003/0130940 A1 | 7/2003 | Hansen et al. |
| 2003/0130958 A1 | 7/2003 | Narayanan et al. |
| 2003/0132384 A1 | 7/2003 | Sugiyama et al. |
| 2003/0133608 A1 | 7/2003 | Bernstein et al. |
| 2003/0133610 A1 | 7/2003 | Nagarajan et al. |
| 2003/0135457 A1 | 7/2003 | Stewart et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0177448 A1 | 9/2003 | Levine et al. |
| 2003/0187790 A1 | 10/2003 | Swift et al. |
| 2003/0191615 A1 | 10/2003 | Bailey |
| 2003/0191869 A1 | 10/2003 | Williams |
| 2003/0200107 A1 | 10/2003 | Allen et al. |
| 2003/0200174 A1 | 10/2003 | Star |
| 2003/0202690 A1 | 10/2003 | Jones et al. |
| 2003/0212904 A1 | 11/2003 | Randle et al. |
| 2003/0217005 A1 | 11/2003 | Drummond et al. |
| 2003/0218061 A1 | 11/2003 | Filatov |
| 2003/0225705 A1 | 12/2003 | Park et al. |
| 2003/0231285 A1 | 12/2003 | Ferguson |
| 2003/0233278 A1 | 12/2003 | Marshall |
| 2003/0233318 A1 | 12/2003 | King et al. |
| 2004/0010466 A1 | 1/2004 | Anderson |
| 2004/0010803 A1* | 1/2004 | Berstis .................. H04N 7/185 725/105 |
| 2004/0012496 A1 | 1/2004 | De Souza |
| 2004/0013284 A1 | 1/2004 | Yu |
| 2004/0017482 A1 | 1/2004 | Weitman |
| 2004/0024626 A1 | 2/2004 | Bruijning |
| 2004/0024708 A1 | 2/2004 | Masuda |
| 2004/0029591 A1 | 2/2004 | Chapman et al. |
| 2004/0030741 A1 | 2/2004 | Welton et al. |
| 2004/0044606 A1 | 3/2004 | Buttridge et al. |
| 2004/0057697 A1 | 3/2004 | Renzi |
| 2004/0058705 A1 | 3/2004 | Morgan |
| 2004/0061913 A1 | 4/2004 | Takiguchi |
| 2004/0066031 A1 | 4/2004 | Wong |
| 2004/0066419 A1 | 4/2004 | Pyhalammi |
| 2004/0069841 A1 | 4/2004 | Wong |
| 2004/0071333 A1 | 4/2004 | Douglas et al. |
| 2004/0075754 A1 | 4/2004 | Nakajima et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0111371 A1 | 6/2004 | Friedman |
| 2004/0117302 A1 | 6/2004 | Weichert |
| 2004/0122754 A1 | 6/2004 | Stevens |
| 2004/0133511 A1 | 7/2004 | Smith et al. |
| 2004/0133516 A1 | 7/2004 | Buchanan et al. |
| 2004/0138974 A1 | 7/2004 | Shimamura |
| 2004/0148235 A1 | 7/2004 | Craig et al. |
| 2004/0158549 A1 | 8/2004 | Matena |
| 2004/0165096 A1 | 8/2004 | Maeno |
| 2004/0170259 A1 | 9/2004 | Park |
| 2004/0171371 A1 | 9/2004 | Paul |
| 2004/0184766 A1 | 9/2004 | Kim et al. |
| 2004/0201695 A1* | 10/2004 | Inasaka .................. H04N 5/77 348/207.99 |
| 2004/0201741 A1 | 10/2004 | Ban |
| 2004/0205459 A1 | 10/2004 | Green |
| 2004/0210515 A1 | 10/2004 | Hughes |
| 2004/0210523 A1 | 10/2004 | Gains et al. |
| 2004/0217170 A1 | 11/2004 | Takiguchi et al. |
| 2004/0225604 A1 | 11/2004 | Foss, Jr. et al. |
| 2004/0228277 A1 | 11/2004 | Williams |

(56) References Cited

U.S. PATENT DOCUMENTS

| | | |
|---|---|---|
| 2004/0236647 A1 | 11/2004 | Acharya |
| 2004/0236688 A1 | 11/2004 | Bozeman |
| 2004/0238619 A1 | 12/2004 | Nagasaka et al. |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267665 A1 | 12/2004 | Nam et al. |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0015332 A1 | 1/2005 | Chen |
| 2005/0015342 A1 | 1/2005 | Murata et al. |
| 2005/0021466 A1 | 1/2005 | Buchanan et al. |
| 2005/0030388 A1 | 2/2005 | Stavely et al. |
| 2005/0033645 A1 | 2/2005 | Duphily |
| 2005/0033685 A1 | 2/2005 | Reyes |
| 2005/0033690 A1 | 2/2005 | Antognini et al. |
| 2005/0033695 A1 | 2/2005 | Minowa |
| 2005/0034046 A1 | 2/2005 | Berkmann |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071260 A1 | 3/2005 | Sellen et al. |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0077351 A1 | 4/2005 | De Jong |
| 2005/0078336 A1 | 4/2005 | Ferlitsch |
| 2005/0080725 A1 | 4/2005 | Pick |
| 2005/0080738 A1 | 4/2005 | Sellen et al. |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0089209 A1 | 4/2005 | Stefanuk |
| 2005/0091132 A1 | 4/2005 | Phillips et al. |
| 2005/0091161 A1 | 4/2005 | Gustin |
| 2005/0096992 A1 | 5/2005 | Geisei |
| 2005/0097019 A1 | 5/2005 | Jacobs |
| 2005/0097046 A1 | 5/2005 | Singfield |
| 2005/0097050 A1 | 5/2005 | Orcutt |
| 2005/0100216 A1 | 5/2005 | Myers et al. |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0143136 A1 | 6/2005 | Lev et al. |
| 2005/0144131 A1 | 6/2005 | Aziz |
| 2005/0149436 A1 | 7/2005 | Elterich |
| 2005/0157174 A1 | 7/2005 | Kitamura et al. |
| 2005/0017751 A1 | 8/2005 | Hilt et al. |
| 2005/0168566 A1 | 8/2005 | Tada |
| 2005/0171899 A1 | 8/2005 | Dunn |
| 2005/0171907 A1 | 8/2005 | Lewis |
| 2005/0177494 A1 | 8/2005 | Kelly et al. |
| 2005/0177499 A1 | 8/2005 | Thomas |
| 2005/0177518 A1 | 8/2005 | Brown |
| 2005/0182710 A1 | 8/2005 | Anderson |
| 2005/0188306 A1 | 8/2005 | Mackenzie |
| 2005/0203430 A1 | 9/2005 | Williams et al. |
| 2005/0205660 A1 | 9/2005 | Munte |
| 2005/0205661 A1 | 9/2005 | Taylor |
| 2005/0209961 A1 | 9/2005 | Michelsen |
| 2005/0213805 A1 | 9/2005 | Blake et al. |
| 2005/0216410 A1 | 9/2005 | Davis et al. |
| 2005/0218209 A1 | 10/2005 | Heilper et al. |
| 2005/0220324 A1 | 10/2005 | Klein et al. |
| 2005/0228733 A1 | 10/2005 | Bent et al. |
| 2005/0238257 A1 | 10/2005 | Kaneda et al. |
| 2005/0244035 A1 | 11/2005 | Klein et al. |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |
| 2005/0289059 A1 | 12/2005 | Brewington et al. |
| 2005/0289182 A1 | 12/2005 | Pandian et al. |
| 2006/0002426 A1 | 1/2006 | Madour |
| 2006/0004660 A1 | 1/2006 | Pranger |
| 2006/0015450 A1 | 1/2006 | Guck et al. |
| 2006/0015733 A1 | 1/2006 | O'Malley et al. |
| 2006/0017752 A1 | 1/2006 | Kurzweil et al. |
| 2006/0025697 A1 | 2/2006 | Kurzweil |
| 2006/0039628 A1 | 2/2006 | Li et al. |
| 2006/0039629 A1 | 2/2006 | Li et al. |
| 2006/0041506 A1 | 2/2006 | Mason et al. |
| 2006/0045321 A1 | 3/2006 | Yu |
| 2006/0045374 A1 | 3/2006 | Kim et al. |
| 2006/0045379 A1 | 3/2006 | Heaney, Jr. et al. |
| 2006/0047593 A1 | 3/2006 | Naratil |
| 2006/0049242 A1 | 3/2006 | Mejias et al. |
| 2006/0053056 A1 | 3/2006 | Alspach-Goss |
| 2006/0059085 A1 | 3/2006 | Tucker |
| 2006/0064368 A1 | 3/2006 | Forte |
| 2006/0077941 A1 | 4/2006 | Alagappan et al. |
| 2006/0080245 A1 | 4/2006 | Bahl |
| 2006/0085357 A1 | 4/2006 | Pizarro |
| 2006/0085516 A1 | 4/2006 | Farr et al. |
| 2006/0102704 A1 | 5/2006 | Reynders |
| 2006/0103893 A1 | 5/2006 | Azimi et al. |
| 2006/0106691 A1 | 5/2006 | Sheaffer |
| 2006/0106717 A1 | 5/2006 | Randle |
| 2006/0108168 A1 | 5/2006 | Fischer et al. |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu et al. |
| 2006/0118613 A1 | 6/2006 | McMann |
| 2006/0124730 A1 | 6/2006 | Maloney |
| 2006/0144924 A1 | 7/2006 | Stover |
| 2006/0144937 A1 | 7/2006 | Heilper et al. |
| 2006/0144950 A1 | 7/2006 | Johnson |
| 2006/0159367 A1 | 7/2006 | Zeineh et al. |
| 2006/0161499 A1 | 7/2006 | Rich et al. |
| 2006/0161501 A1 | 7/2006 | Waserstein |
| 2006/0164682 A1 | 7/2006 | Lev |
| 2006/0166178 A1 | 7/2006 | Driedijk |
| 2006/0167818 A1 | 7/2006 | Wentker et al. |
| 2006/0181614 A1 | 8/2006 | Yen et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0202014 A1 | 9/2006 | VanKirk et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0212393 A1 | 9/2006 | Brown |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0229987 A1 | 10/2006 | Leekley |
| 2006/0238503 A1 | 10/2006 | Smith |
| 2006/0242062 A1 | 10/2006 | Peterson |
| 2006/0242063 A1 | 10/2006 | Peterson |
| 2006/0248009 A1 | 11/2006 | Hicks et al. |
| 2006/0249567 A1 | 11/2006 | Byrne |
| 2006/0255124 A1 | 11/2006 | Hoch |

(56) References Cited

U.S. PATENT DOCUMENTS

| | | |
|---|---|---|
| 2006/0273165 A1 | 12/2006 | Swift et al. |
| 2006/0274164 A1 | 12/2006 | Kimura et al. |
| 2006/0279628 A1 | 12/2006 | Fleming |
| 2006/0282383 A1 | 12/2006 | Doran |
| 2006/0289630 A1 | 12/2006 | Updike et al. |
| 2006/0291744 A1 | 12/2006 | Ikeda et al. |
| 2007/0002157 A1 | 1/2007 | Shintani et al. |
| 2007/0005467 A1 | 1/2007 | Haigh et al. |
| 2007/0013721 A1 | 1/2007 | Vau et al. |
| 2007/0016796 A1 | 1/2007 | Singhal |
| 2007/0019243 A1 | 1/2007 | Sato |
| 2007/0027802 A1 | 2/2007 | VanDeburg et al. |
| 2007/0030357 A1 | 2/2007 | Levien et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0094140 A1 | 4/2007 | Riney et al. |
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0124241 A1 | 5/2007 | Newton |
| 2007/0127805 A1 | 6/2007 | Foth et al. |
| 2007/0129955 A1 | 6/2007 | Dalmia |
| 2007/0130063 A1 | 6/2007 | Jindia |
| 2007/0131758 A1 | 6/2007 | Mejias et al. |
| 2007/0136198 A1 | 6/2007 | Foth et al. |
| 2007/0138255 A1 | 6/2007 | Carreon et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0154098 A1 | 7/2007 | Geva et al. |
| 2007/0156438 A1 | 7/2007 | Popadic et al. |
| 2007/0168265 A1 | 7/2007 | Rosenberger |
| 2007/0168283 A1 | 7/2007 | Alvarez et al. |
| 2007/0171288 A1 | 7/2007 | Inoue |
| 2007/0172107 A1 | 7/2007 | Jones et al. |
| 2007/0172148 A1 | 7/2007 | Hawley |
| 2007/0175977 A1 | 8/2007 | Bauer et al. |
| 2007/0179883 A1 | 8/2007 | Questembert |
| 2007/0183000 A1 | 8/2007 | Eisen et al. |
| 2007/0183652 A1 | 8/2007 | Backstrom et al. |
| 2007/0183741 A1 | 8/2007 | Lerman et al. |
| 2007/0194102 A1 | 8/2007 | Cohen |
| 2007/0198432 A1 | 8/2007 | Pitroda et al. |
| 2007/0203708 A1 | 8/2007 | Polycn et al. |
| 2007/0206877 A1 | 9/2007 | Wu et al. |
| 2007/0208816 A1 | 9/2007 | Baldwin et al. |
| 2007/0214086 A1 | 9/2007 | Homoki |
| 2007/0217669 A1 | 9/2007 | Swift et al. |
| 2007/0233525 A1 | 10/2007 | Boyle |
| 2007/0233585 A1 | 10/2007 | Ben Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0262137 A1 | 11/2007 | Brown |
| 2007/0262148 A1 | 11/2007 | Yoon |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0010204 A1 | 1/2008 | Rackley, III et al. |
| 2008/0021802 A1 | 1/2008 | Pendelton |
| 2008/0040280 A1 | 2/2008 | Davis et al. |
| 2008/0046362 A1 | 2/2008 | Easterly |
| 2008/0052182 A1 | 2/2008 | Marshall |
| 2008/0059376 A1 | 3/2008 | Davis |
| 2008/0063253 A1 | 3/2008 | Wood |
| 2008/0065524 A1 | 3/2008 | Matthews et al. |
| 2008/0068674 A1 | 3/2008 | McIntyre |
| 2008/0069427 A1 | 3/2008 | Liu |
| 2008/0071679 A1 | 3/2008 | Foley |
| 2008/0071721 A1 | 3/2008 | Wang |
| 2008/0073423 A1 | 3/2008 | Heit et al. |
| 2008/0080760 A1 | 4/2008 | Ronca |
| 2008/0086421 A1 | 4/2008 | Gilder |
| 2008/0086770 A1 | 4/2008 | Kulkarni et al. |
| 2008/0091599 A1 | 4/2008 | Foss, Jr. |
| 2008/0097899 A1 | 4/2008 | Jackson et al. |
| 2008/0097907 A1 | 4/2008 | Till et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0115066 A1 | 5/2008 | Pavley et al. |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0140552 A1 | 6/2008 | Blaikie |
| 2008/0147549 A1 | 6/2008 | Ruthbun |
| 2008/0155672 A1 | 6/2008 | Sharma |
| 2008/0156438 A1 | 7/2008 | Stumphauzer et al. |
| 2008/0162319 A1 | 7/2008 | Breeden et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0205751 A1 | 8/2008 | Mischler |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder et al. |
| 2008/0249951 A1 | 10/2008 | Gilder et al. |
| 2008/0262950 A1 | 10/2008 | Christensen et al. |
| 2008/0262953 A1 | 10/2008 | Anderson |
| 2008/0275821 A1 | 11/2008 | Bishop et al. |
| 2008/0301441 A1 | 12/2008 | Calman et al. |
| 2008/0304769 A1 | 12/2008 | Hollander et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Inokuchi |
| 2009/0076921 A1 | 3/2009 | Nelson et al. |
| 2009/0094148 A1 | 4/2009 | Gilder et al. |
| 2009/0108080 A1 | 4/2009 | Meyer |
| 2009/0110281 A1 | 4/2009 | Hirabayashi |
| 2009/0114716 A1 | 5/2009 | Ramachandran |
| 2009/0141962 A1 | 6/2009 | Borgia et al. |
| 2009/0164350 A1 | 6/2009 | Sorbe et al. |
| 2009/0164370 A1 | 6/2009 | Sorbe et al. |
| 2009/0166406 A1 | 7/2009 | Pigg et al. |

(56) References Cited

U.S. PATENT DOCUMENTS

| | | |
|---|---|---|
| 2009/0167870 A1 | 7/2009 | Caleca et al. |
| 2009/0171795 A1 | 7/2009 | Clouthier et al. |
| 2009/0171819 A1 | 7/2009 | Emde et al. |
| 2009/0171825 A1 | 7/2009 | Roman |
| 2009/0173781 A1 | 7/2009 | Ramachadran |
| 2009/0185241 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0190823 A1 | 7/2009 | Walters |
| 2009/0192938 A1 | 7/2009 | Amos |
| 2009/0212929 A1 | 8/2009 | Drory et al. |
| 2009/0236413 A1 | 9/2009 | Mueller et al. |
| 2009/0240620 A1 | 9/2009 | Kendrick et al. |
| 2009/0252437 A1 | 10/2009 | Li |
| 2009/0254447 A1 | 10/2009 | Blades |
| 2009/0257641 A1 | 10/2009 | Liu et al. |
| 2009/0263019 A1 | 10/2009 | Tzadok et al. |
| 2009/0271287 A1 | 10/2009 | Halpern |
| 2009/0281904 A1 | 11/2009 | Pharris |
| 2009/0284637 A1 | 11/2009 | Parulski et al. |
| 2009/0290751 A1 | 11/2009 | Ferman et al. |
| 2009/0292628 A1 | 11/2009 | Dryer et al. |
| 2009/0313167 A1 | 12/2009 | Duiari et al. |
| 2009/0319425 A1 | 12/2009 | Tumminaro et al. |
| 2009/0327129 A1 | 12/2009 | Collas et al. |
| 2010/0007899 A1 | 1/2010 | Lay |
| 2010/0008579 A1 | 1/2010 | Smirnov |
| 2010/0027679 A1 | 2/2010 | Sunahara et al. |
| 2010/0030687 A1 | 2/2010 | Panthaki et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0078471 A1 | 4/2010 | Lin et al. |
| 2010/0078472 A1 | 4/2010 | Lin et al. |
| 2010/0082468 A1 | 4/2010 | Low et al. |
| 2010/0082470 A1 | 4/2010 | Walach |
| 2010/0128131 A1 | 5/2010 | Tenchio et al. |
| 2010/0165015 A1 | 7/2010 | Barkley et al. |
| 2010/0198733 A1 | 8/2010 | Gantman et al. |
| 2010/0225773 A1 | 9/2010 | Lee |
| 2010/0226559 A1 | 9/2010 | Naiari et al. |
| 2010/0260408 A1 | 10/2010 | Prakash et al. |
| 2010/0262522 A1 | 10/2010 | Anderson et al. |
| 2010/0274693 A1 | 10/2010 | Bause et al. |
| 2010/0312705 A1 | 12/2010 | Caruso et al. |
| 2011/0016084 A1 | 1/2011 | Mundy et al. |
| 2011/0069180 A1 | 3/2011 | Niiemcevic et al. |
| 2011/0106675 A1 | 5/2011 | Perlman |
| 2011/0112967 A1 | 5/2011 | Anderson et al. |
| 2011/0170740 A1 | 7/2011 | Coleman |
| 2011/0191161 A1 | 8/2011 | Dai |
| 2011/0251956 A1 | 10/2011 | Cantley et al. |
| 2011/0280450 A1 | 11/2011 | Nepomniachtchi et al. |
| 2011/0285874 A1 | 11/2011 | Showering et al. |
| 2011/0310442 A1 | 12/2011 | Popadic et al. |
| 2012/0045112 A1 | 2/2012 | Lundblad et al. |
| 2012/0047070 A1 | 2/2012 | Pharris |
| 2012/0062732 A1 | 3/2012 | Marman et al. |
| 2012/0089514 A1 | 4/2012 | Kraemling et al. |
| 2012/0099792 A1 | 4/2012 | Chevion et al. |
| 2012/0185383 A1 | 7/2012 | Atsmon |
| 2012/0185388 A1 | 7/2012 | Pranger |
| 2012/0229872 A1 | 9/2012 | Dolev |
| 2013/0021651 A9 | 1/2013 | Popadic et al. |
| 2013/0120595 A1 | 5/2013 | Roach et al. |
| 2013/0155474 A1 | 6/2013 | Roach et al. |
| 2013/0198071 A1 | 8/2013 | Jurss |
| 2013/0201534 A1 | 8/2013 | Carlen |
| 2013/0223721 A1 | 8/2013 | Nepomniachtchi et al. |
| 2013/0297353 A1 | 11/2013 | Strange |
| 2014/0032406 A1 | 1/2014 | Roach et al. |
| 2014/0067661 A1 | 3/2014 | Elischer |
| 2014/0236820 A1 | 8/2014 | Carlton et al. |
| 2014/0279453 A1 | 9/2014 | Belchee et al. |
| 2015/0039528 A1 | 2/2015 | Minogue et al. |
| 2015/0090782 A1 | 4/2015 | Dent |

FOREIGN PATENT DOCUMENTS

| | | |
|---|---|---|
| EP | 0984410 | 3/2000 |
| JP | 2004-23158 A | 1/2004 |
| JP | 2006-174105 A | 6/2006 |
| KR | 20040076131 A | 8/2004 |
| WO | WO 98/37655 A1 | 8/1998 |
| WO | WO 01/61436 | 8/2001 |
| WO | WO 01/61436 A2 | 8/2001 |
| WO | WO 2004/008350 A1 | 1/2004 |
| WO | WO 2005/043857 | 5/2005 |
| WO | WO 2005/124657 A1 | 12/2005 |
| WO | WO 2006/075967 A1 | 7/2006 |
| WO | WO 2006/086768 A2 | 8/2006 |
| WO | WO 2006/136958 A2 | 12/2006 |

OTHER PUBLICATIONS

X9.100-180, "The New ICL Standard is Published", *All My Papers*, 2006, 3 pgs.

X9.37 Specifications | X9Ware LLC, dated 2018, 3 pgs.

"Getting Started with ICLs aka X9.37 Files", *All My Papers*, May 2, 2006, 39 pgs.

Federal Reserve Banks Plan Black-and-White Image Standard and Quality Checks, May 2004, 2 pgs.

Caplan, J. et al., Most Influential Gadgets and Gizmos 2002: Sanyo SCP-5300, 2002, 1 pg.

Hill, S., "From J-Phone to Lumina 1020: A complete history of the camera phone", *Digital Trends*, 2020, 9 pgs.

Hoffman, J., "Before there Were Smartphones, There was I-Mode", 1999, 5 pgs.

"Vodafane calls on mobiles to go live!", 2002, 8 pgs.

"Sprint PCS Vision Guide", 2005, 86 pgs.

FDIC—Remote Capture: A Primer, 2009, 3 pgs.

Callaham, J., "The first camera phone was sold 20 years ago, and it's not what you expect", *Android Authority*, 2019, 5 pgs.

Fujisawa, H. et al., "Information Capturing Camera and Developmental Issues", *IEEE Xplore*, downloaded on Aug. 18, 2020, 4 pgs.

Rohs, M. et al., "A Conceptual Framework for Camera Phone-based Interaction Techniques", in Pervasive Computing, Berlin Heidelberg, 2005, pp. 171-189.

Koga, M. et al., Camera-based Kanji OCR for Mobile-phones: Practical Issues, *IEEE*, 2005, 5 pgs.

Parikh, T., "Using Mobile Phones for Secure, Distributed Document Processing in the Developing World", *IEE Persuasive Computing*, vol. 4, No. 2, 2005, 9 pgs.

Parikh, T., "Mobile Phones and Paper Documents: Evaluating a New Approach for Capturing Microfinance Data in Rural India", *CHI 2006 Proceedings*, 2006, 10 pgs.

Magid, L., "A baby girl and the camera phone were born 20 years ago", *Mercury News*, 2017, 3 pgs.

Liang, J. et al., "Camera-based analysis of text and documents: a survey", *IJDAR*, vol. 7, 2005, pp. 84-104, 21, pgs.

Gutierrez, L., "Innovation: From Campus to Startup", *Business Watch*, 2008, 2 pgs.

Doermann, D. et al., "The function of documents", *Image and Vision Computing*, vol. 16, 1998, pp. 799-814.

Mirmehdi, M. et al., "Towards Optimal Zoom for Automatic Target Recognition", in Proceedings of the Scandinavian Conference on Image Analysis, 1:447-454, 1997, 7 pgs.

Mirmehdi, M. et al., "Extracting Low Resolution Text with an Active Camera for OCR", in Proccedings of the IX Spanish Symposium on Pattern Recognition and Image Processing (pp. 43-48), 2001, 6 pgs.

Zandifar, A. et al., "A Video Based Interface to Textual Information for the Visually Impaired", *IEEE 17th International Symposium on Personal, Indoor and Mobile Radio Communications*, 1-5, 2002, 6 pgs.

(56) References Cited

OTHER PUBLICATIONS

Laine, M. et al., "A Standalone OCR System for Mobile Cameraphones", *IEEE*, 2006, 5 pgs.
Federal Reserve Banks to Adopt DSTU X9.37-2003 Format for Check 21 Image Services, 2004, 2 pgs.
Dhandra, B.V et al., "Skew Detection in Binary Image Documents Based on Image Dilation and Region labeling Approach", *IEEE*, The 18th International Conference on pattern Recognition (ICPR'06), 2006, 4 pgs.
PNC Bank to Offer Ease of Online Deposit Service Integrated with QuickBooks to Small Business, RemoteDepositCapture.com, Jul. 24, 2006, 2 pgs.
12 CRF § 229.51 and Appendix D to Part 229 (1-1-05 edition), 3 pgs.
149 Cong. Rec. H0290, Oct. 8, 2003, 6 pgs.
"Accept "Customer Not Present" Checks," Accept Check Online, http://checksoftware.com, Cited in U.S. Pat. No. 7,900,822, as dated 2007 (1 pg).
*Apple Accounced the New iPhone 3Gs—The Fastest, Most Powerful iPhone Yet*, Jun. 8, 2009, located on the Internet at: http://www.apple.com.rensroom/2009/06/08Apple-Annpounces-the-New-iPhone-3GS-The Fastest-Most-Powerful-iPhone-Yet, 4 pgs.
Apple Reinvents the Phone with iPhone, Jan. 2007, located on the Internet at: https://www.apple.com/newsroom/2007/01/09Apple-Reinvents-the-Phone-with-iPhone/, 4 pgs.
Askey, *Canon EOS 40D Review*(pts. 1,4,10), Digital Photography Review, located on the Internet at: : https://www.dpreview.com/reviews/canoneos40d, 24 pgs.
Askey, *Leica Digilux 2 Review* (pts. 1,3,7), Digital Photography Review, May 20, 2004, located on the Internet at: : https://www.dpreview.com/reviews/leicadigilux2, 20 pgs.
Askey, Nikon D300 In-depth Review (pts. 1,3,9), Digital Photography Review, Mar. 12, 2008, located on the Internet at: : https://www.preview.com/reviews/nikond300, 24 pgs.
Askey, *Panasonic Lumix DMC-L1 Review* (pts. 1,3,7), Digital Photography Review, Apr. 11, 2007, located on the Internet at: https://www.dpreview.com/reviews/panasonicdmc11, 24 pgs.
Askey, *Sony Cyber-shot DSC-R1 Review* (pts, 1,3,7) Digital Photography Review, Dec. 6, 2005, located on the Internet at: http://www.dpreview.com/reviews/sonydscr1, 24 pgs.
*Automated Clearing Houses* (ACHs), Federal Reserve Bank of New York (May 2000) available at: https://www.newyorkfed.org/aboutthefed/fedpoint/fed31.html, (attached as Exhibit 12 from the Defendant Wells Fargo Bank, N.A.'s Answer dated Aug. 14, 2018), 4 pgs.
"Adjusting Brightness and Contrast", www.eaglesoftware.com/adjustin.htm, retrieved on May 4, 2009 (4 pgs).
Berman, *How Hitchcock Turned a Small Budget Into a Great Triumph*, Time.com, Apr. 29, 2015, located on the Internet at: http://time.com/3823112/alfred-hitchcock-shadow-of-a-doubt, 1 pg.
"Best practices for producing quality digital image files," Digital Images Guidelines, http://deepblue.lib.umich.edu/bitstream/2027.42/40247/1/Images-Best_Practice.pdf, downloaded 2007 (2 pgs).
*Big Red Book*, Adobe Systems Incorporated, copyright 2000, (attached as Exhibit 27 from the Defendant Wells Fargo Bank, N.A.'s Answer dated Aug. 14, 2018), 45 pgs.
Canon EOD 40D Digital Camera Instruction Manual, located on the Internet at: http://gdlp01.c-wss.com/gds/6/0900008236/01/EOS40D_HG_EN.pdf (attached as Exhibit 6 from the Defendant Wells Fargo Bank, N.A.'s Answer dated Aug. 14, 2018), 38 pgs.
"Chapter 7 Payroll Programs," Uniform Staff Payroll System, http://www2.oecn.k12.oh.us/www/ssdt/usps/usps_user_guide_005.html, Cited in U.S. Pat. No. 7,900,822, as dated 2007 (9 pgs).
"Check 21—The check is not in the post", RedTitan Technology 2004 http://www.redtitan.com/check21/htm (3 pgs).
"Check 21 Solutions," Columbia Financial International, Inc. http://www.columbiafinancial.us/check21/solutions.htm, Cited in U.S. Pat. No. 7,900,822, as dated 2007 (8 pgs).
Check Clearing for the 21st Century Act Foundation for Check 21 Compliance Training, Federal Financial Institutions Examination Council, (Oct. 16, 2004), available on the Internet at: https://web.archive.org/web/20041016100648/https://www.ffiec.gov/exam/check21/check21foundationdoc.htm, (excerpts attached as Exhibit 20 from the Defendant Wells Fargo Bank, N.A.'s Answer dated Aug. 14, 2018),11 pgs.
"Check Fraud: A Guide to Avoiding Losses", All Net, http://all.net/books/audit/checkfraud/security.htm, Cited in U.S. Pat. No. 7,900,822, as dated 2007 (1 pg).
Chen, Brian et al., *iPhone 3GS Trounces Predecessors, Rivals in Web Browser Speed Test*, Wired, Jun. 24, 2009, located on the Internet at: www.wired.com/2009.3gs-speed/, 10 pgs.
"Clearing House Electronic Check Clearing System (CHECCS) Operating Rules," An IP.com Prior Art Database Technical Disclosure, Jul. 29, 2015 (35 pgs).
"Compliance with Regulation CC", http./www/federalreserve.gov/Pubs/regcc/regcc.htm, Jan. 24, 2006 (6 pgs).
"Customer Personalized Bank Checks and Address Labels" Checks Your Way Inc., http://www.checksyourway.com/htm/web_pages/faq.htm, Cited in U.S. Pat. No. 7,900,822, as dated 2007 (6 pgs).
Defendant Wells Fargo Bank, N.A.'s Answer, Affirmative Defenses, and Counterclaims to Plaintiff's Complaint, dated Aug. 14, 2018, 64 pgs.
Declaration of Peter Alexander, Ph.D., CBM2019-0004, Nov. 8, 2018, 180 pgs.
"Deposit Now: Quick Start User Guide," BankServ, 2007, 29 pages.
"Direct Deposit Application for Payroll", Purdue University, Business Office Form 0003, http://purdue.edu/payroll/pdf/directdepositapplication.pdf, Jul. 2007 (2 pgs).
"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, Cited in U.S. Pat. No. 7,900,822, as dated 2007 (3 pgs).
"Electronic Billing Problem: The E-check is in the mail" American Banker—vol. 168, No. 95, May 19, 2003 (4 pgs).
Excerpts from American National Standard for Financial Services, ANS, X9.100-140-2004—Specifications for an Image Replacement Document—IRD, Oct. 1, 2004, 16 pgs.
"First Wireless Handheld Check and Credit Card Processing Solution Launched by Commericant®, MobileScape® 5000 Eliminates Bounced Checks, Enables Payments Everywhere," Business Wire, Mar. 13, 2016, 3 pages.
"Frequently Asked Questions" Bank of America, http://www/bankofamerica.com/deposits/checksave/index.cfm?template-lc_faq_bymail, Cited in U.S. Pat. No. 7,900,822, as dated 2007 (2 pgs).
"Full Service Direct Deposit", www.nonprofitstaffing.com/images/upload/dirdepform.pdf. Cited in U.S. Pat. No. 7,900,822, as dated 2001, (2 pgs).
Gates, *A History of Wireless Standards, Wi-Fi Back to Basics*, Aerohive Blog, Jul. 2015, located on the Internet at: http://blog.aerohive.com/a-history-of-wireless-standards, 5 pgs.
*Guidelines for Evaluation of Radio Transmission Technologies for IMT-2000*, dated 1997, ITU-R-M.1225, located on the Internet at: https://www.itu.int/dmspubrec/itu-r/rec/m/R-REC-M,1225-0-199702-I!!PDF-E.pdf, 60 pgs.
Helio Ocean User Manual, located on the Internet at: https://standupwireless.com/wp-content/uploads/2017/04/Manual_PAN-TECH_OCEAN.pdf (excerpts attached as Exhibit 10 from the Defendant Wells Fargo Bank, N.A.'s Answer dated Aug. 14, 2018), 76 pgs.
"How to Digitally Deposit a Check Image", Smart Money Daily, Copyright 2008 (5 pgs).
HTC Touch Diamond Manual, copyright 2008, (attached as Exhibit 11 from the Defendant Wells Fargo Bank, N.A.'s Answer dated Aug. 14, 2018), 257 pgs.
Humphrey, David B. and Hunt, Robert, "*Getting Rid of Paper: Savings From Check 21*", Working Paper No. 12-12, Research Department, Federal Reserve Bank of Philadelphia, (May 2012), available on the Internet at: https://philadelphiafed.org/-/media/research-and-data/publications/working-papers/2012/wp12-12.pdf, (attached as Exhibit 14 from the Defendant Wells Fargo Bank, N.A.'s Answer dated Aug. 14, 2018), 29 pgs.
"ImageNet Mobile Deposit Provides Convenient Check Deposit and Bill Pay to Mobile Consumers," Miteksystems, 2008 (2 pgs).

(56) References Cited

OTHER PUBLICATIONS

*IPhone Store Downloads Top 10 Million in First Weekend*, Jul. 14, 2008, located on the Internet at: iPhone Store Downloads Top 10 Million in First Weekend, Jul. 14, 2008, located on the Internet at: https://www.apple.com/newsroom/2008/07/14iPhone-App-Store-Downloads-Top-10-Million-in-First-Weekend, 4pgs.
"It's the easiest way to Switch banks", LNB, http://www.inbky.com/pdf/LNBswitch-kit10-07.pdf Cited in U.S. Pat. No. 7,996,316, as dated 2007 (7 pgs).
Joinson et al., *Olympus E-30 Review* (pts. 1,4,8), Digital Photography Review, Mar. 24, 2009, located on the Internet at: www.dpreview.com/reviews/olympus30, 26 pgs.
Knerr et al., *The A2iA Intercheque System: Courtesy Amount and Legal Amount Recognition for French Checks in Automated Bankcheck Processing 43-86*, Impedove et al. eds., 1997, 50 pgs.
Lacker, Jeffrey M., "*Payment System Disruptions and the Federal Reserve Following September 11, 2001*", The Federal Reserve Bank of Richmond, (Dec. 23, 2003) (attached as Exhibit 19 from the Defendant Wells Fargo Bank, N.A.'s Answer dated Aug. 14, 2018), 55 pgs.
LEICA DIGILUX 2 Instructions located on the Internet: http://www.overgaard.dk/pdf/d2_manual.pdf (attached as Exhibit 2 from the Defendant Wells Fargo Bank N.A.'s Answer dated Aug. 14, 2018), 95 pgs.
"Lesson 38—More Bank Transactions", Turtle Soft, http://www.turtlesoft.com/goldenseal-software-manual.lesson38.htm, Cited in U.S. Pat. No. 7,900,822, as dated 2007 (8 pgs).
"Machine Accepts Bank Deposits", *New York Times*, Apr. 12, 1961, 1 pg.
MacKenzie, E., *Photography Made Easy*, copyright 1845, 80 pgs.
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.corn/cgi-bin/stories/pl?ACCT=104 &STORY=/www/story/10-01- . . . , Nov. 25, 2008 (2 pgs).
Motorola RAZR MAXX V6 User Manual, located on the Internet at: https://www.phonearena.com/phones/Motorola-RAZR-MAXX-V6_id1680, (attached as Exhibit 7 from the Defendant Wells Fargo Bank, N.A.'s Answer dated Aug. 14, 2018), 36 pgs.
Motomanual for Motorazr, located on the Internet at: https://www.cellphones.ca/downloads/phones/manuals/motorola-razr-v3xx-manual.pdf (excerpts attached as Exhibit 8 from the Defendant Wells Fargo Bank, N.A.'s Answer dated Aug. 14, 2018), 34 pgs.
Nikon Digital Camera D300 User's Manual, located on the Internet at: http://download.nikonimglib.com/archive2/iBuJv00Aj97i01y8BrK49XXOTs69/D300,EU(En)04.pdf (attached as Exhibit 5 from the Defendant Wells Fargo Bank, N.A.'s Answer dated Aug. 14, 2018), 195 pgs.
Nokia N95 8GB User Guide, copyright 2009, located on the Internet at: https://www.nokiacom/en_int/phones/sites/default/files/user-guides/Nokia_N95_8GB_Extended_UG_en.pdf (excerpts attached as Exhibit 9 from the Defendant Wells Fargo Bank, N.A.'s Answer dated Aug. 14, 2018), 77 pgs.
"NOVA Enhances Electronic Check Service to Benefit Multi-Lane Retailers," Business Wire, Nov. 28, 2006, 2 pages.
Panasonic Operating Instructions for Digital Camera/Lens Kit Model No. DMC-L1K, https://www.panasonic.com/content/dam/Panasonic/support_manual/Digital_Still_Camera/English_01-vqt0-vqt2/vqt0w95_L1_oi.pdf (attached as Exhibit 4 from the Defendant Wells Fargo Back N.A.'s Answer dated Aug. 14, 2018), 129 pgs.
"Personal Finance", PNC, http://www.pnc.com/webapp/unsec/productsandservice.do?sitearea=/PNC/home/personal/account+services/quick+switch/quick+switch+faqs, Cited in U.S. Pat. No. 7,900,822, as dated 2007 (12 pgs).
POP, ARC and BOC—A Comparison, Federal Reserve Banks, at 1(Jan. 7, 2009), available on the Internet at: https://web.archive.org/web/20090107101808/https://www.frbservices.org/files/eventseducation/pdf/pop_arc_boc_comparison.pdf (attached as Exhibit 13 from the Defendant Wells Fargo Bank, N.A.'s Answer dated Aug. 14, 2018), 3 pgs.

Quinn and Roberds, *The Evolution of the Check as a Means of Payment: A Historical Survey*, Federal Reserve Bank of Atlanta, Economic Review, 2008, 30 pgs.
Petition filed by Wells Fargo Bank, N.A. for Covered Business Method Review of Claims 1-20 of U.S. Pat. No. 9,818,090, dated Nov. 8, 2018, 90 pgs.
Petition filed by Wells Fargo Bank, N.A. for Covered Business Method Review of Claims 1-20 of U.S. Pat. No. 9,336,517, dated Nov. 8, 2018, 98 pgs.
Petition filed by Wells Fargo Bank, N.A. for Covered Business Method Review of Claims 1-20 of U.S. Pat. No. 8,977,571, dated Nov. 8, 2018, 95 pgs.
Petition filed by Wells Fargo Bank, N.A. for Covered Business Method Review of Claims 1-23 of U.S. Pat. No. 8,699,779, dated Nov. 8, 2018, 101 pgs.
"Refractive index" Wikipedia, the free encyclopedia; http://en.wikipedia.org./wiki/refractiveindex.com Oct. 16, 2007 (4 pgs).
"Remote check deposit is the answer to a company's banking problem," Daily Breeze, Torrance, CA, Nov. 17, 2006, 2 pgs.
"Remote Deposit Capture", Plante & Moran, http://plantemoran.com/industries/fincial/institutions/bank/resources/community+bank+advisor/2007+summer+issue/remote+deposit+capture.htm, Cited in U.S. Pat. No. 7,900,822, as dated 2007 (3 pgs).
"Remote Deposit" National City, http://www.nationalcity.com/smallbusiness/cashmanagement/remotedeposit/default.asp; Cited in U.S. Pat. No. 7,900,822, as dated 2007 (1 pg).
Rockwell, *The Megapixel Myth*, KenRickwell.com, 2008, located on the Internet at: http://kewrockwell.com.tech/mpmyth.htm, 6 pgs.
"Save on ATM Fees", RedEye Edition, Chicago Tribune, Chicago, IL Jun. 30, 2007 (2 pgs).
Shah, *Moore's Law*, Continuous Everywhere But Differentiable Nowhere, Feb. 12, 2009, located on the Internet at: http://samjshah.com/2009/02/24/morres-law/, 5 pgs.
"SNB Check Capture: SmartClient User's Guide," Nov. 2006, 21 pgs.
SONY Digital Camera User's Guide/ Trouble Shooting Operating Instructions, copyright 2005, located on the Internet at: https://www.sony.co.uk/electronics/support/res/manuals/2654/26544941M.pdf (attached as Exhibit 3 from the Defendant Wells Fargo Bank N.A.'s Answer dated Aug. 14, 2018), 136 pgs.
Sumits, *Major Mobile Milestones—The Last 15 Years, and the Next Five*Cisco Blogs, Feb. 3, 2016, located on the Internet at: https://blogs.cisco.com/sp/mobile-vni-major-mobile-milesrones-the-last15-years-and-the-next-five, 12 pgs.
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_yourbusiness/businessbits/d90848987.brc, Cited in U.S. Pat. No. 7,900,822, as dated 2007 (3 pgs).
"WallStreetGrapevine.com" Stocks on the Rise: JADG, BKYI, MITK; Mar. 3, 2008 (4 pgs).
Wasau Financial Systems, *Understanding Image Quality & Usability Within a New Environment*2006, 22 pgs.
"What is check Fraud", National Check Fraud Center, http://www.ckfraud.org/ckfraud.html, Cited in U.S. Pat. No. 7,900,822, as dated 2007 (12 pgs).
"Exchangeable image file format for digital still cameras: Exif Version 2.2," Standard of Electronics and Information Technology Industries Associate, JEITA CP-3451, Technical Standardication Committee on AV & IT Storage Systems and Equipments, Japan Electronics and Information Technology Industries Association, Apr. 2002 (154 pgs). (retrieved from: http://www.exif.org/Exif2-2.PDF).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).

(56) References Cited

OTHER PUBLICATIONS

Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janerio, Brazil (11 pgs).
Amber Avalona-Butler / Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).
Aradhye, Hrishikesh B., "A Generic Method for Determining Up/Down Orientation of Text in Roman and Non-Roman Scripts," Pattern Recognition Society, Dec. 13, 2014, 18 pages.
Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, Cited in U.S. Pat. No. 7,900,822, as dated Jul. 2007, Bundesverbankd deutscher banken ev, (42 pgs).
Automated Merchant Systems, Inc., "Electronic Check Conversion," http://www.automatedmerchant.com/electronic_check_conversion.cfm, 2006, downloaded Oct. 18, 2006 (3 pgs).
Bank Systems & Technology, Untitled Article, May 1, 2006, http://www.banktech.com/showarticle.jhtml? articleID=187003126, "Are you Winning in the Payment World?" (4 pgs).
Bankserv, "DepositNow: What's the difference?" Cited in U.S. Pat. No. 7,970,677, as dated 2006, (4 pgs).
Bankserv, Product Overview, http://www.bankserv.com/products/remotedeposit.htm, Cited in U.S. Pat. No. 7,970,677, as dated 2006, (3 pgs).
Bills, Steve, "Automated Amount Scanning Is Trend in Remote-Deposit," American Banker, New York, NY, Aug. 30, 2005, (3 pgs).
Blafore, Bonnie "Lower Commissions, Fewer Amenities", Better Investing, Madison Heights: Feb. 2003, vol. 52, Iss 6, (4 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Blue Mountain Consulting, from URL: www.bluemontainconsulting.com, Cited in U.S. Pat. No. 7,900,822, as dated Apr. 26, 2006 (3 pgs).
Board of Governors of the federal reserve system, "Report to the Congress on the Check Clearing for the 21$^{st}$ Century Act of 2003" Apr. 2007, Submitted to Congress pursuant to section 16 of the Check Clearing for the 21$^{st}$ Century Act of 2003, (59 pgs).
Braun, Tim, "Camdesk—Towards Portable and Easy Document Capture," Image Understanding and Pattern Recognition Research Group, Department of Computer Science, University of Kaiserslautern, Technical Report, Mar. 29, 2005 (64 pgs). (Retrieved from https://pdfs.semanticscholar.org/93b2/ea0d12f24c91f3c46fa1c0d58a76bb132bd2.pdf).
Bruene, Jim; "Check Free to Enable In-Home Remote Check Deposit for Consumers and Small Business", NetBanker.Com, Financial Insite, Inc., http://www.netbanker.com/2008/02/checkfree_to_enableinhome_rem.html, Feb. 5, 2008 (3 pgs).
Bruene, Jim; "Digital Federal Credit Union and Four Others Offer Consumer Remote Deposit Capture Through EasCorp", NetBanker —Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).
Carrubba, P. et al., "Remote Deposit Capture: A White Paper Addressing Regulatory, Operational and Risk Issues," NetDeposit Inc., 2006 (11 pgs).

Century Remote Deposit High-Speed Scanner User's Manual Release 2006, (Century Manual), Century Bank, 2006, (32 pgs).
Chiang, Chuck, The Bulletin, "Remote banking offered", http://bendbulletin.com/apps/pbcs.dll/article?AID=/20060201/BIZ0102/602010327&templ . . . , May 23, 2008 (2 pgs).
CNN.com/technology, "Scan, deposit checks from home", www.cnn.com/2008ITECH/biztech/02/07/check.scanning.ap/index.html, Feb. 7, 2008 (3 pgs).
Constanzo, Chris, "Remote Check Deposit: Wells Captures a New Checking Twist", Bank Technology News Article—May 2005, www.americanbanker.com/btn_article.html?id=20050502YQ50FSYG (2 pgs).
Craig, Ben, "Resisting Electronic Payment Systems: Burning Down the House?", Federal Reserve Bank of Cleveland, Jul. 1999 (4 pgs).
Creativepaymentsolutions.Com, "Creative Payment Solutions—Websolution," www.creativepaymentsolution.com/cps/financialservices/websolution/default.html, Copyright 2008, Creative Payment Solutions, Inc. (1 pg).
Credit Union Journal, "The Ramifications of Remote Deposit Capture Success", www.cuiournal.com/orintthis.html?id=20080411EODZT57G, Apr. 14, 2008 (1 pg).
Credit Union Journal, "AFCU Averaging 80 DepositHome Transactions Per Day", Credit Union Journal, Aug. 15, 2005 (1 pg).
Credit Union Management, "When You wish Upon an Imaging System . . . the Right Selection Process can be the Shining Star," Credit Union Management, Aug. 1993, printed from the internet at <http://search.proquest.com/docview/227756409/14138420743684F7722/15?accountid=14 . . . >, on Oct. 19, 2013 (11 pgs).
DCU Member's Monthly—Jan. 2008, "PC Deposit—Deposit Checks from Home!", http://www.mycreditunionnewsletter.com/dcu/0108/page1. html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
De Queiroz, Ricardo et al., "Mixed Raster Content (MRC) Model for Compound Image Compression", 1998 (14 pgs).
Debello, James et al., "RDM and Mitek Systems to Provide Mobile Check Deposit," Mitek Systems, Inc., San Diego, California and Waterloo, Ontario, (Feb. 24, 2009), 2 pgs.
DeYoung, Robert; "The Financial Performance of Pure Play Internet Banks"; Federal Reserve Bank of Chicago Economic Perspectives; 2001; pp. 60-75; vol. 25, No. 1 (16pgs).
Dias, Danilo et al., "A Model for the Electronic Representation of Bank Checks", Brasilia Univ. Oct. 2006 (5 pgs).
Digital Transactions News, "An ACH-Image Proposal For Check Roils Banks and Networks" May 26, 2006 (3 pgs).
Dinan, R.F et al., "Image Plus High Performance Transaction System", IBM Systems Journal, 1990 vol. 29, No. 3 (14 pgs).
Doermann, David et al., "Progress in Camera-Based Document Image Analysis," Proceedings of the Seventh International Conference on Document Analysis and Recognition (ICDAR 2003) 0-7695-1960-1/03, 2003, IEEE Computer Society, 11 pages.
Duvall, Mel, "Remote Deposit Capture," Baseline, vol. 1, Issue 70, Mar. 2007, 2 pgs.
ECU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Cited in U.S. Pat. No. 7,873,200, as dated Dec. 2005 (20 pgs).
Federal Reserve Board, "Check Clearing for the 21st Century Act", FRB, http://www.federalreserve.gov/paymentsystems/truncation/, Mar. 1, 2006 (1 pg).

(56) References Cited

OTHER PUBLICATIONS

Federal Reserve System, "12 CFR, Part 229: Availability of Funds and Collection of Checks," Federal Registrar, Apr. 28, 1997, pp. 1-50.
Federal Reserve System, "Part IV, 12 CFR Part 229: Availability of Funds and Collection of Checks; Final Rule," Federal Registrar, vol. 69, No. 149, Aug. 4, 2004, pp. 47290-47328.
Fest, Glen., "Patently Unaware" Bank Technology News, Apr. 2006, Retrieved from the internet at URL:http://banktechnews.com/article.html?id=2006403T7612618 (6 pgs).
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Furst, Karen et al., "Internet Banking: Developments and Prospects", Economic and Policy Analysis Working Paper 2000-9, Sep. 2000 (60 pgs).
Garry, M., "Checking Options: Retailers face an evolving landscape for electronic check processing that will require them to choose among several scenarios," Supermarket News, vol. 53, No. 49, 2005 (3 pgs).
German Shegalov, Diplom-Informatiker, "Integrated Data, Message, and Process Recovery for Failure Masking in Web Services", Dissertation Jul. 2005 (146 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.eom/columbus/stories/2005/03/14focus1.html, downloaded 2007 (3 pgs).
Hartly, Thomas, "Banks Check Out New Image", Business First, Buffalo: Jul. 19, 2004, vol. 20, Issue 43, (3 pgs).
Heckenberg, D. "Using Mac OS X for Real-Time Image Processing" Oct. 8, 2003 (15 pgs).
Herley, Cormac, "Efficient Inscribing of Noisy Rectangular Objects in Scanned Images," 2004 International Conference on Image Processing, 4 pages.
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).
Iida, Jeanne, "The Back Office: Systems—Image Processing Rolls on as Banks ReapBenefits," American Banker, Jul. 19, 1993, printed from the internet at <http://search.proquest.com/docview/292903245/14138420743684F7722/14?accountid=14 . . . >, on Oct. 19, 2013 (3 pgs).
Image Master, "Photo Restoration: We specialize in digital photo restoration and photograph repair of family pictures", http://www.imphotorepair.com, Cited in U.S. Pat. No. 7,900,822, as downloaded Apr. 2007 (1 pg).
Investment Systems Company, "Portfolio Accounting System," 2000, 34, pgs.
JBC, "What is a MICR Line?," eHow.com, retrieved from http://www.ehow.com/about_4684793_what-micr-line.html on May 4, 2009 (2 pgs).
Johnson, Jennifer J., Secretary of the Board; Federal Reserve System, 12 CFR Part 229, "Availability of Funds and Collection of Checks". Cited in U.S. Pat. No. 7,900,822, as dated 2009, (89 pgs).
Kendrick, Kevin B., "Check Kiting, Float for Purposes of Profit," Bank Security & Fraud Prevention, vol. 1, No. 2, 1994 (3 pgs).

Kiser, Elizabeth K.; "Modeling the Whole Firm: The Effect of Multiple Inputs and Financial Intermediation on Bank Deposit Rates," FEDS Working Paper No. 2004-07; Jun. 3, 2003; pp. 1-46 (46 pgs).
Knestout, Brian P. et al., "Banking Made Easy" Kiplinger's Personal Finance Washington, Jul. 2003, vol. 57, Iss 7 (5 pgs).
Kornai Andras et al., "Recognition of Cursive Writing on Personal Checks", Proceedings of International Workshop on the Frontiers in Handwriting Recognition, Cited in U.S. Pat. No. 7,900,822, as dated Sep. 1996, (6 pgs).
Lampert, Christoph et al., "Oblivious Document Capture and Real-Time Retrieval," International Workshop on Camera Based Document Analysis and Recognition (CBDAR), 2005 (8 pgs). (Retrieved from: http://www-cs.ccny.cuny.edu/~wolberg/capstone/bookwarp/LampertCBDAR05.pdf).
Levitin, Adam J., Remote Deposit Capture: A Legal and Transactional Overview, Banking Law Journal, p. 115, 2009 (RDC), 8 pgs.
Liang, Jian et al., Camera-Based Analysis of Text and Documents: A Survey, International Journal on Document Analysis and Recognition, Jun. 21, 2005, 21 pages.
Luo, Xi-Peng et al., "Design and Implementation of a Card Reader Based on Build-In Camera," Proceedings of the 17th International Conference on Pattern Recognition, 2004, 4 pages.
Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).
Matthews, Deborah, "Advanced Technology Makes Remote Deposit Capture Less Risky," Indiana Bankers Association, Apr. 2008 (2 pgs).
Metro 1 Credit Union, "Remote Banking Services," hltp://ww\\i.metro1cu.org/metro1cu/remote.html, downloaded Apr. 17, 2007 (4 pgs).
Mitek systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Mohl, Bruce, "Banks Reimbursing ATM Fee to Compete With Larger Rivals", Boston Globe, Boston, MA, Sep. 19, 2004 (3 pgs).
Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/mi qa3799/is200607/ai_n16537250, 2006 (3 pgs).
Netbank, Inc., "Branch Out: Annual Report 2004," 2004 (150 pgs).
Netbank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/MerchantAdvisors, "Real-Time Check Debit", Merchant Advisors Retail Check Processing Check Conversion, http://www.onlinecheck/wach/rcareal.htm, Cited in U.S. Pat. No. 7,900,822, as dated 2006 (3 pgs).
Oxley, Michael G., from committee on Financial Services; "Check Clearing for the 21$^{st}$ Century Act", 108$^{th}$ Congress, 1st Session House of Representatives report 108-132, Jun. 2003 (20 pgs).
Oxley, Michael G., from the committee of conference; "Check Clearing for the 21$^{st}$ Century Act" 108th Congress, 1$^{st}$ Session Senate report 108-291, Oct. 1, 2003 (27 pgs).
Palacios, Rafael et al., "Automatic Processing of Brazilian Bank Checks". Cited in U.S. Pat. No. 7,900,822, as dated 2002 (28 pgs).
Patterson, Scott "USAA Deposit@Home—Another WOW moment for Net Banking", NextCU.com, Jan. 26, 2007 (5 pgs).
Public Law 108-100, 108 Congress; "An Act Check Clearing for the 21$^{st}$ Century Act", Oct. 28, 2003, 117 STAT. 1177 (18 pgs).

(56) References Cited

OTHER PUBLICATIONS

Rao, Bharat; "The Internet and the Revolution in Distribution: A Cross-Industry Examination"; Technology in Society; 1999; pp. 287-306; vol. 21, No. 3 (20 pgs).
Remotedepositcapture, URL:www.remotedepositcapture.com, Cited in U.S. Pat. No. 7,900,822, as dated 2006 (5 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankServ Announces New Remote Deposit Product Integrated with QuickBooks" (3 pgs).
Remotedepsitcapture.com, LLC, "Remote Deposit Capture Overview," ROC Overview, http://remotedepositcapture.com/overview/RDC_overview.htm, Cited in U.S. Pat. No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).
Rose, Sarah et al., "Best of the We: The Top 50 Financial Websites", Money, New York, Dec. 1999, vol. 28, Iss. 12 (8 pgs).
Shelby, Hon. Richard C. (Committee on Banking, Housing and Urban Affairs); "Check Truncation Act of 2003", calendar No. 168, 108th Congress, 1st Session Senate report 108-79, Jun. 2003 (27 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html, © 1999-2007 (2 pgs).
The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Cited in U.S. Pat. No. 7,900,822, as dated Dec. 2005 (3 pgs).
The Green Sheet 2.0: Newswire, "CO-OP adds home deposit capabilities to suite of check imaging products", www.greensheet.com/newswire.php?newswire_id=8799, Mar. 5, 2008 (2 pgs).
Tygar, J.D., Atomicity in Electronic Commerce, In ACM Networker, 2:2, Apr./May 1998 (12 pgs).
Valentine, Lisa, "Remote Deposit Capture Hot Just Got Hotter," ABA Banking Journal, Mar. 2006, p. 1-9.
Vaream, Craig, "Image Deposit Solutions: Emerging Solutions for More Efficient Check Processing," JP Morgan Chase, Nov. 2005 (16 pgs).
Wade, Will, "Early Debate on Remote-Capture Risk," American Banker, New York, NY, May 26, 2004 (3 pgs).
Wade, Will, "Early Notes: Updating Consumers on Check 21" American Banker Aug. 10, 2004 (3 pgs).
Wallison, Peter J., "Wal-Mart Case Exposes Flaws in Banking-Commerce Split", American Banker, vol. 167. No. 8, Jan. 11, 2002 (3 pgs).
Wells Fargo 2005 News Releases, "The New Wells Fargo Electronic Deposit Services Break Through Banking Boundaries in the Age of Check 21 ", San Francisco Mar. 28, 2005, www.wellsfargo.com/press/3282005_check21Year=2005 (1 pg).
Wells Fargo Commercial, "Remote Deposit", www.wellsfargo.com/com/treasury mgmtlreceivables/electronic/remote deposit, Copyright 2008 (1 pg).
White, J.M. et al., "Image Thresholding for Optical Character Recognition and Other Applications Requiring Character Image Extraction", IBM J. RES. Development, Jul. 1983, vol. 27, No. 4 (12 pgs).
Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia ®, "Remote Deposit," http://en.wikipedia.org/wiki/Remote_deposit, 2007 (3 pgs).
Windowsfordevices.com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, New York, N.Y.: Feb. 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A. 1.
Zandifar, A., "A Video-Based Framework for the Analysis of Presentations/Posters," International Journal on Document Analysis and Recognition, Feb. 2, 2005, 10 pages.
Zhang, C.Y., "Robust Estimation and Image Combining" Astronomical Data Analysis Software and Systems IV, ASP Conference Series, 1995 (5 pgs).
Zions Bancorporation, "Moneytech, the technology of money in our world: Remote Deposit," http://www.bankjunior.com/pground/moneytech/remote_deposit.jsp, 2007 (2 pgs).
"Quicken Bill Pay", Retrieved from the Internet on Nov. 27, 2007 at: <URL:http://quicken-intuit.com/quicken-bill-pay-jhtml>, 2 pgs.
"Start to Simplify with Check Imaging a Smarter Way to Bank", Retrieved from the Internet on Nov. 27, 2007, at: <URL: http://www.midnatbank.com/Internet%20Banking/internet_Banking.html>, 3 pgs.
Motomanual, MOTOROKR-E6-GSM-English for wireless phone, copyright 2006, 144 pgs.
Patent Disclaimer for U.S. Pat. No. 8,699,779, filed on Mar. 4, 2019, 2 pgs.
Patent Disclaimer for U.S. Pat. No. 8,977,571, filed on Feb. 20, 2019, 2 pgs.
Patent Disclaimer for U.S. Pat. No. 9,336,517, filed on Mar. 4, 2019, 2 pgs.
Patent Disclaimer for U.S. Pat. No. 9,818,090, filed on Feb. 20, 2019, 2 pgs.
CBM2019-00002 U.S. Pat. No. 9,818,090, United Services Automobile Association (USAA)'s Patent Owner Preliminary Response, dated Feb. 20, 2019, 75 pgs.
CBM2019-00002 U.S. Pat. No. 9,818,090, Declaration of Tim Crews in Support of Patent Owner Preliminary Response, dated Feb. 20, 2019, 8 pgs.
CBM2019-00002 U.S. Pat. No. 9,818,090, Declaration of Matthew Caiman in Support of Patent Owner Preliminary Response, dated Feb. 20, 2019, 14 pgs.
CBM2019-00002 U.S. Pat. No. 9,818,090, Katie Knight Videotape Deposition Transcript, dated Feb. 8, 2019, 27 pgs.
CBM2019-00002 U.S. Pat. No. 9,818,090, Peter Alexander, Ph.D., Oral and Videotaped Deposition, dated Jan. 23, 2019, 27 pgs.
CBM2019-00002 U.S. Pat. No. 9,818,090, United Services Automobile Association (USAA)'s Updated Exhibit List, dated Mar. 19, 2019, 8 pgs.
CBM2019-00003 U.S. Pat. No. 9,336,517, United Services Automobile Association (USAA)'s Patent Owner Preliminary Response, dated Mar. 4, 2019, 91 pgs.
CBM2019-00003 U.S. Pat. No. 8,699,779, Declaration of Matthew Caiman In Support of Patent Owner Preliminary Response, dated Mar. 4, 2019, 15 pgs.
CBM2019-00003 U.S. Pat. No. 9,336,517, Katie Knight Videotape Deposition Transcript, dated Feb. 8, 2019, 27 pgs.
CBM2019-00003 U.S. Pat. No. 9,336,517, Peter Alexander, Ph.D., Oral and Videotaped Deposition, dated Jan. 23, 2019, 27 pgs.
CBM2019-00003 U.S. Pat. No. 9,336,517, United Services Automobile Association (USAA)'s Updated Exhibit List Pursuant to 37 CFR 42.63(e), dated Mar. 19, 2019, 8 pgs.

(56) References Cited

OTHER PUBLICATIONS

CBM2019-00003 U.S. Pat. No. 9,336,517, Petitioner's Reply Brief to Patent Owner Preliminary Response Pursuant to Authorization Provided in Paper No. 14, dated Apr. 10, 2019, 10 pgs.
CBM2019-00004 U.S. Pat. No. 8,977,571, Declaration of Tim Crews in Support of Patent Owner Preliminary Response, dated Feb. 20, 2019, 8 pgs.
CBM2019-00004 U.S. Pat. No. 8,977,571, United Services Automobile Association KUSAA)'s Patent Owner Preliminary Response, dated Feb. 20, 2019, 99 pgs.
CBM2019-00004 U.S. Pat. No. 8,977,571, Declaration of Matthew Caiman in Support of Patent Owner Preliminary Response, dated Feb. 20, 2019, 14 pgs.
CBM2019-00004 U.S. Pat. No. 8,977,571, United Services Automobile Association (USAA)'s Updated Exhibit List Pursuant to 37 CFR 43.63(e), dated Mar. 19, 2019, 8 pgs.
CBM2019-00005 U.S. Pat. No. 8,699,779, United Services Automobile Association's (USAA)'s Patent Owner Preliminary Response, dated Mar. 4, 2019, 103 pgs.
CBM2019-00005 U.S. Pat. No. 8,699,779, Katie Knight Videotape Deposition Transcript, dated Feb. 8, 2019, 27 pgs.
CBM2019-00005 U.S. Pat. No. 8,699,779 Matthew A. Calman Declaration, dated Mar. 4, 2019, 15 pgs.
CBM2019-00005 U.S. Pat. No. 8,699,779 Peter Alexander, Ph.D., Oral and Videotaped Deposition, dated Jan. 23, 2019, 27 pgs.
CBM2019-00027 U.S. Pat. No. 9,224,136 Declaration of Peter Alexander, Ph.D., dated Mar. 28, 2019, 147 pgs.
CBM2019-00027 U.S. Pat. No. 9,224,136 Petition for Covered Business Method Review of Claims 1-3, 5-9, 11-16 and 18 of U.S. Pat. No. 9,224,136, dated Mar. 28, 2019, 93 pgs.
CBM2019-00027 U.S. Pat. No. 9,224,136 Notice of Filing Date Accorded to Petition and Time for Filing Patent Owner Preliminary Response, dated Apr. 8, 2019, 3 pgs.
CBM2019-00028 U.S. Pat. No. 10,013,681, Plaintiff United Services Automobile Association (USAA) Preliminary Claim Constructions and Extrinsic Evidence, dated Mar. 15, 2019, 74 pgs.
CBM2019-00028 U.S. Pat. No. 10,013,681, Declaration of Peter Alexander, Ph.D., dated Mar. 28, 2019, 94 pgs.
CBM2019-00028 U.S. Pat. No. 10,013,681, Petition for Covered Business Method Review of Claims 1-30 of U.S. Pat. No. 10,013,681, dated Mar. 28, 2019, 99 pgs.
CBM2019-00028 U.S. Pat. No. 10,013,681, Petitioner's Updated Exhibit List (as of Apr. 1, 2019) for U.S. Pat. No. 10,013,681, dated Apr. 1, 2019, 5 pgs.
CBM2019-00028 U.S. Pat. No. 10,013,681, Notice of Filing Date Accorded To Petition and Time for Filing Patent owner Preliminary Response for U.S. Pat. No. 10,013,681, dated Apr. 8, 2019, 3 pgs.
CBM2019-00029 U.S. Pat. No. 10,013,605, Declaration of Peter Alexander, Ph.D., dated Mar. 28, 2019, 76 pgs.
CBM2019-00029 U.S. Pat. No. 10,013,605, Petition for Covered Business Method Review of Claims 1-3, 5-14, 16-29 of U.S. Pat. No. 10,013,605, dated Mar. 28, 2019, 88 pgs.
CBM2019-00029 U.S. Pat. No. 10,013,605, Plaintiff United Services Automobile Association (USAA) Preliminary Claim Constructions and Extrinsic Evidence, dated Mar. 15, 2019, 74 pgs.
IPR2019-00815 U.S. Pat. No. 9,818,090, Petition For Inter Parties Review of Claims 109 of U.S. Pat. No. 9,818,090, dated Mar. 20, 2019, 56 pgs.
IPR2019-00815 U.S. Pat. No. 9,818,090, Declaration of Peter Alexander, PhD. as filed in the IPR on Mar. 20, 2019, 99 pgs.
IPR2019-00815 U.S. Pat. No. 9,818,090, Notice of Filing Date Accorded to Petition and Time for Filing Patent Owner Preliminary Response, dated Mar. 27, 2019, 5 pgs.
IPR2019-00815 U.S. Pat. No. 9,818,090, Exhibit B Proposed Claim Constructions for the '571, '090, '779 and '517 Patents, filed on Feb. 28, 2019, 10 pgs.
ABA Routing System Transit No. Wikipedia, dated Sep. 27, 2006, 3pgs.
Accredited Standards Committee Technical Report TR 33-2006, dated Aug. 28, 2006, 75 pgs.
ANS X9.100-140-2004, "Specification for an Image Replacement document—IRD", American Standard for Financial Services, Oct. 1, 2004, 15 pgs.
ANSI News, Check 21 Goes Into Effect Oct. 28, 2004, dated Oct. 25, 2004, 1 pg.
ANSI, "Return Reasons for Check Image Exchange of IRDS", dated May 6, 2016, 23 pgs.
ANSI, "Specifications for Electronic Exchange of Check and Image Data", dated Jul. 11, 2006, 230 pgs.
ANSI X9.7-1999(R2007), Bank Check Background and Convenience Amount Field Specification, dated Jul. 11, 2007, 86 pgs.
ASCX9, "Specification for Electronic Exchange of Check and Image Data", date Mar. 31, 2003. 156 pgs.
Bankers' Hotline, "Training Page: Learning the Bank Numbering System", Copyright 2004, 2 pgs.
BrainJar Validation Algorithms, archived on Mar. 16, 2016 from BrainJar.com, 2 pgs.
Canon White Paper, "Two Words Every Business Should Know—Remote Deposit", dated 2005, 7 pgs.
CBR online, "Diebold launches ATM depository technology", Oct. 4, 2007, 5 pgs.
Cheq Information Technology White Paper, "Teller Scanner Performance and Scanner Design: Camera Position Relative to the Feeder", dated 2005, 7 pgs.
De Jesus, Angie et al., "Distributed Check Processing in a Check 21 Environment", dated Nov. 2004, 22 pgs.
Federal Reserve Adoption of DSTU X9.37-2003, Image Cash Letter Customer Documentation Version 1.8, dated Oct. 1, 2008, 48 pgs.
Fielding, R. et al., "RFC-2616—Hypertext Transfer Protocol", Network Working Group, The Internet Society copyright 1999, 177 pgs.
Hill, Simon, "From J-Phone to Lumina 1020: A Complete History of the Camera Phone", dated Aug. 11, 2013, 19 pgs.
Instrument—Definition from the Merriam-Webster Online Dictionary, dated Mar. 2, 2019, 1 pg.
Instrument—Definition of instrument from the Oxford Dictionaries (British & World English), dated Jul. 2, 2017, 44 pgs.
IPhone Application Programming Guide Device Support, dated Apr. 26, 2009, 7 pgs.
IPhone Announces the New iPhone 3gs—The Fastest, Most Powerful iPhone Yet, Press Release dated Jun. 8, 2009, 4 pgs.
Klein, Robert, Financial Services Technology, "Image Quality and Usability Assurance Phase 1 Project", dated Jul. 23, 2004, 68 pgs.
Lange, Bill, "Combining Remote Capture and IRD Printing, A Check 21 Strategy for Community and Regional Banks", dated 2005, 25 pgs.
Lee, Jeanne, "Mobile Check Deposits: Pro Tips to Ensure They Go Smoothly", dated Feb. 19, 2016, 6 pgs.
Meara, Bob, "State of Remote Deposit Capture 2015: Mobile Is the New Scanner", Dated May 26, 2015, obtained from the Internet at https://www.celent.com/insights/57842967, 3 pgs.
Meara, Bob, "State of Remote Deposit Capture 2015 Mobile Is the New Scanner", dated May 2015, 56 pgs.
Meara, Bob,"USAA's Mobile Remote Deposit Capture", Dated Jun. 26, 2009, 2 pgs.
Mitek's Mobile Deposit Processes More Than Two Billion Checks, $1.5 Trillion in Cumulative Check Value, dated Mar. 18, 2018, 2 pgs.
Mitek, "Video Release—Mitek MiSnap ™ Mobile Auto Capture Improves Mobile Deposit® User Experience at Ten Financial Institutions", dated Jul. 15, 2014, 2 pgs.
NCR, Mobile Remote Deposit Capture (RDC), copyright 2011, 8 pgs.
Nokia N90 Review Digital Trends, dated Feb. 11, 2019, obtained from the Internet at: https://www.digitaltrends.com/cell-phone-reviews/nokia-n90-review/, 11 pgs.
Nokia N95 8GB User Guide, copyright 2009, (from the Wells Fargo Bank, N.A. IPR2019-00815, filed on Mar. 20, 2019), Part 1 of 3, 67 pgs.
Nokia N95 8GB User Guide, copyright 2009, (from the Wells Fargo Bank, N.A. IPR2019-00815, filed on Mar. 20, 2019), Part 2 of 3, 60gs.

(56) References Cited

OTHER PUBLICATIONS

Nokia N95 8GB User Guide, copyright 2009, (from the Wells Fargo Bank, N.A. IPR2019-00815, filed on Mar. 20, 2019), Part 3 of 3, 67 pgs.
Patel, Kunur, Ad Age, "How Mobile Technology Is Changing Banking's Future", dated Sep. 21, 2009, 3 pgs.
Remote Deposit Capture Basic Requirements, dated Aug. 22, 2009, 1 pg.
Remote Deposit Capture.com Scanner Matrix, dated Oct. 21, 2011, 3 pgs.
Rowles, Tony, USAA-v. Wells Fargo No. 2:16-cv-245-JRGL e-mail correspondence dated Jan. 24, 2019, 2 pgs.
Sechrest, Stuart et al., "Windows XP Performance", Microsoft, dated Jun. 1, 2001, 20 pgs.
Spenser, Harvey, "White Paper Check 21 Controlling Image Quality at the Point of Capture", dated 2004, 7 pgs.
Timothy R. Crews list of Patents, printed from the United States Patent and Trademark Office on Feb. 13, 2019, 7 pgs.
Van Dyke, Jim, "2017 Mitek Mobile Deposit Benchmark Report", copyright 2017, 50 pgs.
Wausau, "Understanding Image Quality & Usability Within a New Environment", copyright 2019, 1 pg.
Whitney, Steve et al., "A Framework For Exchanging Image Returns", dated Jul. 2001, 129 pgs.
Herley, Cormac, "Recrusive Method to Extract Rectangular Objects From Scans", *Microsoft Research*, Oct. 2003, 4 pgs.
Panini My Vision X Operator Manual, Panini, 2004, (cited in IPR2020-00093, U.S. Pat. No. 9,892,454), 51 pgs.
Yeo, L.H. et al., "Submission of transaction from mobile workstations in a cooperative multidatabase environment", *IEEE*, 1994, (cited in IPR2020-00097, U.S. Pat. No. 7,885,880), 10 pgs.
Andrew S. Tanenbaum, Modern Operating Systems, Second Edition (2001).
Arnold et al., The Java Programming Language, Fourth Edition (2005).
Consumer Assistance & Information—Check 21 https://www.fdic.gov/consumers/assistance/protection/check21.html (FDIC).
Halonen et al., GSM, GPRS, and EDGE Performance: Evolution Towards 3G/UMTS, Second Edition (2003).
Heron, Advanced Encryption Standard (AES), 12 Network Security 8 (2009).
Immich et al., Performance Analylsis of Five Interprocess CommunicAtion Mechanisms Across UNIX Operating Systems, 68 J. Syss. & Software 27 (2003).
Leach, et al., A Universally Unique Identifier (UUID) URN Namespace, (Jul. 2005) retrieved from https://www.ietf.org/rfc/rfc4122.txt.
N. Ritter & M. Ruth, The Geo Tiff Data InterchAnge Standard for Raster Geographic Images, 18 Int. J. Remote Sensing 1637 (1997).
Pbmplus—image file format conversion package, retrieved from https://web.archive.org/web/20040202224728/https:/www.acme.com/software/pb.Mplus/.
Petition filed by PNC Bank N.A. for Inter Partes Review of Claims 1-23 of U.S. Pat. No. 10,482,432, dated Jul. 14, 2021, IPR2021-01071, 106 pages.
Petition filed by PNC Bank N.A. for Inter Partes Review of Claims 1-7, 10-21 and 23 of U.S. Pat. No. 10,482,432, dated Jul. 14, 2021, IPR2021-01074.
Petition filed by PNC Bank N.A. for Inter Partes Review of Claims 1-18 of U.S. Pat. No. 10,621,559, dated Jul. 21, 2021, IPR2021-01076, 111 pages.
Petition filed by PNC Bank N.A. for Inter Partes Review of Claims 1-18 of U.S. Pat. No. 10,621,559, filed Jul. 21, 2021, IPR2021-01077; 100 pages.
Petition filed by PNC Bank N.A. for Inter Partes Review of Claims 1-30 of U.S. Pat. No. 10,013,681, filed Aug. 27, 2021, IPR2021-01381, 127 pages.
Petition filed by PNC Bank N.A. for Inter Partes Review of U.S. Pat. No. 10,013,605, filed Aug. 27, 2021, IPR2021-01399, 113 pages.
Readdle, Why Scanner Pro is Way Better Than Your Camera? (Jun. 27, 2016) retrieved from https://readdle.com/blog/why-scanner-pro-is-way-better-than-your-camera.
Santomero, The Evolution of Payments in the U.S.: Paper vs. Electronic (2005) retrieved from https://web.archive.org/web/20051210185509/https://www.philadelphiafed.org/pu.blicaffairs/speeches/2005 _santomero9.html.
Schindler, Scanner Pro Review (Dec. 27, 2016) retrieved from https://www.pcmag.com/reviews/scAnner-pro.
Sing Li & Jonathan Knudsen, Beginning J2ME: From Novice to Professional, Third Edition (2005), ISBN (pbk): 1-59059-479-7, 468 pages.
Wang, Ching-Lin et al. "Chinese document image retrieval system based on proportion of black pixel area in a character image", the 6th International Conference on Advanced Communication Technology, 2004, vol. 1, IEEE, 2004.
Zaw, Kyi Pyar and Zin Mar Kyu, "Character Extraction and Recognition for Myanmar Script Signboard Images using Block based Pixel Count and Chain Codes" 2018 IEEE/ACIS 17th International Conference on Computer and Information Science (CS), IEEE, 2018.
Jung et al., "Rectangle Detection based on a Windowed Hough Transform", IEEE Xplore, 2004, 8 pgs.
Craig Vaream, "Image Deposit Solutions" Emerging Solutions for More Efficient Check Processing, Nov. 2005, 16 pages.
Certificate of Accuracy related to Article entitled, "Deposit checks by mobile" on webpage: https://www.elmundo.es/navegante/2005/07/21/empresas/1121957427.html signed by Christian Paul Scrogum (translator) on Sep. 9, 2021.

\* cited by examiner (FRONT)

(REAR)

(FRONT)

(REAR)

(RIGHT SIDE)

(FRONT)

(REAR)

SIR JOHN JOE
77 ─ ////////////////

CHECK ////////
DATE ////////

FOR _____
78 ─ ////////////

//////////////// ─ 79

//////////////
80

(FRONT)

*FIG. 4A*

ENDORSE HERE

81 ─ ////////////////
////////////////

DO NOT WRITE
BELOW THIS LINE

FEDERAL RESERVE
👍/ _____

(REAR)

*FIG. 4B*

SYSTEM PROTECTIVE IMAGES

FRONT

SIDE

REAR

FRONT

PROCESS VIEW

REAR

WIRELESS ELECTRONIC CHECK DEPOSIT SCANNING AND CASHING MACHINE WITH WEB-BASED ONLINE ACCOUNT CASH MANAGEMENT COMPUTER APPLICATION SYSTEM

CROSS-REFERENCE TO RELATED APPLICATIONS

This application is a continuation of U.S. application Ser. No. 15/183,461, filed Jun. 15, 2016, pending, which is a continuation of U.S. application Ser. No. 14/299,456, filed Jun. 9, 2014, abandoned, which is a continuation of U.S. application Ser. No. 13/495,971, filed Jun. 13, 2012, abandoned, which is a continuation of U.S. application Ser. No. 10/918,898, filed Aug. 16, 2004, abandoned, which claims the benefit of U.S. Provisional Application No. 60/532,416, filed Dec. 23, 2003, and claims the benefit of U.S. Provisional Application No. 60/515,912, filed Oct. 30, 2003, wherein the entirety of U.S. application Ser. Nos. 13/495, 971, 14/299,456 and 15/183,461 are hereby incorporated herein by reference.

BACKGROUND OF THE INVENTION

1. Field of the Invention

The present invention generally relates to a method and apparatus for Wirelessly depositing paper checks that are deposited from home computer, desktop office computer, mobile device that is Internet capable, laptop computer, Internet capable pda (personal digital assistant), and/or any other working device that allows one access to the Internet through wireless solutions—which is wirelessly scanned and delivered through the Wireless Check (deposit) Scanning Machine—where the endorsed check image is captured, and wirelessly transmitted to a wireless computer network, that is linked and delivered to the online account management system (OMS), which acts as a virtual teller by receiving and confirming the check image data on the user's/depositor's account (ie. routing number, checking account number on the endorsed check image, dollar amount of the check, date of the check, check owner's name, and bank name, etc.)—where user logs on to enter the dollar amounts and figures into their online account management system Account, to initiate and begin process of check deposit request; verifying check data through user/depositor online data verification; submitting request to move funds (for written amount of the endorsed check image) from check owner's bank checking account into user's/depositor's bank account—serving as an electronic funds transfer. This web-based cash management application solution program controls the processing of the check using a secure format (OMS), while the Wireless check scanning Device wirelessly securely transmits the data to the wireless computer network that links to the user's online account (operated and controlled by the OMS). This enablement opens the door for Global Banking, with a limitless variation of transaction (ie. business, personal, international) capacities. The check (once wirelessly delivered to the system) controlled for deposit in the online account management system converts the check image into an electronic banking transaction (appearing as an electronic banking funds transaction—for expedited processing and wiring of check deposit funds made available in user/depositor checking account); in addition allowing the user/depositor the capability of Cashing and Printing orders through the OMS process—once image has been received and delivered to the OMS through WEDS, the user is then able to verify document type (ie. Personal check, Business check, Money Order) for request to deposit, or cash the check/money order. The deposit takes process through user logon and verification of check depositor and check owner's banking data and authorization, along with the system authenticity of document and user check. The check cashing option occurs when user has web cam hooked up, and destination of the user's ISP (Internet service provider address and local computer network to detect where communication from user's computer is coming from) so user can be located, and his/her destination at time of transaction request can be located. User's picture is taken through a live image captured during the user's request; which shows the user's action throughout the time of the transaction. Upon approval and verification of the check data and user data within the OMS system, the OMS live teller allows the funds to be electronically transferred into user's account (EFT) at the point of transaction, which makes cash available to user immediately. The image of the check/money order is recorded, and voided out, and notification is sent to the user's and check owner's bank/financial institution, and/or place where OMS purchased money order on behalf of user—and documented into a web-based OMS national system, so all check cashing stores, banks, and post offices can be aware of all checks and money orders cashed through WEDS.OMS system.

2. Background Description

With the booming Internet Information Age, the number or online users are increasing both in the United States and overseas. There are more than 32 million online banking customers in the U.S. and over 100 million in Europe. As an effect of the high volume of users, people are looking toward the Internet as an avenue to increase both personal and professional productivity, more particularly in the field of banking.

Banks in the U.S. spend $8 billion in processing checks, and the Federal Reserve processes 42 billion checks per year. As the use and need of checks continue to grow and remain vital for business transactions and services, depositing alternatives are greatly needed, so is the desire for speedy availability of those funds in a convenient environment. The cost and time associated with processing and depositing paper checks manually decreases productivity and financial expenditures and labor spending levels. Small, medium, and large Businesses would increase office productivity as well as save money in labor, and clear checks quicker by excluding the use of manual check processors (to deposit and scan checks for payment and/or deposit) and save time and money manually or processing a check deposit for individual customers and/or businesses banking at the branch(es) and at check processing centers, check cashing centers, and brokerage firms. Individual consumers will save money in check processing fees and be encouraged to start and/or grow a banking relationship should an alternative method of banking be made available to them at a lower cost, and without the inconvenience of waiting in line to deposit at the branch or ATM, then waiting again for the funds to clear the bank. Should a new capability be developed where a computer system can wirelessly scan and wirelessly deliver the check image to a wireless network (such as this invention), that is linked to an online access point where the user/depositor can set preferences for online check deposit request, and be serviced online (in a virtual teller environment—such as this invention), where the endorsed check image delivered is verified and deposited in a secure manner (processed as an EFT—electronic funds transfer, to expedite processing time frame for check deposit)—there will be less room for manual error, and longer than necessary waiting time frames for deposit of check, and release of funds, in addition to excluding the need for travel time for those wishing to deposit, or rely on obtaining funds immediately.

Online banking is an increasing market, where users are now capable of going online to view their checking and savings account, transfer funds, and set up payment schedules online. However, their banking options are limited, which give users less power to get things done without the need of going to a branch or visiting an ATM machine, when they'd rather spend lunch eating, and spend their weekends at home with the family and loved ones.

Allowing deposit and cashing of checks online through Wireless scanning (WEDS) and wireless navigation (OMS) enables the user to finally take control over their finances. With this invention, users are now able to perform the task of scanning a check for online deposit in a wireless environment. The user may now wirelessly scan the endorsed check image, which is wirelessly delivered (WEDS) to a wireless network, which is linked to a main access point for the user to navigate commands online (the Account Management System or OMS). There is no longer a need for a serial cable or any other wire cable connection in order for the endorsed check image to be transmitted and delivered. This greatens the user with the ability to bank with mobility; to bank while in transit. Users once unable to transmit endorsed check image without computer connectivity port accessibility, are now able to exercise the option of use through USB cable, firewire cable, and (most important and convenient) Through Wireless Transmission of data (endorsed check image) for delivery, receipt and processing; in addition to the OMS providing the capability of paper/substitute-check cashing and money order cashing through a secured connection and picture capture of live web cam image of the user once user is logged onto his/her account on the OMS.

Although electronic financial transactions are commonly operated and maintained by giving the average banker power over their money, both businesses and individual banking customers/clients have limited power due to the limited online banking options available to the online banking user. In a survey conducted by International Data Corporation (IDC), 42% of users found processing transactions in the online banking world not very useful, or user friendly. Banks and financial institutions ultimately destroy banking/financial relationships because the customer is limited to the online banking transactions he or she can accomplish, due to a lack of diversified banking solutions and limited web-based solutions offered to the user in a "user friendly" atmosphere-one of the many harvests (or fruits) brought to the world are new, innovative technological advancements and evolutions are going from non-dial up options, to cable modem options, to broadband, to wireless fidelity (Wi-Fi) options to expand user Internet capabilities. Because of the wireless wave of technology, consumers are now able to accomplish more on their laptops and wireless devices (ie. mobile and pda devices)—faster, and more efficient than ever. Being able to deposit a check through the home and office provide the online user with advanced options, but having to connect to a computer (ie. Pc and/or mac compatibility) in order to accomplish the initial task of scanning ties the user to one particular spot in order to begin the process, ultimately excluding their options of mobile banking. There are over 5 million Wireless Banking Consumers in the U.S. and 48 million in Europe; which will increase to 79 million by the end of 2004. As a result, users' are seeking expanded banking solution options, to cater to the freedom of Mobile Life Productivity while in transit. The benefit of this invention (wireless electronic check deposit scanning machine with web-based computer application [controller] system) will enhance which enhance the quality of service that banks can provide to their customers and offer to prospective and new customers. Once people realize that their user power has increased, and their finances can be watched, controlled, and initiated at any time by the push of a button, Wireless banking will increase for corporations and individual banking consumers all across the world.

This invention allows bankers all across the continent to lessen their labor expenditures and manual operating costs, while increasing service options to their customers. Banking productivity will increase due to less paper processing. With the new Law, Check 21 century act (as of October 2004), substitute checks will allow banks to decrease paper trails, by allowing substitutes of the checks to be accepted. This invention will allow users and the banking industry to quickly adapt and make a comfortable transition using this tool as a "banker's handyman".

In the world of business, checks—be it paper or substitute will always be used, be it a businesses way of compensating a per project seasonal worker or contractor, brokerage firm using a check for account owner request of funds, or compensating temporary workers (ie. Payroll checks) Financial institutions will have the need to use checks as a source of compensation for services, and Check Processing Centers will be there to record, document, and process checks. Collection agencies and Insurance companies seek immediate compensation for debts and cost of services in the form of checks. These type of transactions exist all over the United States and overseas—which increases the need for a higher more advanced, time efficient and effective tool. A tool that would allow one to wirelessly scan and wirelessly transmit the endorsed paper and/or substitute check image (using the WEDS tool and OMS system), so that payments can be processed and deposited at a faster rate, without enduring the growing number and need of labor (previously needed and required) to individually process and deposit individual and bulk checks by hand. In addition, this serves as a great tool for individual user's who haven't the time or transportation to wait in line at a branch or ATM to make check deposits, then wait longer for the time frame for the funds to be available. The WEDS machine with OMS web-based cash management computer application system will change the way online banking business is done, by diversifying user capabilities and options of online banking, based on the user need of productivity and mobility by wirelessly transmitting paper check images, substitute checks, and/or money orders for cashing or depositing purposes (through WEDS—Wireless Electronic Check Deposit Scanning and Cashing Machine), and providing on that same user system as a user platform for online, wireless navigation options and online banking processing of commands and requests (using OMS—Web-based Online account cash Management computer application System).

For general reference on online banking and online banking options, see for instance http://www.bankofamerica-.com/online, Article: ZDNet: Internet banking proves popular Down Under (Source: Jupiter Research) "Europeans trust online banking services".

For general reference on mobile banking, see for instance Http://www.nu.ie/surveys, Article: "European mobile phone users say yes to 3G" (Source: Taylor Nelson Sofres).

For general reference on electronic payment, "Electronic Payment Systems", by Donald O'Mahony, Michael Piercem and Hitesh Tewari, Artech House, Boston 1997.

For general reference on wireless banking and wireless banking options, see for instance http://www.celent.com, Article: "Users of Wireless Financial Services" (Source: Celent communications), and http://www.google.com, keyword: wireless banking.

For general reference on Check 21 Century Act (permitting use of substitute checks), effective, October 2004, see for instance http://www.epaynews, Article "FDIC Advises Banks to Prepare for Check 21 Act" (Source: Information Week), and http://epaynews.com, Article: Banks Can Use Check 21 to Regain Payments" (Source: Yahoo! News).

For general reference on Check truncation Act of 2003 (receiving check images instead of paper checks), see for instance http://www.bankrate.com Article: "Your canceled check is in the trash" (Source: BankRate).

PROBLEMS TO BE SOLVED

In order to deposit a check from an office computer, home computer, laptop, (Internet enabled) mobile device, (Internet enabled) pda (personal digital assistant), or nay other Internet enabled device (while in transit) the endorsed check image must be scanned and wirelessly transmitted to the wireless network it is linked to (in a secure manner), that is linked to a main access point where users can navigate and set preferences for commands.

During this process of image recognition and wireless endorsed check data transmission, delivery to wireless network, and linking to main access point, several security factors may arise. Security factors such as site security, transmission of data security, user identity security are recognized as main concerns.

The main problems to be solved can be formulated as follows:

1. Secure wireless transformation of ordinary (personal/business) paper and/or substitute checks into endorsed digital format and secure transmission delivered from the wireless computer network, linked to the main access point (online account management system) to process check verification, and request to deposit of funds online (electronically) into user/depositor account. Wireless endorsed check scanning device will be linked to the wireless network, using TCP/IP, AppleTalk. IPX/SPX or a comparable language tool will be used to enable the wireless check scanner device to wirelessly communicate with the computer network for receipt and delivery to the OMS (for processing). The endorsed check image will be encrypted during transmission of data, and only retrievable once delivered from the computer network to the main access point, which is authorized and accessible only through the secure site (online account management system) where user must log in to view, verify, and complete request for online check deposit transaction.

2. Multiple deposit (ie. fraudulent activity) of the same check (without prior written consent by check owner for payment schedule authorization) should be an extremely difficult task or execution. The online account management system will monitor, and log every check image received, requested for deposit, and transaction cleared for deposit. OMS will have a preinstalled tracking system, which will recognize similar deposit requests and transactions that are requested, to prevent fraud.

The data from the image received and transmitted requires a variety of specified details (user login) to be recognized, confirmed, and verified (through the bank)—to the level where it is difficult to make unauthorized online check deposit checks that do not meet the verification, and have not been authorized by OMS through authentic bank verification test.

During the transmission, the data is encrypted, and wirelessly sent from a computer network to a secure site (OMS) to where it is then delivered and accessible to user/depositor through log in prompt which allows access to their online account where the check information is then verified by the user/depositor (check amount, check date, check routing number, checking account number, bank on check) where the OMS gains permission to move the money (for the check amount listed) from the check owner's bank account, deposited into the user/depositor checking bank account (through the Federal Reserve, and/or bank authorization)—which appears in user/depositor's checking account as a wireless/electronic transfer (to expedite deposit processing time frame).

In relation to the security industry, difficult task, meaning the cost and time consumption of surpassing or defeating the system would extend far past the benefit.

Cashing, and/or depositing of money orders and/or checks online through the use of the OMS (through immediate EFT—electronic funds transfer) is unavailable to unregistered Software Device System users. Users must be registered for WEDS (in order to send and deliver image to main access point and WEDS computer network) through online OMS (for actual processing of request to cash and/or deposit money order or check), and must log onto OMS system network before scanning and/or faxing the paper check/substitute check/money order for immediate funds availability cashing, and must be connected to a live webcam, in order for OMS to accept request and begin processing and capture image of user (equivalent to picture taking conducted at a check cashing center). In order for immediate funds to be available for EFT (equivalent to check cashing, because funds will be transferred and made available immediately) user must process the entire transaction in front of the live cam, so the system can recognize and document the user, before request is processed and funds are made available to user.—OMS will have a detector that will verify that user is connected to and using a live webcam, in addition to 24-hour network security monitoring the system.

SUMMARY OF THE INVENTION

Wireless Electronic Check Deposit Scanning and Cashing Machine (also known and referred to as WEDS) with web-based computer application cash management software System (known and referred to as OMS; virtual teller), enables endorsed paper and/or substitute checks and money orders to be deposited as well as cashed and made available through an EFT (electronic funds transfer). Images are to be wirelessly scanned and delivered from the Wireless electronic check deposit scanning machine and/or through a unique fax number which is linked to the computer network—is wirelessly delivered to a wireless computer network (which serves as a access point for delivery to the OMS), where it is delivered to the OMS for receipt of image(s), delivery to user/depositor's casher's account for processing (user faxes paper check, money order, substitute check for OMS account image delivery for check cashing and/or deposit processing—may or may not require web cam "live request" for user to be able to process request to deposit and/or cash check—thru OMS wire funds/electronic funds transfer on user OMS account) and controlled through the OMS—online account management system, where the user is able to view, navigate, and process requests to deposit and cash checks (paper checks and/or substitute checks) and money orders online (through the web-based computer application software controlling system—OMS). It enables Endorsed check images to be wirelessly scanned and delivered to a computer network which is linked to the main access point (OMS), where funds (for the amount for the check/money order) are moved from the check owner's bank checking account, and deposited (electronically) into the user/depositor's account. Where the OMS (online account management system) acts as teller, by Either: 1a) obtaining verification from the Federal Reserve Bank to move funds from one location (check owner's bank account) to another location (into user/depositor's bank checking account) as an electronic funds transfer (EFT) transaction; 1b) verifying authenticity of money order with place of purchase and/or post office system and/of financial institution; 2) Moving funds from one location to the other (from check owner's banking account, to user/depositor's account, for the amount of the check) through bank authorization (or in the case of money order verifying authenticity and validity of money order in government money order documentation system during processing in order to make funds available to user cashing the money order). This transaction once complete will reflect as an electronic/wire transfer (EFT), where the funds are electronically deposited (through a wire) into the user/depositor's checking account, to expedite the check processing (or check cashing/money order cashing) time frame (eliminating time once required to be spent at the banking branch and check cashing centers; decreasing check posting and check depositing time frame, and excluding the need of a connectivity serial port, and replacing it with a device that will enable wireless check scanning of the endorsed check image—in addition to eliminating check cashing fees). The machine's computer network receives notification of wireless scan image, which is delivered to the web based program, that records on the system, and electronically notifies and verifies data with Either: 1) Federal Reserve Bank (—in order to act as a liaison to gain permission to move funds from one account to another, in an EFT transaction processing format/environment) or payor and payee's banks through OMS (or in the case of money order, verifying with money order documentation system to verify that serial tracking number on money order is valid and matches the dollar amount and date on the money order, in addition to place and time of purchase) to confirm funds to make to transfer funds from one account to the other; or 2) verified with check owners (and user/depositor's) bank. Once verified, the online account management system (that is linked to the computer network and recognizes, identifies, and delivers check image from computer network [once received wirelessly from the device]) confirms and records communication with the bank, and deposits funds into user's/depositor's account. The online account management system's web-based (which is a cash management solution for the online banking customer—individual and/or business) application software acts as a virtual teller (with the option for online live teller assistance) which wirelessly receives the endorsed check image sent from the computer network (which in turn received it wirelessly from the wireless electronic check deposit scanning machine into the computer network) where it is linked and delivered to the OMS user account queue/inbox of new images in order to allow user to verify check data, before the OMS begins processing consisting of verification and transfer funds, along with notifications, and system/transaction monitoring, etc. The request for online check deposit cannot begin (nor can the image be viewed), until the user/depositor has logged onto the online account management system, and has initiated commands (i.e. for deposit, and/or delay of deposit—for post dated checks, notifications and alters, change of password, change of user/depositor banking information, setting user preferences, etc.). All parties are given the option to be notified of transactions, in addition to attempted transaction notification via email or through messages delivered to their desktop, laptop computer, mobile phone, and/or any device with Internet capabilities. In addition, parties are able to control the processing status and/or control upon delivery of their wireless check scan image to their web based (online) account (OMS account), for check image storing purposes, deposit purposes, delayed and/or specified deposit dates requests, setting user preferences and alterations, (optional) printing of image purpose, image forwarding (via email, or fax), etc. With this invention, user does not have to be "tied down" to desktop computer, and no longer has to be bound to a serial cable to have endorsed check images sent to their online account (OMS). User can work offline by transferring data images to software database installed on their computer (for advance hard copies—through login onto software installed on computer/mobile/pda device), and transfer online for processing (at user's convenience—using a USB cable, or firewire cable for advanced transmittal operation). Most importantly, user can work online without the need of being at a desktop/laptop computer to transfer the endorsed check image, and submit requests and log on to process online check deposits. Through this invention, the user is able to wirelessly transfer and deposit endorsed check images through this device without the need of connecting to another unit; enabling the user to navigate through a mobile phone, personal digital assistant (pda), and/or any other Internet enabled device and/or wireless environment, using this method of wireless data transmission and navigation.

Wireless check scan, transmission, delivery, and processing of document image for OMS processing may or may not confirm with the check owner's bank and deposits funds into the user's/depositor's account. The online account management system acts as a virtual teller which wirelessly receives the check image, verifies check information with depositor, and initiates (optional) communication with the Federal Reserve Bank to gain authorization to move available funds from the check owner's bank account into the user's/depositor's bank account—which will act as an electronic funds transfer (to expedite processing timing).

BRIEF DESCRIPTION OF THE DRAWINGS

The foregoing and other objects, aspects and advantages will be better understood from the following detailed description of a preferred embodiment of the invention with reference to drawing, in which:

FIGS. 4A and 4B show the print options, where check owner sensitive data is blocked and unreadable during the print option feature, and/or any security feature, which causes the need for sensitive check information to be unreadable;

DETAILED DESCRIPTION OF THE PREFERRED EMBODIMENTS OF THE INVENTION

The present invention builds on a pair of technologies that we briefly discuss here. They are (1) a secure cryptographed, encrypted wireless check deposit scanning and cashing machine for image verification and data transmittal to a secure wireless network (WEDS) (2) where data is securely retrieved, verified, processed, through online navigation and setting of user specified commands (OMS).

Figure 3A:
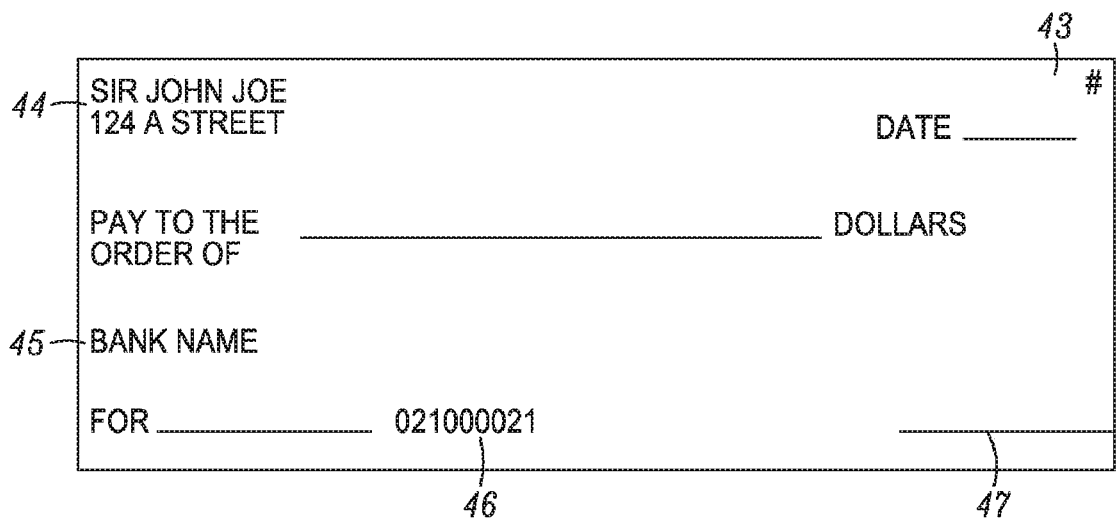
FIGS. 3A and 3B show front and back view of a paper check, and/or paper check image and how it would appear in the system.
Figure 3B:
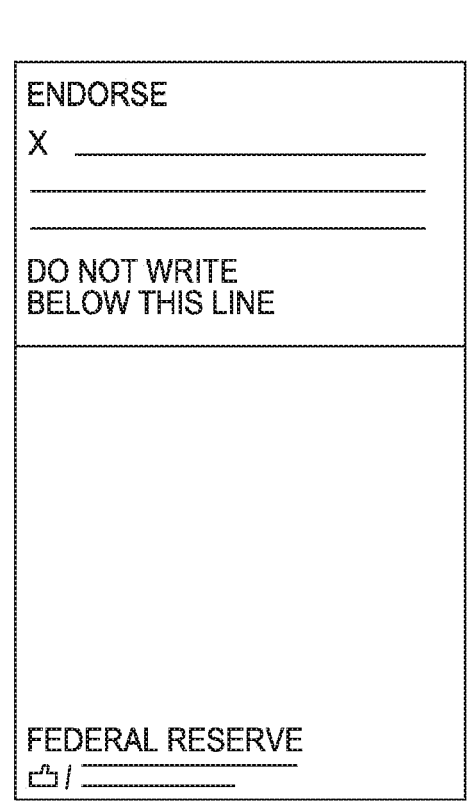
Figure 6:
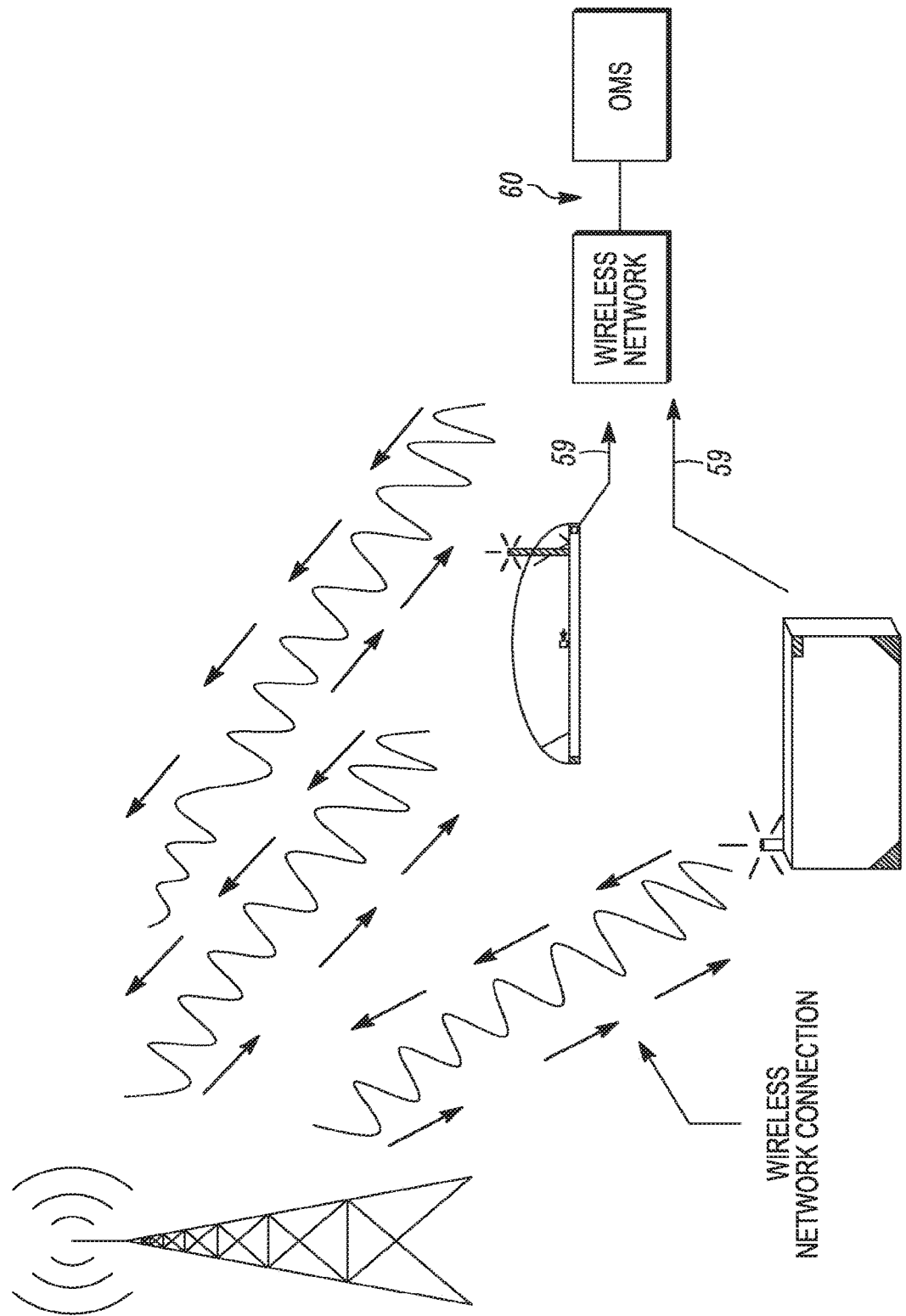
FIG. 6 shows wireless transmittal connection (two device operational variations) in connection and addition to wireless connection signal being received (delivered and connected) onto the wireless computer network, which is linked to the OMS for user/depositor transaction and request processing.
Figure 13:
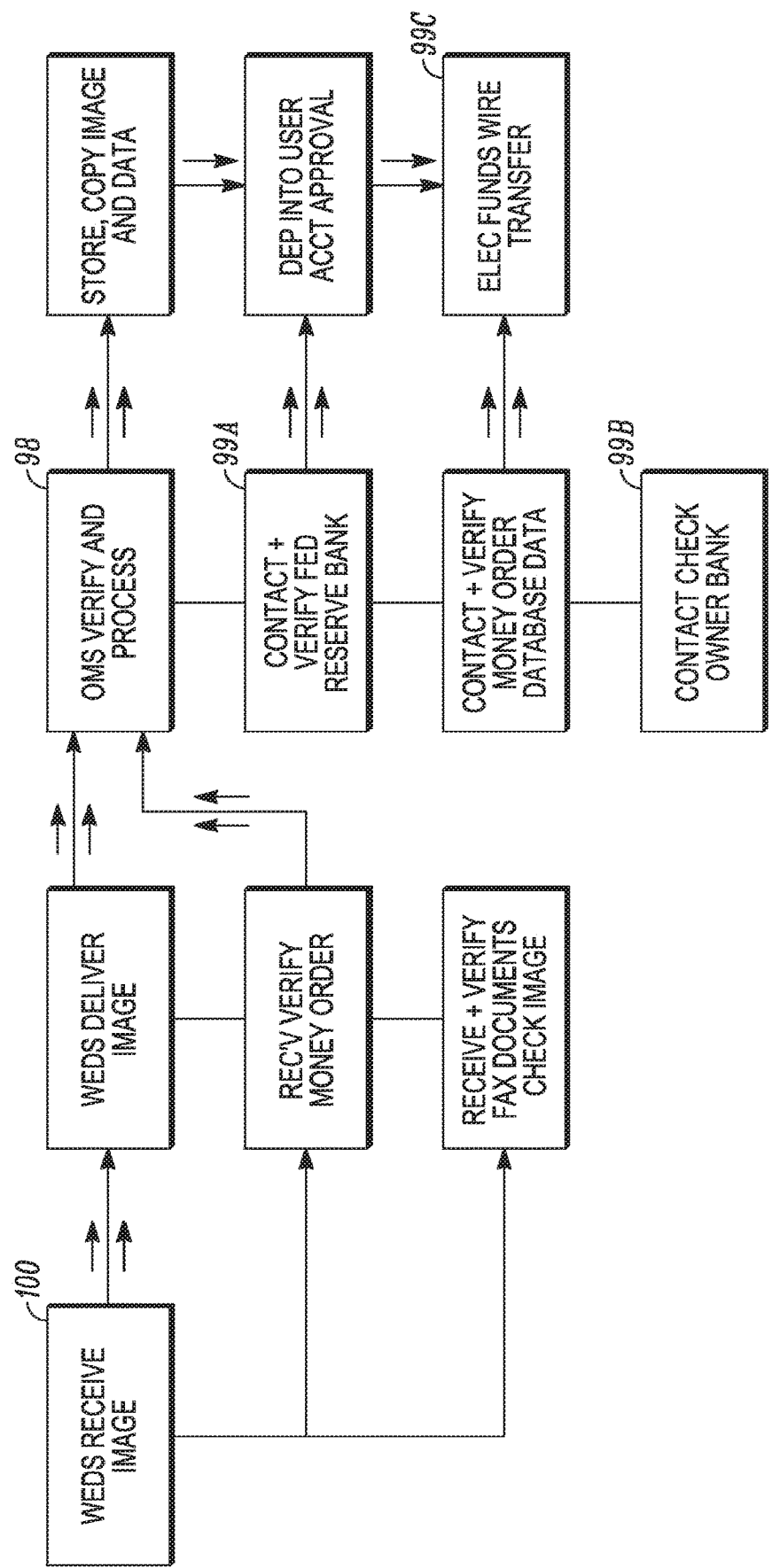
FIG. 13 displays the representation of the infrastructure containing clearing and cashing and/or deposit of funds authorization process options (through OMS), through wireless transmittal of endorsed check image, along with authorization of funds options/alternatives—Option 1. Verifying of funds with Federal Reserve Bank for funds transfer, Option 2. Verifying of funds to check owner's bank authorization to verify and transfer/wire funds into user/depositor checking account as an electronic funds transfer (EFT), Option 3 (in the case of money orders and checks to be cashed)—Verifying with money order US Postal Service money order database, and check cashing center systems database that check hasn't been cashed before continuing processing for check cashing, and notifying money order system and/or check cashing center system of checks cashed through the OMS, to prevent fraud and future attempts to cash the same check/multiple checks; also reflects recognition, receipt and verification of fax document image being received through WEDS and processed through OMS for verification and deposit of funds.
Figure 14A:
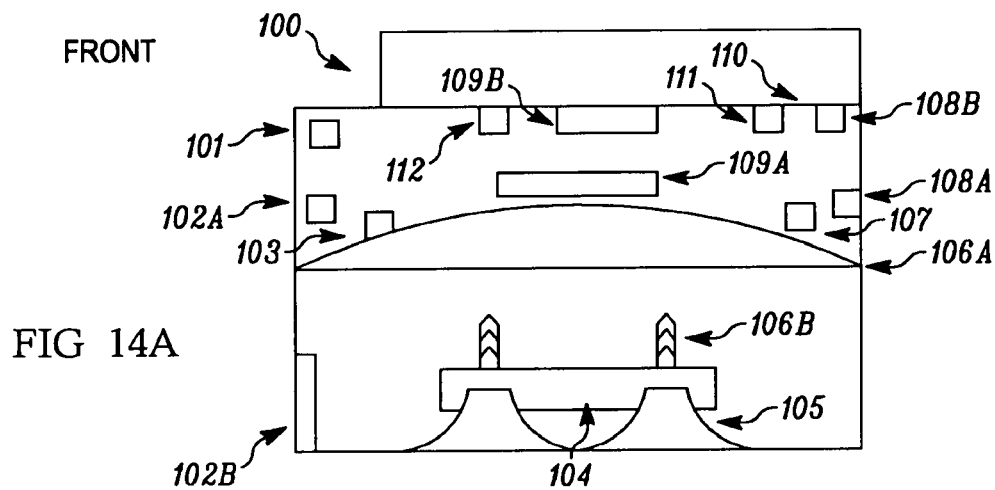
FIGS. 14A, 14B and 14C display the front (FIG. 14A), side (FIG. 14B) and rear (FIG. 14C) view of heavy duty version of the WEDS (with feeder that opens for multiple scans), for higher amount of image reading and processing; Front view showing check before and after it has been scanned through the device and transmitted through WEDS, command buttons; Side view shows the feeding and scanning process from feeding to actual point of delivery sending through the device; Rear view shows the ports and switch identifier options to designate scan to specified bank area, predetermined by user on OMS account system.
Figure 14B:
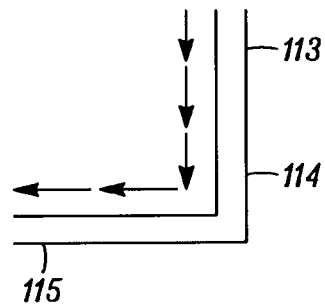
Figure 14C:
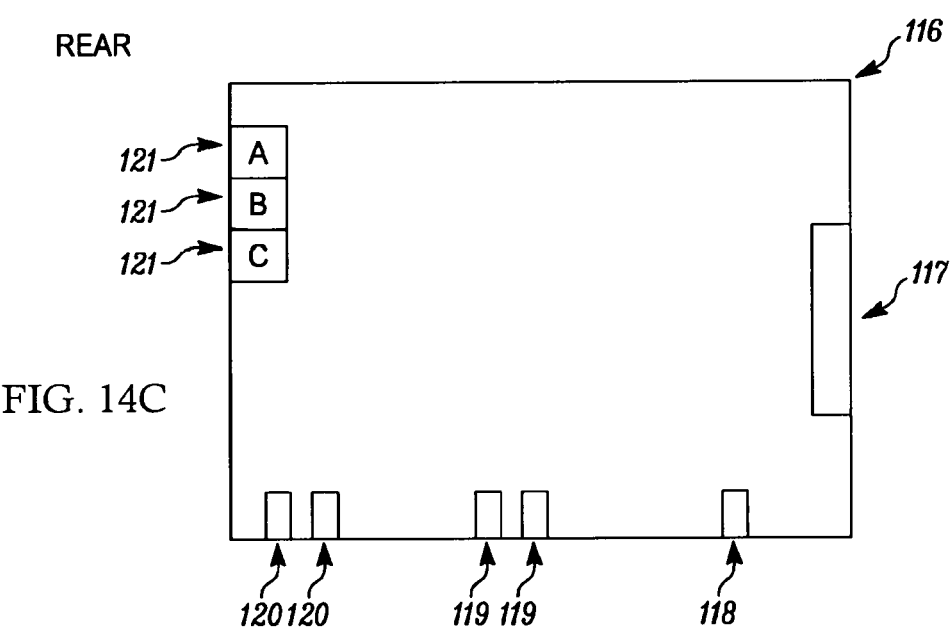
Figure 15A:
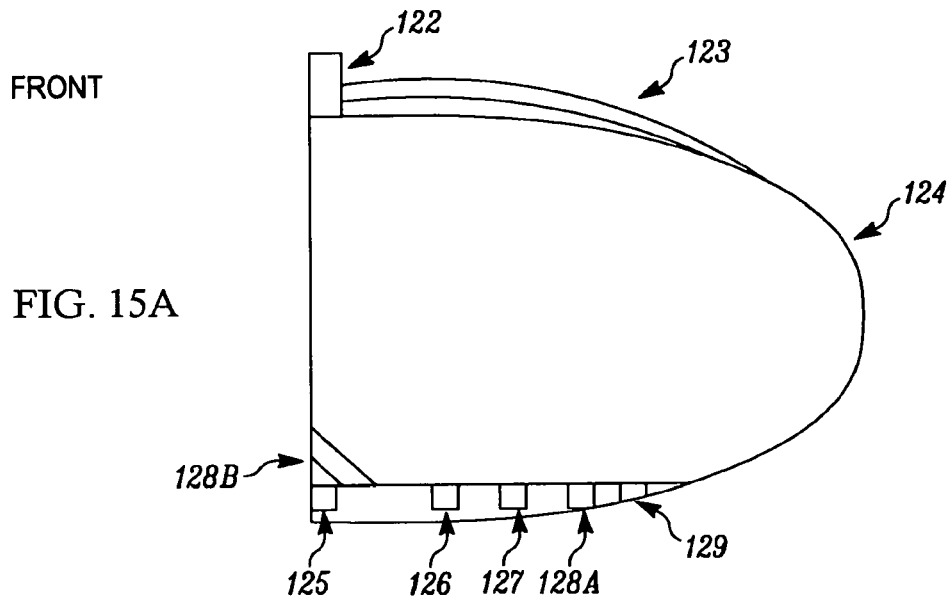
FIGS. 15A, 15B and 15C show portable view of wireless device in smaller frame, reflects extendable antenna, Front view (FIG. 15A) showing window opening option with magnetic strip and swipe head reader (for multiple simultaneous use); Processing view (FIG. 15B) shows starting point to feed check(s) (and/or money order(s)) through for imaging and transmittal, shows attachable, extendable holder that feeds checks into device (as alternative insert into device option); Rear view (FIG. 15C) showing automatic backup, multi bank identifier options (A indicating first bank account, B for second bank account, and C for third bank account).
Figure 15B:
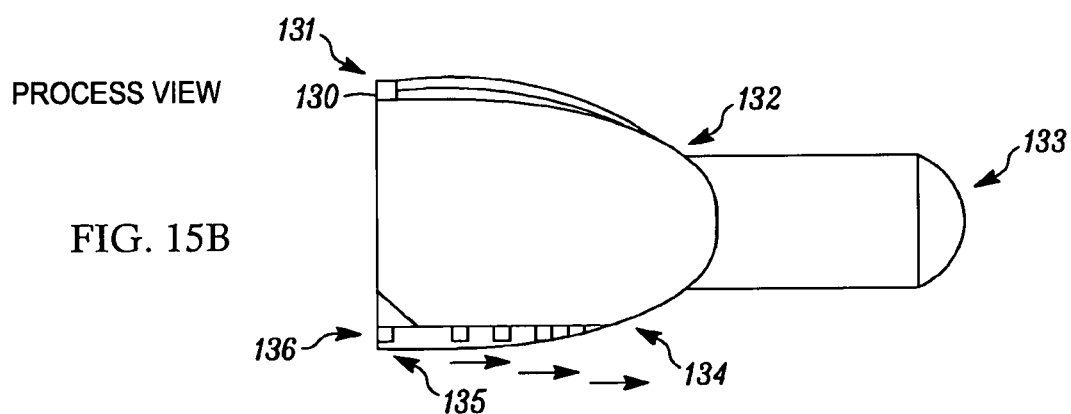
Figure 15C:
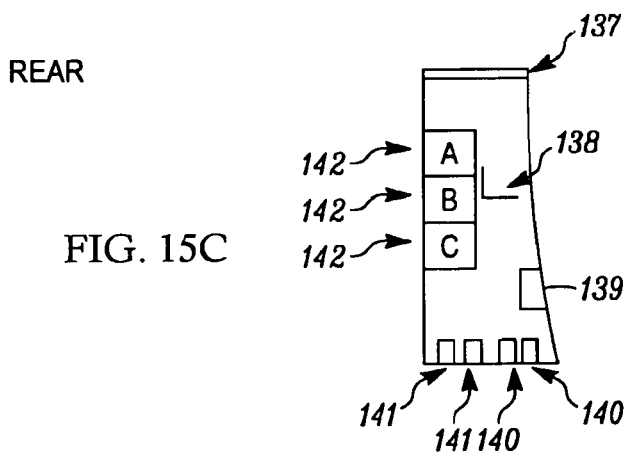

It is therefore an object of the present invention to provide and apparatus an method that allow to deposit ordinary/paper checks FIG. 3A, FIG. 3B, show the front and rear view of an ordinary check (personal, business check); 44 check owner's name and address, 43, date of check and check number, 45 check owner's bank name and address, (ie. personal and business, money orders) to be scanned, wirelessly and securely delivered to an online management system (received through the computer network) to receives and verify endorsed check image for processing. 46 showing routing number and check account number; 47 check owner's signature, check 48 check depositor's endorsement area to sign before check scanned image can be accepted, 49 Federal reserve bank stamp of validity along with their preprinted stipulations and rules found on every cashable check. Once the user has logged onto the system (OMS), the endorsed check image is viewable and processing request is available. through the OMS. FIG. 6, 58, showing the wireless signal of data received in order to deliver it to the network for OMS processing. 59, showing the wireless delivery onto the network into 60 the OMS as a final destination for processing and user navigation. The data can be Wirelessly transmitted from the wireless electronic check deposit scanning machine from home computer, office desktop, laptop, pda, Internet enabled mobile device, or Internet capable device while solving the above mentioned problems. FIG. 13 shows the representation of infrastructure containing clearing and deposit of funds authorization process and options through the OMS; 100 representing the transfer of data using WEDS (for receipt and delivery of check, substitute check, and/or money order image) being delivered to wirelessly to wireless network so OMS may act as virtual teller, to receive, store, and process check and/or money order image requests for deposit and/or cashing; 98 OMS processing for storing and recording images, to process data images for deposit and/or check cashing requests; data stored and copied to database systems (i.e. OMS database and user database as OMS account transaction history; US Postal service money order database as money order cashed and/or purchased; Check cashing database as check cashed through OMS) processing and documentation/recordkeeping purposes—showing two alternatives for verification upon receipt and confirmation of check data—to either 99 contact and verify check information with the federal reserve bank to deposit funds into user/depositor checking account, for electronic funds transfer/wire, or to contact the check owner's bank to deposit funds into the user/depositor checking account for electronic funds/wire transfer; 99a reflecting the requirement to contact the federal reserve bank for deposit of funds and transfer of monies approval for 99c electronic funds transfer (EFT); 99b reflecting money order verification and documentation database (record of transaction data) for approval of EFT; 101 showing check before scan, 102a send button, 102b infrared beam (for printing option) 103 print image option button, 104 showing where check (and/or money order) is after scan, 105 extendable resting unit to hold larger scan amounts after scan, 106a opening where checks are delivered to after feeding and before it rests in the extendable unit (after scan), 106b rolling prongs that receive (by sucking in) checks after scan for quickly scan the next check at an expedited rate, 107 void check button (to activate voiding options, press once for void and scroll for voiding type), 108a power button, 108b enter button, 109a counter (adds total checks scanned, calculates total cash worth of images—total check and/or money order paper value being transmitted), 109b number pad to verify dollar amounts, 110 feeder, 111 clear button, 112 cancel button, 113 feeder process, 114 scanning and image capturing process, 115 point of delivery (to extendable resting unit) process, 116 switch to indicate bank transmittal on OMS selection/command (all device versions have), 117 media card, 118 AC poser adapter, 119 USB ports (2), 120 firewire ports (2), 121 bank identifier options A, B, and C, 122 extendable antenna, 123 magnetic strip and swipe header (which all device versions have), 124 window opening to scan larger amount of checks simultaneously, 125 power button, 126 scan button, 127 cancel button, 128a status button, 128b infrared beam (for printing, etc.) 129 void check (feature) button, 130 swipe head reader, 131 start area (to begin feeding of check(s) and or money order(s)) for transmittal—where feeder of check(s)/money order(s) is placed to begin, 132 window opening for (multiple) simultaneous scan, 133 attachable, expandable holder that feeds checks into device (interchangeable to be attached on either side of the device) and/or feeds checks, 134 attachment clip connectivity area that connects 133 to device, 135 scanning direction for transmittal (open or closed window—open window for multiple simultaneous scans, and closed window area for single or few scans, 136 internal swipe head reader (on all device versions), 137 automatic backup area, 138 bank selector switch indicator, 139 AC Power Adapter, 140 USB ports (2), 141 firewire ports (2), 142 multi bank identifier options A, B, and C (pre registered and determined through OMS user account login and specification of account number and destination requests).

Figure 1A:
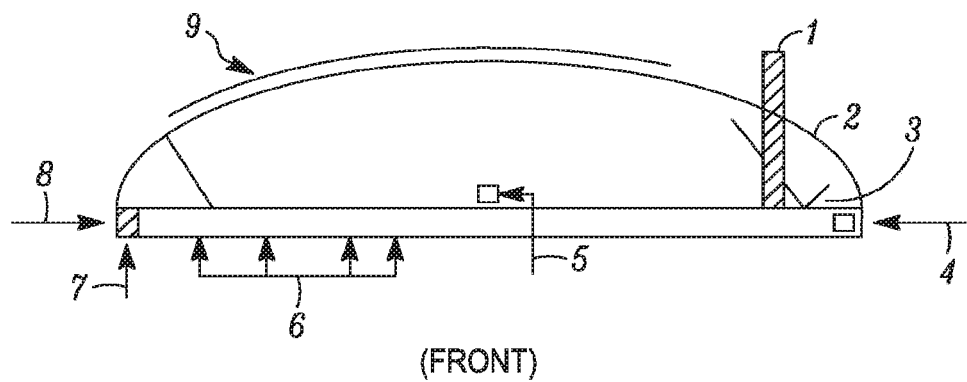
FIGS. 1A and 1B are a representation of scanner, showing both the front (FIG. 1A) and back (FIG. 1B) of the Wireless Electronic Check Deposit Scanning and Cashing Machine device.
Figure 1B:
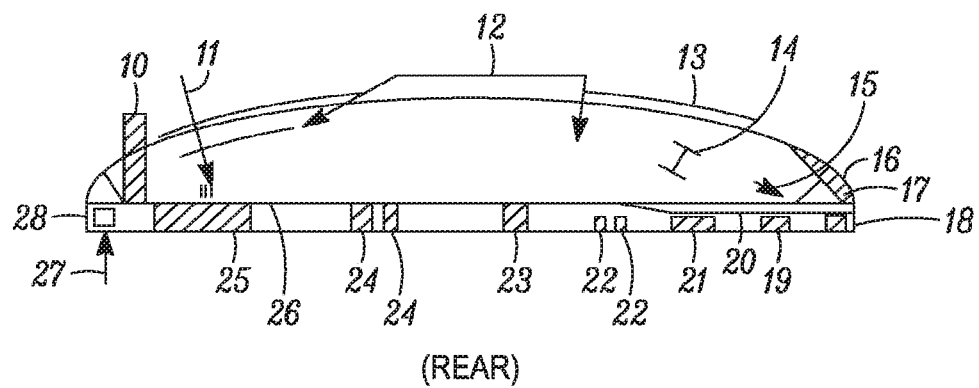
Figure 2A:
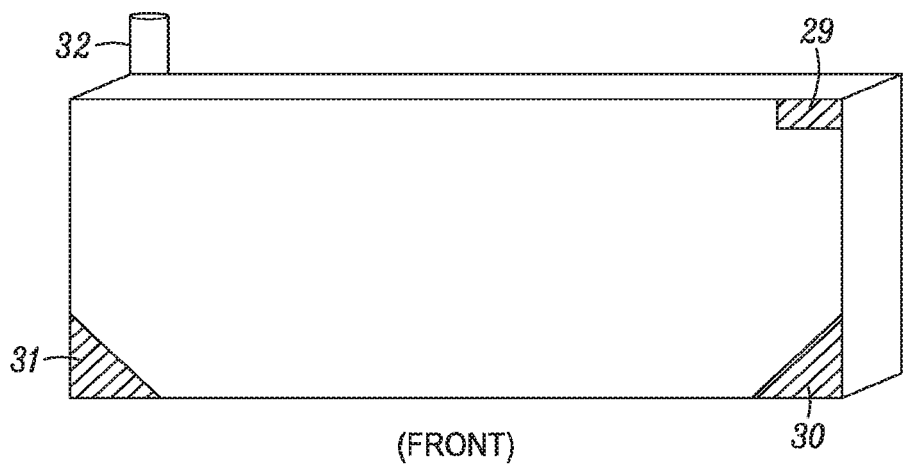
FIGS. 2A, 2B and 2C shows an alternative (version) front (FIG. 2A) and back (FIG. 2B) view of the Wireless Electronic Check Deposit Scanning and Cashing Machine device.
Figure 2B:
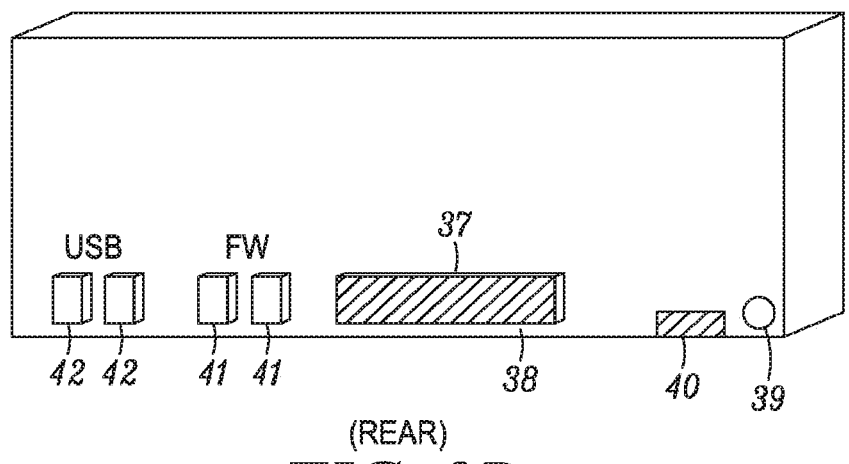
Figure 2C:
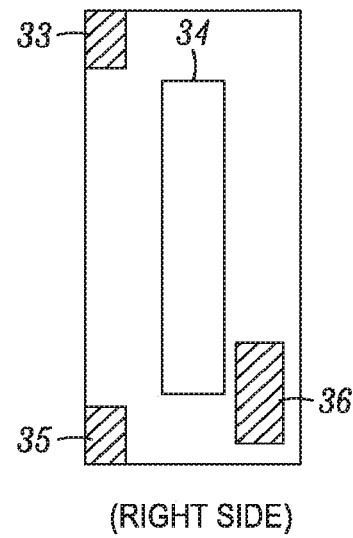
Figure 8:
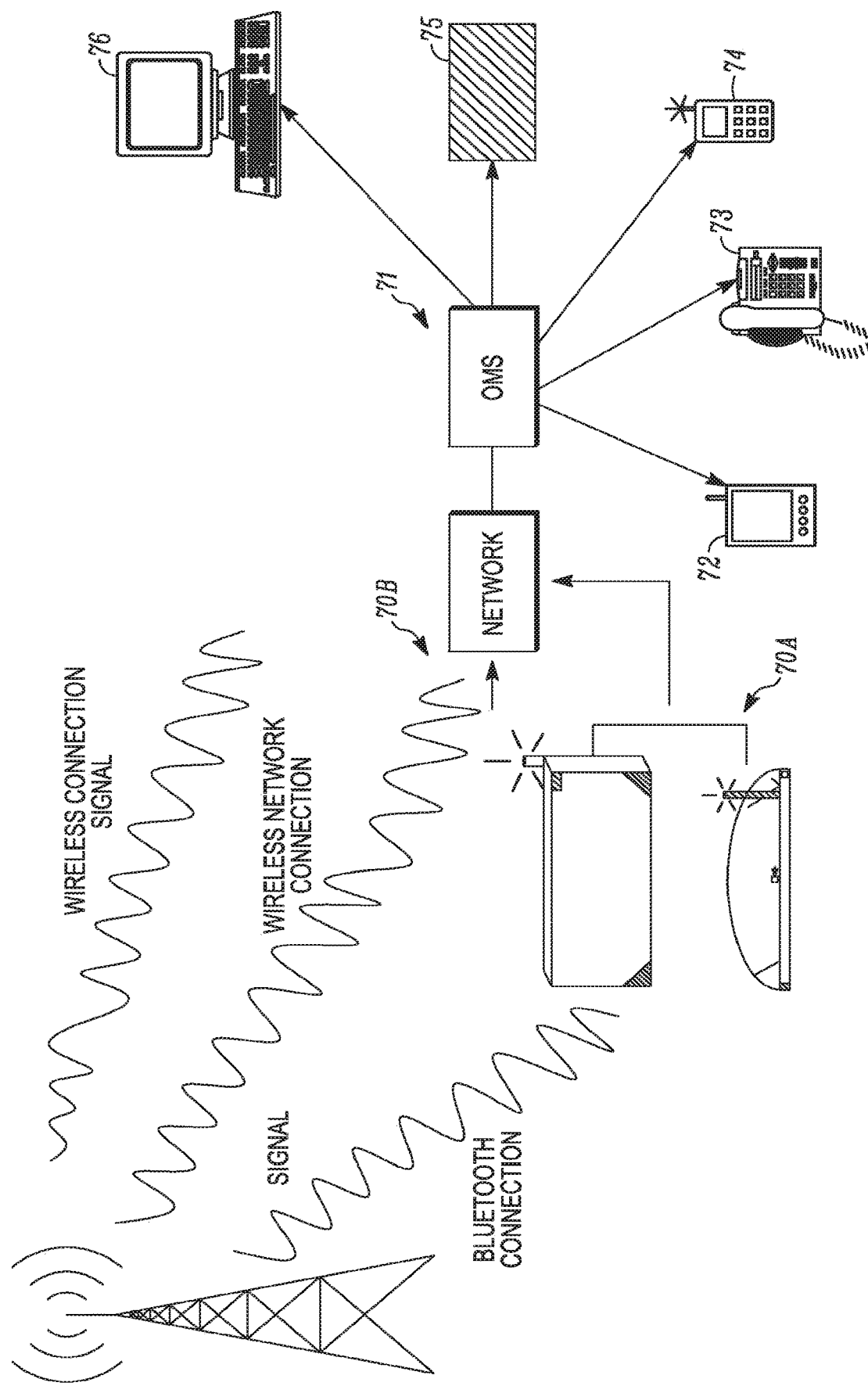
FIG. 8 displays the process of wireless transmittal signal, where the endorsed check image is wirelessly scanned and delivered to the (wireless) computer network, which is linked to the Online account Management System, which is viewable and operable through any Internet capable device—figure reflecting various ways the endorsed check image can be viewed through the OMS.

According to the invention, the Wireless Electronic Check Deposit Scanning and Cashing Machine (WEDS) And web-based Online account cash Management computer application (OMS) System allows users the ability to deposit and cash both personal and business (paper/substitute) checks and/or money orders through the Internet, using a desktop computer, laptop computer, personal digital assistant (also known as a pda device), mobile phone, or any Wi-Fi Wireless Fidelity (known as Wi-Fi), and/or Bluetooth enabled device FIG. 8 showing 77 wireless connection and communication representation from device onto wireless network (vice versa); 70A showing two optional device designs, 70Bm showing delivery signal from wirelessly scanned and delivered (front/back) endorsed check image, 71 OMS infrastructure serving as main access point for user—where 72 mobile phone (Internet capability), 73 fax machine, 74 pda with Internet capability, 75 laptop, 76 computer—Reflecting Five options for user navigation and delivery of endorsed check images for processing. FIG. 1A, FIG. 1B showing a wireless electronic check scanning device; 1 is the optional retractable antenna (to increase wireless signal capabilities); 2 and 10 being a side crease fold-in option (with button), that allows greater mobility of the device, by decreasing it's size; 3 and 16 being the powerlight; 4, 6, and 8 being the data connection unit to allow hardware to deliver the data while working offline; 5 being the status light to inform user of check image data transfers successful and in progress, with built in cancel, save, and void button; 7 being where the check scanning begins; 9 and 13 the opening of where check can be inserted and scanned. 11, and 12, 14, 15 being the bottom and top blade cutters (incision makers)—from raised cutters, to top crisscross cutters, to raised bottom cutters—to make proper incisions into the paper as an option during the check voiding process; 17 being cutter area resting location where cutters lay flat to not interfere with check scanning process when cutting feature/option is not in effect; 18 USB ports, 19 firewire connection port, 20 and 26 secure layer to separate cutters from port locations; 21 (pc) serial port B, 22 cell phone and pda serial cable connectivity port; 23 back up power port to insert power cable into; 24 button that initiates lifting and activation of cutter/incision process. 25 (pc) secure cable port A; 27 starting point opening where check is inserted to begin the scanning process. FIGS. 2A, 2B and 2C show an alternative view option of the device, 29 and 32 being the opening slit to slide check through for image scan; 30 for infrared beam option (to beam scanned image onto printer, also allowing device to beam/transfer to another Bluetooth, 802.11 (wireless fidelity) enabled device (ie. mobile device, pda device, printer) for viewing, printing, forwarding, etc. purposes; 31 power status light to inform of transmission status—green light for successful transmissions, red light for unsuccessful transmission, amber light for reading error, 32 extendable antenna that allows the device to reach and connect with nearby wi-fi locations, Provides increased signal access for wireless transmission and connection to the computer network for OMS receipt and user processing, 33 send button that commands the scanned image to be (wirelessly) transmitted to the computer network for OMS processing, 34 media storage slot (for media card. ie. smart media card to store images onto, in addition to back up pre installation feature), 35 store button that commands the device to continue to temporarily keep the scanned image and deliver it to the media card being inserted into the media storage slot, 36 media storage ejector button which ejects the media storage card, 37 4-8 hour re-chargeable battery opening area, 38 internal battery area/ section, 39 is the power chord connectivity port, 40 being the pda connectivity slot, 41 firewire ports, 42 USB ports. Measurement options 6½"-7" long; 3½"-4" high; ½"-3" wide (adjustable length and height). Light weight ½ pound-2 pounds.

According to the invention, a System is created where once check transmitted to bank for deposit has processed, the OMS virtually voids the check (through documenting the check data in the system) to prevent future deposits of the same check. The physical check into be destroyed by the depositor/user. In addition, check owner's bank has the option to cancel the check/mark the check paid upon withdrawal of funds for check amount, and notification from the OMS that the transaction has been processed/the check has been cashed for deposit by user/depositor, to prevent future unauthorized use of the same check, and/or any type of fraudulent acts (An exception to not allowing the same check to be used, is when check owner has pre-authorized—in writing that the check may be referenced for regular deposits, as an electronic transfer of funds from check owner's into the user/depositors. This makes online check deposit less time consuming, and allows the user to use the same check image for future payments, for the dollar amount, and date check owner has agreed upon).

Figure 7A:
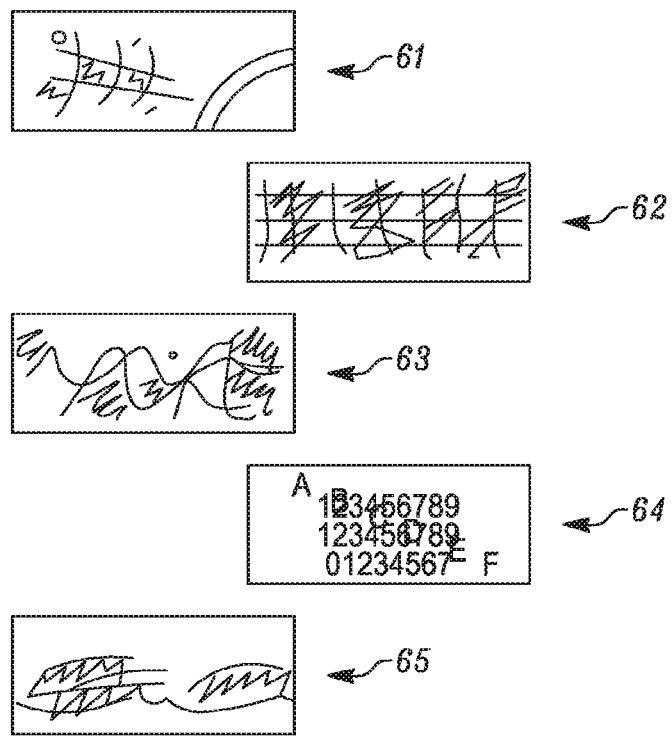
FIGS. 7A and 7B show the protective image slide security feature option for online pre-installed on the software program.
Figure 7B:
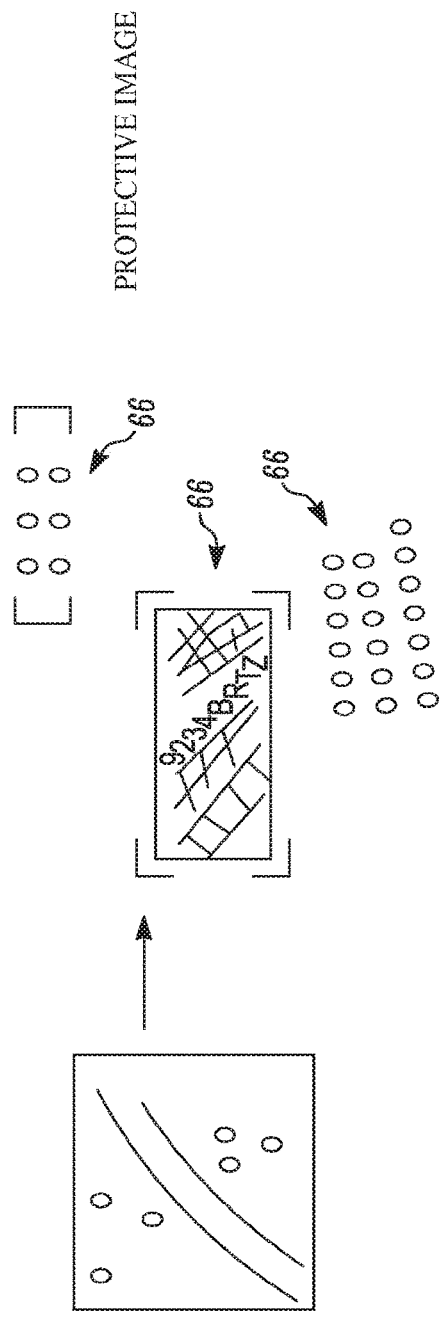
Figure 7B:
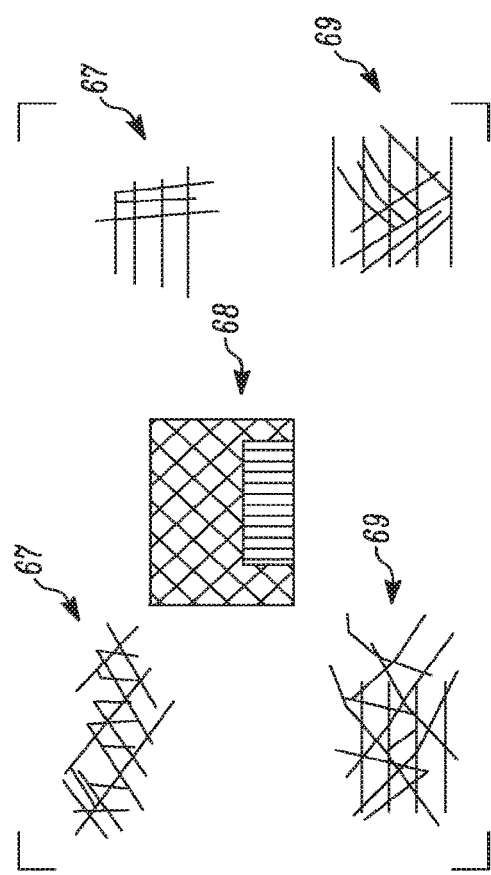

According to the invention, a unique wireless electronic check cashing and depositing scanner is used to scan and deliver endorsed check images to be wirelessly transmitted to a computer network that is linked to the OMS for processing. The image of the endorsed check is encrypted during transmittal for receipt of the image to the wireless computer network, to be linked to the OMS for processing. Before the image is transmitted, it goes through an (optional) coded conversion process, where a coded protective plate is chosen at random, to distort the view or image of the check. Once the transmittal is received, the bank releases the programmable code protective plate by 1. entering a security code to release the plate from the check, making it visible. 2. device software installed at the bank, where the system recognizes the program's unique protective plate patterns, and automatically extracts the plate that distorts the image, to make the image recognizably readable and visible. The code protective plates distort the image received, and release the plate through image extraction of the plate, to allow image to be visible—which are shown in FIG. 7A, and FIG. 7B; which 61, 62, 63, 64, 65, 66, 67, 68 shows protective image 11I, a slate that covers check information through unique design cover that blocks visibility of the scanned check image; 69 showing the same as the above 61-67 mentioned with the inclusion of barcode appearance; 64 shows the same as the above mentioned 61-68 with the inclusion of number and character scramble combination; 66 showing the same as the above mentioned 61-68 with the inclusion of background static appearance to make the check image unrecognizable. This is programmed into the software program and is a vital part of the security foundation of this invention, upon endorsed check scanning and wireless transmittal and delivery of the check is processed so through virtually partitioning the digitized version of the check into a plurality of regions, which may be in stripes, zones, and/or designated areas (decided upon by the bank) is an added feature option. Each region is extracted and encrypted before transmittal to the bank. Upon receipt of the check from the bank, designated areas of selected regions are voided. The check image, once recognized, is submitted into verifying system, which is accepted, validated, and processed through the bank, data is sent through a secure site and system that receives, recognizes, delivers, receives verification of data and initiates deposit confirmation and approval. FIG. 4A, FIG. 4B shows the data sensitive check data image (front and back) that is unreadable during data transfer, shows the image data block, that makes check owner data unreadable, and un-viewable during request to print and forward to another party, without completion of transfer, and without user log in; 77 is check owner data encryption, 78 is routing number and 80 checking account number data encryption, 79 signature blocking, 81 user/depositor signature block.

According to the invention, a unique feature of WEDS through OMS (WEDS.OMS) processing of allowing checks and money orders to be cashed and deposited; online, wireless check cashing made available through web cam photo capturing (of live image user), which is required in order for request to be verified, confirmed, and processed for immediate availability of fund (for amount of check/money order) made available into user/depositor/casher's account through EFT (electronic funds transfer)—also giving OMS the option to make funds available for immediate cashing (on checks) by borrowing monies against user's banking account (for either amount of check, or half the amount of the check—depending upon requirements and processes of the bank).

According to the invention, a unique scanner is used to scan endorsed check images and wirelessly transmit the check image to the OMS to process check deposit. Some encrypted indicia may be printed on the check (in addition to other security features and options listed and discussed below). Upon endorsed check scanning and wireless transmittal and delivery of the check is processed so through virtually partitioning the digitized version of the check into a plurality of regions, which may be in stripes, zones, and/or designated areas (decided upon by the bank) is an added feature option. Each region is extracted and encrypted before transmittal to the bank. Upon receipt of the check from the bank, designated areas of selected regions are voided. The check image, once recognized, is submitted into verifying system, which is accepted, validated, and processed through the bank. Data is sent through a secure site and system that receives, recognizes, delivers, receives verification of data and initiates deposit confirmation and approval.

According to the invention, the scanner has an pre-installed security feature, where upon successful image conversion and recognition—the scanner imprints unique ink imprints and/or unique incision patterns into the check, to immediately void the check before it has been released from the scanner (once check image has been verified and received for processing). This feature is optional (and is dependent upon user's/depositor's needs).

Figure 12A:
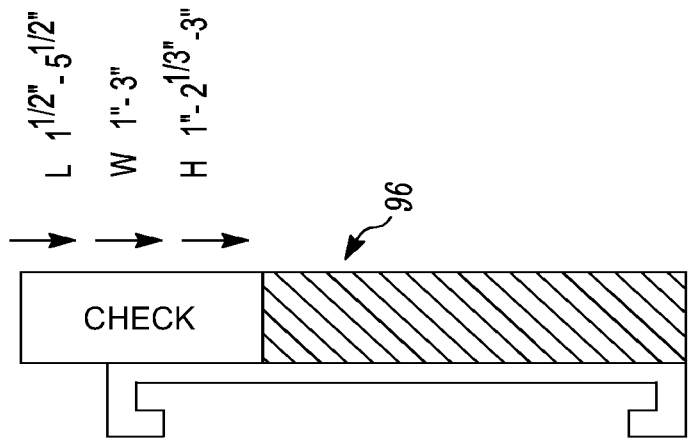
FIGS. 12A, 12B and 12C show the adjustable clamp connectivity option for offline scanning through mobile phone (future deposit option)
Figure 12B:
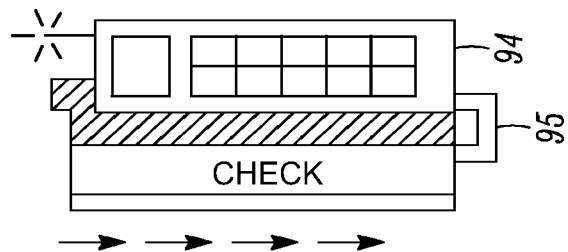
Figure 12C:
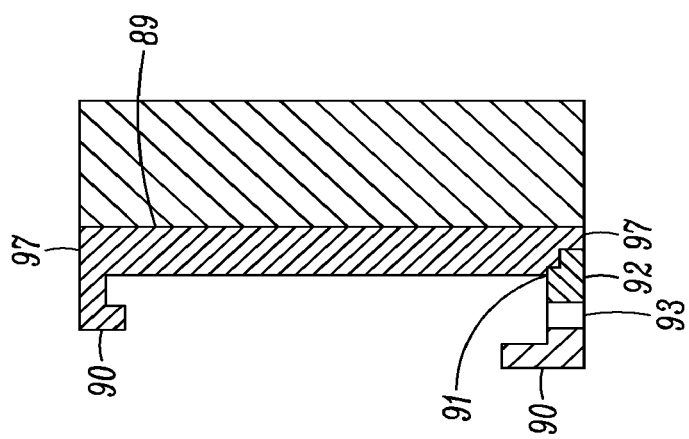

According to the invention, the option for adjustable clam connectivity feature, where the check image can be copied onto mobile device and/or pda device while working offline, and/or for future deposits (due to the Check 21 Act, banking consumers are less likely to be able to post date a check due to electronic processing, but the OMS allows user receipt of check images using WEDS for post dated check cashing and deposit options, so checks can be written for a future date, pre-stored on user's OMS account, and set by user to command OMS to process request for deposit on user specified date). FIGS. 12A, 12B and 12C show an adjustable clamp connectivity option—90 is the clamp that is adjustable to the size of the mobile/pda unit, 91 USB connectivity port, 92 power button, 93 cell phone connectivity port to transfer data from clamp option unit onto mobile/pda device, 94 showing the mobile/pda unit capability to connect and transfer the image, 95 showing the opening where the check can be scanned through, 96 showing check capability to be scanned through the adjustable clamp connectivity option According to the invention, factor in security feature of this invention are the pre-installed (thin very sharp) blade option feature that cut the check into threes using a multitude of cutting or shredding processes. Cross-cut feature where blades cut from left to right (located internally in the center of the device—which lay flat and raise up during cut feature option selection), from right to left, and up and down (located at the bottom of the device—which lays flat and rises upward once the cut or incision feature has been selected to be executed)—forming a cut pattern that ultimately destroys the physical check; straight horizontal cut feature and straight vertical cut where the light, thin, sharp blade cuts from top to bottom and from bottom to top simultaneously as it successfully scans.

According to the invention, the secure cryptography generator is pre-installed in the user device; which enables the digitized version to be securely transmitted wirelessly and sent to the (wireless) computer system network, which is linked and delivered through a secure site (web-based online account management application program controller system), and processed for deposit. Once the bank receives and converts the wirelessly transmitted data into a readable format through a translation software system, also referred to as the online account management system (which may also be referred to as OMS) (delivered through an encrypted processing format) the check information is verified, and the user request to deposit is received and information confirmed. Once approved for deposit, the bank system records the check data received in the encrypted check image (and sends notification to online account management system) to deposit the funds into the depositpr's account (whcih acts as a wireless transfer for immediate availability), through the online account management system's secure site—(bank, routing number, account number, date of check, amount of check, payor's signature, payee's signature to endorse the check)—which is linked to the bank's system to verify check depositor, check owner information, check amount, and user information—from the check depositor payor and payee, to keep record of the transaction (to immediately void out the paper check, to prevent fraudulent deposits, while keeping endorsed check image on file {12-48 months—which may vary depending upon user request, and banking policies and regulations} for future reference—ie. should check need to be re-deposited, reissued, should a discrepancy occur)—from initial request to bank verification and identification process, all the way to the final approval and check deposit execution. Check image can also be stored for check owner authorized (in writing), for re-occurring deposits, which can be used for individual and/or business users who receive regular payments in the same dollar amount increments on a monthly, weekly, quarterly, etc. basis from selected users (businesses and/or customers/clients who have a consistent payment pattern that repeats itself). In addition, check image may be stored on the user's online account through the web-based user's online account management program application controller system to process the deposit as a wire once the front and back image of the endorsed (signed) check has been captured and recorded.

According to the invention, wireless electronic check scanner comprised of TCP/IP, AppleTalk, or comparable language tool to enable the wireless electronic check scanning device to communicate with the wireless computer network, in order for check image to be delivered to the linked OMS, and sent to user/depositor account for processing—furthermore, allowing commands to be set forth using a computer, mobile phone and/or any Internet enabled device.

According to the invention, comprised of durable variations of plastics and metals to produce the (foldable) scanner that is foldable in certain areas of the device for increased user device mobility options.

According to the invention, scanner furthermore comprised of pre-installed connectivity ports (such as USB, firewire, serial cable), antenna, power button, backup battery, rechargeable battery, carrying case (for travel), refillable ink and blade slots (optional), send button, preinstalled Wi-Fi/Bluetooth chip to enable wireless capabilities (to allow device not only connectivity to the wireless computer network, but enablement to scan the endorsed check image wirelessly without the need for a connectivity port or cable).

In addition, old of this invention consists of the process of scanning, and depositing a check online (using a serial cable).

According to the invention, newness of the invention consisting of process of scanning and depositing an endorsed check image online through Wireless Transmission, onto a wireless network, that links to an OMS, where the user can log in, set preferences, and begin processing.

According to the invention, newness of the invention consisting of wirelessly scanning front and back image of the endorsed check image, and delivering to a Wireless Computer network, where user can log on to view, and navigate.

According to the invention, newness of the invention consisting of user ability to navigate using the OMS via desktop computer, laptop, Internet enabled mobile device, and/or any other Internet enabled device.

According to the invention, newness of the invention consisting of Wireless Electronic Check Deposit Scanning and Cashing Machine (WEDS) And web-based Online account cash Management computer application (OMS) System which is a multi functional, multi dimensional secure, data encrypted System where WEDS allows successful transmission of data and images through the wireless fidelity (802.11b Bluetooth) device, and through fax image option securely delivered to wireless computer network (through unique, customer identified fax number that links OMS account user's fax number to wireless network, which receives the fax image(s), and sends to the OMS for processing) to securely receive and deliver data to a specified access point—the OMS—which is the wireless navigation feature of the system which allows the system to act as a live teller, processing check deposit and cashing requests for users online in a wireless environment—where the OMS gains permission, verification, authorization from Federal Reserve Bank (in the case of check deposit, check cashing), Financial Institution (in the case of check deposits and check cashing), Post Office Databases and Banking Systems (in the case of money order depositing and cashing).

According to the invention, newness of the invention consisting of pre-installed microchip that stores data in the event of connection error, low battery, and unsuccessful transmittal.

According to the invention, newness of the invention consisting of online money order print option, where user can log on to OMS account and request to purchase of money order, which will allow user to then print out money order once it has been printed—money order will have watermark, and special coding which will provide as validity to the content of the money order, in addition to the OMS automatically documenting the money order and bank database to advise of transaction processed and serve as proof of purchase, in addition for OMS documenting it's own system for recordkeeping purposes.

According to the invention, newness of the invention consisting of tracking system on the OMS, which recognizes transactions that request similar deposit or check/money order cashing requests, and requests for multiple deposits through the OMS, and/or through the check cashing center Databases, and/or through the financial institution databases—verifies the validity of user out of state checks before processing requests.

According to the invention, newness of the invention consisting of the ability to give OMS users the option to utilize the service for check referencing—this will allow user to deposit the same check every month, to cater to return customers/clients the user may use—this service requires user authorization signature, in addition for documentation reflecting check owner is requesting this service as well, which reflects check owner's signature and bank information—where OMS verifies with check owner, and with check owner's bank that they have signed up for service, verifying how long they want the service, and being informed that if they need to make changes, they are to contact the vendor which they signed up through.

According to the invention, newness of the invention consisting of protective plates being chosen at random to distort the view or image of the check—also the option to enter a security code to remove the protective plate upon delivery to computer desktop for future deposits—protective plate is feature of software that is available to the bank to ensure security.

According to the invention, newness of the invention consisting of the OMS feature for automatic tax preparation through expense processing, spending and receivables itemization—system recognizes Spending from Revenues (money being added, deposited, accrued in interest) and provides and itemized chart and workflow sheet, in addition to ways they can save, and traditional IRS filing documents that may be tailored to that account—system also includes total spending and revenue each quarter, annually, along with total dollar amount of donations, and lists things that can be written off, and recognizes them on user account (ie. Church donations, business expenses, etc)—through this IRS grouping feature—feature also gives the user to enter donations that haven't been recorded on their bank statement (ie. Cash donations, clothing donations, etc.); finances grouped and automatic expenditure is processed based upon how user groups transaction history and data provided on his/her account.

According to the invention, newness of the invention consisting of OMS feature virtual bookkeeper, which itemizes and keeps user abreast of personal and business transactions and Spending throughout the year; informs user of balance status, frequent or uncommon deposits and/or withdrawals on user's account (fraud prevention) and alerts user when balance reaches a certain dollar amount (set by the user), also shows user how much money they are paying their bank for banking account services and profiting on interest on banking/financial institution accounts.

Figure 9:
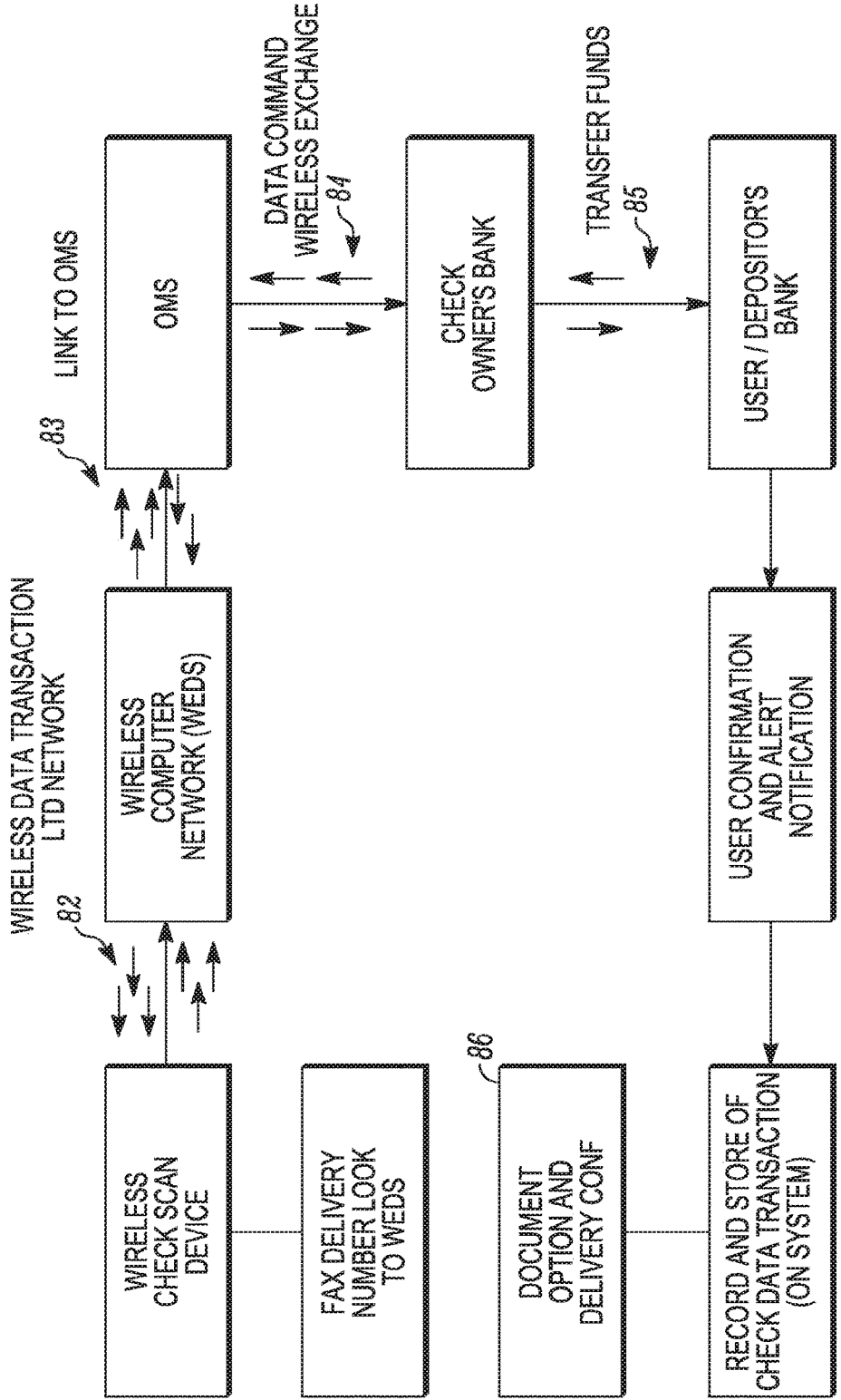
FIG. 9 shows the representation of the infrastructure containing wireless check scanner which is linked for joint operation ((a) Wireless Electronic Check Deposit Scanning and Cashing Machine (WEDS) and (b) web based computer application controller system=joint operation) with web-based OMS (online account management system) through wireless data transmission into wireless computer network, linked and delivered to the OMS, data and command exchange through wireless navigation (ie. web based application program), transfer of funds into user/depositor bank checking account.

According to the invention, newness of the invention consisting of the Wireless Electronic Check Deposit Scanning and Cashing Machine (WEDS) having pre-installed wi-fi capabilities, which is able to communicate and deliver data to a wireless network, that is in return linked to, and able to send the data to OMS for user/depositor/cashing request processing. FIG. 9 representation of infrastructure containing (wireless) check scanner linked for joint operation with web-based OMS; 82, showing wireless transmission of data from the wireless device, onto the (wireless) computer network, 83, showing computer network being linked linked to the OMS, for processing and user navigation—where in 84, the data command exchange and wireless navigation is confirmed and by the OMS from the check owner's bank (through bank verifying of funds or federal reserve bank); 85 showing transfer of funds from check owner's bank into check depositor's/user's bank account, where the user, check owner confirmation and alert notification of the transaction is copied and logged onto the database for recordkeeping and secure documentation purposes. 86 showing once the check deposit request has been processed, user has documentation and delivery options, where the user can opt to have images and records for that transaction saved to his/her account (for a term of 12-24, or 12-48 months), can opt for printing of transaction confirmation sheet, and have verification of check deposit transaction forwarded to a user specified area/location.

According to the invention, newness of the invention consisting of check images ability to be stored for future deposits (ie. in the case of post dated checks), where the system can be set to deposit a check (or an unlimited number of checks) on a specific date for processing—in addition to reminder cue feature option, which reminds user/depositor of checks stored in the system that are waiting to be deposited, reminding user/depositor of time frame before check is no longer valid (ie. 15 days left, 20 days, 30 days, 60 days left, etc.).

Figure 11:
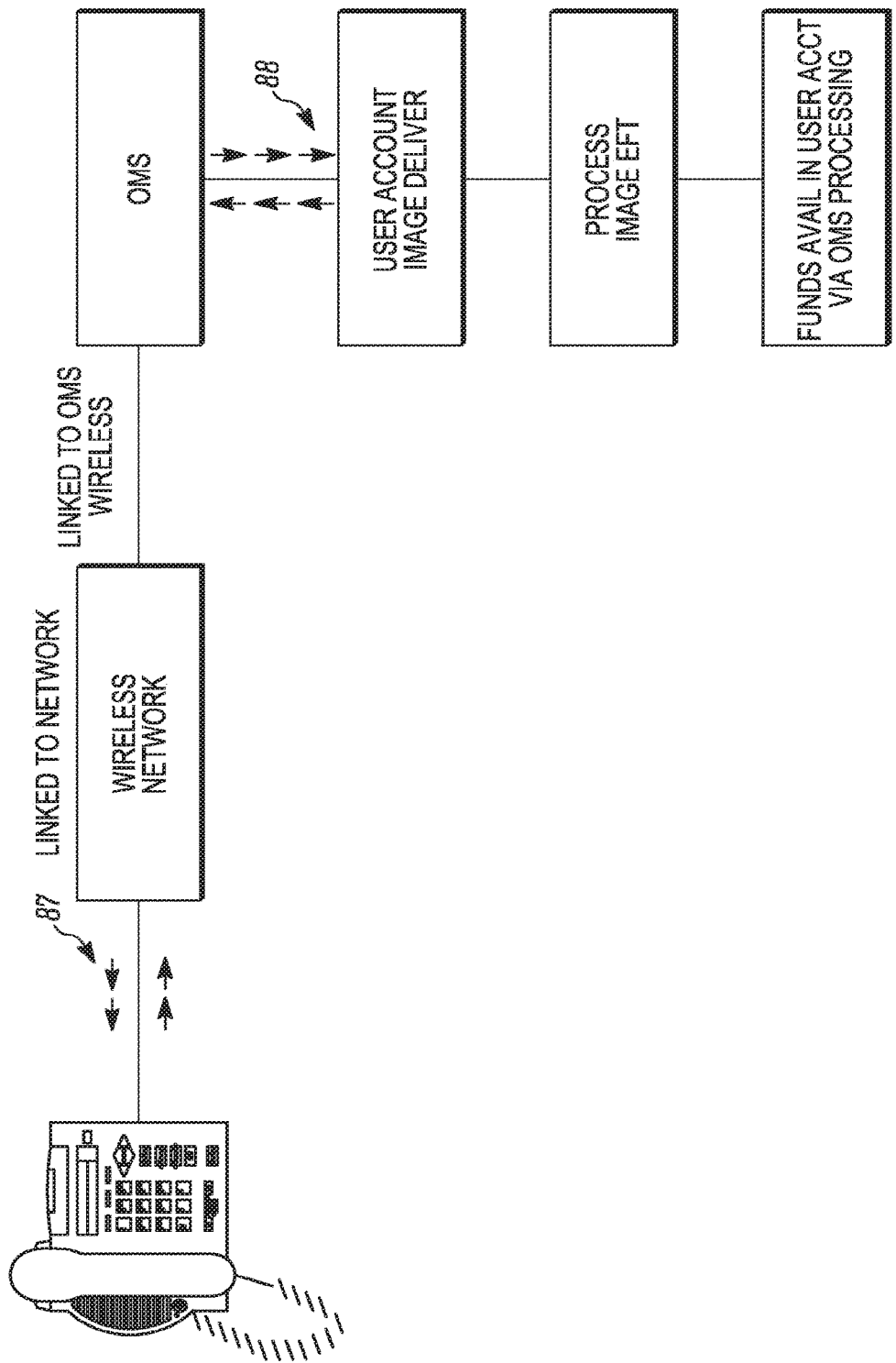
FIG. 11 reflects the fax option, which provides the user with a unique fax number where the check/money image is sent to, wherein the fax number that carries the image is connected/linked to the computer network that (WEDS) that delivers the image to the OMS for processing.

According to the invention, newness of the invention consisting of endorsed check image capability of faxing the endorsed check to a designated phone number, which is connected to the wireless network, to deliver the image from the phone number that connects to the computer network for OMS delivery, and/or delivery from the fax machine that is sent to a specified fax number that is connected to the computer network, and emailed to the OMS for user delivery. FIG. 11 shows representation of infrastructure containing fax option image delivery to wireless network; shows 87 the fax machine connecting (wirelessly) to the wireless computer network, which receives, confirms, and delivers the paper check, substitute check and/or money order image to the OMS (using WEDS), that 88 connects to the OMS and processes data for user/depositor/casher's image delivery to user's OMS account for processing funds availability.

According to the invention, newness of the invention consisting of wireless electronic check deposit scanning machine operating as a wireless transmission of data resource and the web-based computer application controller system software it is linked to working as a navigation tool that allow both to intertwine together as a whole.

According to the invention, newness of the invention consisting of the ability for check to be voided through ink prints and/or thin blade/cutting incisions.

According to the invention, newness of the invention consisting of USB, firewire, ports for offline backup of image storing when wireless transmission operation not in use.

According to the invention, newness of the invention consisting of alert notification, where both user and check owner have the option through their bank to be notified through an alert via email, mobile phone alert, and/or regular mail correspondence of all online check deposit transactions, and/or attempts for that transaction.

According to the invention, newness of the invention consisting of the ability for OMS (online account management system) to act as a liaison between check holder, user/depositor to verify funds, and gain permission to move funds (for the check and/or money order amount) from the check owner's banking account (or in the case of money orders, deducted from the payables database and funds of US Postal Service money order cashing and/or deposit approval) to the user/depositor account as a wire/electronic transfer (to expedite deposit time frame), through authorization and confirmation with the Federal Reserve Bank, check owner's bank, check cashing center database, and/or US Postal Service money order database.

According to the invention, newness of the invention consisting option where non-check documents that fit the size capacity can be scanned and wirelessly transmitted to the computer network, linked to the user account for document service option.

According to the invention, newness of the invention consisting of wireless scan that captures both front and back of the endorsed check image.

Figure 10:
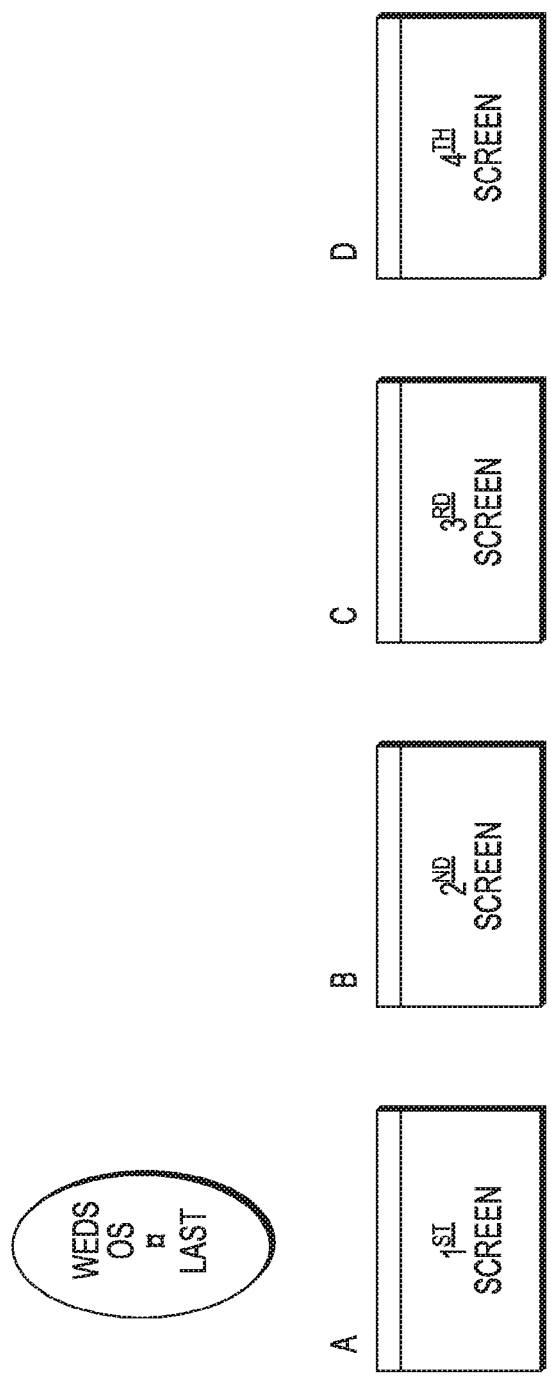
FIG. 10 displays the software installation process and concept available for installation on pc, laptop, pda, mobile device/mobile phone, and any other Internet enabled device.

According to the invention, newness of the invention consisting of software program that allows wireless electronic check deposit scanning machine to execute commands set forth by online user/depositor (ie. receive check images through scanning device it communicates with, and is linked to, verification of the endorsed check image data through user log in and typed verification input, confirm data with check owner's bank, alert options and settings, record of transactions, and endorsed check images and deposit info. on file, live teller option feature, liaison capability to verify transfer and disperse of funds for electronic deposit EFT, set language capacity—English, Spanish, Greek, Chinese, Japanese. FIG. 10 shows an example of computer program installation process; area "A" of the diagram is 1st screen that sets user preferences (ie. language, file type selection for images to be sent and viewed in, selecting where the data is sent, stored, and scanned), area "B" of the diagram is 2nd screen that copies, installs and saves program onto computer system (ie. save option onto user Internet enabled mobile device, Internet enabled pda device, desktop, laptop, and/or any other Internet enabled hardware device; area "C" of the diagram is registration screen, where user registers his/her hardware (using the serial number to link the user to an account set up for future log ins), technical support option, updates to email option, account set up with user personal (verifiable) data, in order to set up the account for use of the device. Upon successful installation, user sees icon in their startup menu, and on their desktop/home screen. Upon successful (online) registration, user receives verification email.

According to the invention, newness of the invention consisting of system setting user log in and preference setting capabilities, along with user levels of security and system and account notifications scheduling via email, text messaging.

According to the invention, newness of the invention consisting of verification and documentation of product registration.

According to the invention, newness of the invention consisting of detection and transfer of images securely while offline, where image is stored, but inactive for processing, until user manually links the data to his/her account (OMS).

Figure 5A:
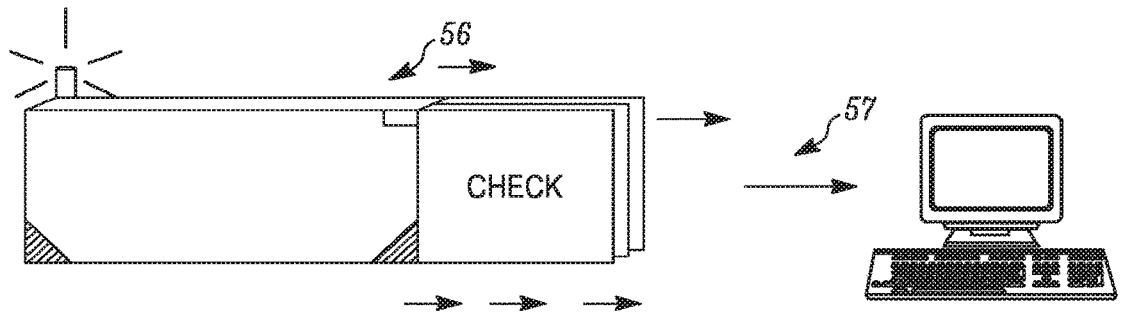
FIGS. 5A and 5B are flow charts which shows the wireless transmission of data concept, along with the cycle process of data delivery and communication scan—from wireless delivery to receipt for check image (online check/money order deposit) processing.
Figure 5B:
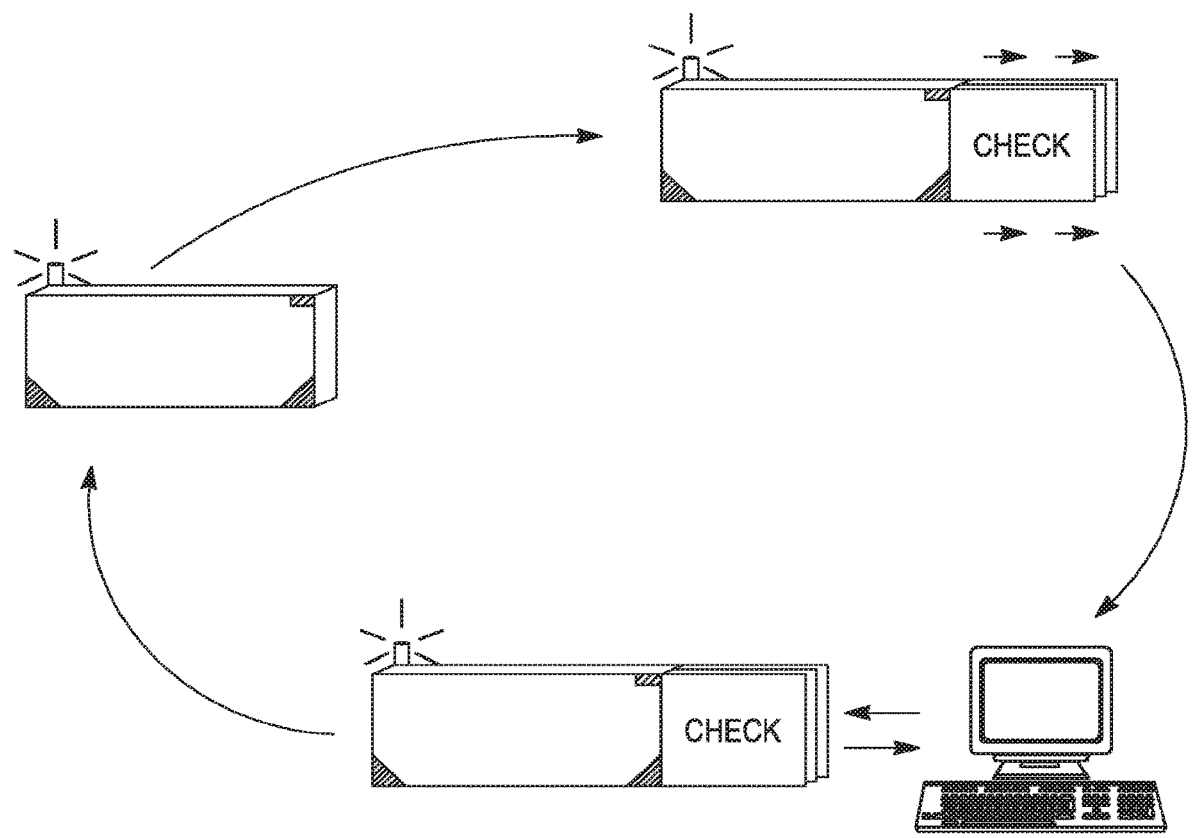

According to the invention, newness of the invention consisting of OMS system communication (option) with banks to gain authorization to verify and remove funds for check amount from check owner's account, into user/depositor's checking account. FIG. 5A, FIG. 5B shows the data transmission concept Cycle (through the use of diagrams and arrows—indicating a cycle); 56 shows the physical check sliding through the device, 57 which ultimately reflects on the computer system (ie. desktop, laptop, Internet enabled mobile device/pda) operable for user through the OMS; FIG. 5B, A shows device, 5B, B shows scanning of device, FIG. 5B, C shows the image wirelessly transmitted, recognized, and delivered to the user computer for view, verification, and processing; FIG. 5B, D shows receipt of image and transfer of data onto user's account. FIG. 5B, E shows check deposit request. FIG. 5B, F shows payee's financial institution approval of deposit, FIG. 5B, G shows complete transaction verified and confirmed, FIG. 5B, H shows immediate void option being executed after pre-programming for operation of that feature.

The motivation of my invention was to allow secure deposit and cashing of paper checks, substitute checks and or money orders in a secure wireless, online environment from home (using wireless fidelity technology, wireless networking technology, web-cam technology, Bluetooth 802.11 technology, Intel technology), office (such as, through desktop Internet enabled computer and/or through fax—delivered to WEDS for OMS processing), cell phone, pda device, or any Internet capable device to provide users with the freedom and mobility of expanded online banking options; however, the invention is applicable to the prevention of fraud in a variety of commercial paper and documents. Thus, while the invention has been described in terms of preferred embodiments, those skilled in the art will recognize that the invention can be practiced with modification within the spirit and scope of the appended claims.

Having thus described my invention, what I claim as new and desire to secure by Letters Patent as follows:

1. A system for executing an electronic transaction with a wireless network from a portable data capture device of a user, the system comprising:
   the portable data capture device of the user configured to:
      receive software, the received software comprising instructions for configuring the portable data capture device of the user to capture and transmit a financial instrument for processing via the wireless network;
      capture an electronic image of the financial instrument via the received software;
      electronically transmit the electronic image from the portable data capture device of the user for processing via the wireless network;
      electronically capture a live image of the user of the portable data capture device; and
      only process the electronic image for deposit into a user account for the user at a financial institution upon verification that the user has transmitted the live image of the user during the electronic transaction.

2. The system of claim 1, wherein the financial instrument comprises a check.

3. The system of claim 1, wherein the financial instrument comprises an endorsed check and the portable data capture device is configured to capture a front side and a back side of the endorsed check.

4. The system of claim 1, wherein the portable data capture device is configured to electronically capture the live image of the user with a web camera.

5. The system of claim 1, wherein the portable data capture device of the user is further configured by the received software to electronically void the electronic image to prevent subsequent deposit of the financial instrument.

6. The system of claim 1, wherein the portable data capture device of the user is further configured to receive an electronic transaction notification message relating to the processing of the electronic image for deposit subsequent to electronically transmitting the electronic image.

7. The system of claim 1, wherein the portable data capture device of the user is further configured to display the electronic image of the financial instrument via the portable data capture device after capturing the electronic image.

8. The system of claim 7, further comprising transmitting a deposit authorization input from the portable data capture device after electronically transmitting the electronic image.

9. The system of claim 1, wherein the portable data capture device comprises a wireless device and is configured to electronically transmit from the wireless device via a wireless network.

10. The system of claim 9, wherein the wireless device comprises a mobile telephone.

11. The system of claim 1, wherein the portable data capture device is configured to only process the electronic image for deposit into the user account for the user at the financial institution upon verification that the user has transmitted the live image of the user during an entirety of the electronic transaction.

12. A method for executing an electronic transaction with a wireless network from a portable data capture device of a user, the method comprising:
  receiving software via the wireless network and configuring the portable data capture device with the received software to capture and transmit a financial instrument for processing via the wireless network;
  capturing an electronic image of the financial instrument with the portable data capture device of the user via the received software;
  electronically transmitting the electronic image from the portable data capture device of the user for processing via the wireless network;
  electronically voiding the electronic image to prevent subsequent deposit of the financial instrument; and
  only processing the electronic image for deposit into a user account for the user at a financial institution upon verification that a moving image of the user was transmitted from the portable data capture device during the electronic transaction.

13. The method of claim 12, wherein the financial instrument is a check.

14. The method of claim 12, wherein the financial instrument comprises an endorsed check and capturing the electronic image comprises capturing a front side and a back side of the endorsed check.

15. The method of claim 12, wherein the moving image comprises a live image of the user taken with a web camera.

16. The method of claim 12, further comprising subsequently transmitting an electronic transaction notification message to the portable data capture device relating to the processing of the electronic image for deposit.

17. The method of claim 12, further comprising displaying the electronic image of the financial instrument via the portable data capture device after capturing the electronic image.

18. The method of claim 12, further comprising transmitting a deposit authorization input from the portable data capture device after electronically transmitting the electronic image.

19. The method of claim 12, wherein the portable data capture device comprises a wireless device and electronically transmitting comprises wirelessly transmitting from the wireless device via a wireless network.

20. The method of claim 19, wherein the wireless device is a mobile telephone.

* * * * *